US006778795B2

United States Patent
Iijima et al.

(10) Patent No.: US 6,778,795 B2
(45) Date of Patent: Aug. 17, 2004

(54) DRIVING FORCE TRANSMISSION APPARATUS AND IMAGE FORMING APPARATUS USING THE SAME

(75) Inventors: Kiichiroh Iijima, Ashigarakami-gun (JP); Mamoru Kido, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 204 days.

(21) Appl. No.: 09/986,714

(22) Filed: Nov. 9, 2001

(65) Prior Publication Data

US 2002/0176722 A1 Nov. 28, 2002

(30) Foreign Application Priority Data

May 25, 2001 (JP) ........................................ 2001-157832
Sep. 17, 2001 (JP) ........................................ 2001-281921

(51) Int. Cl.[7] ........................ G03G 15/00; G03G 21/00; F16G 1/28; F16G 5/20
(52) U.S. Cl. ........................................ 399/167; 474/249
(58) Field of Search ........................... 399/167, 322; 474/249

(56) References Cited

U.S. PATENT DOCUMENTS 2,017,291 A * 10/1935 Pfleger ........................ 474/249
2,054,619 A * 9/1936 Freedlander ................ 474/249
2,181,001 A * 11/1939 Smith ......................... 474/249
4,890,140 A * 12/1989 Negoro et al. .............. 399/322
5,342,250 A * 8/1994 Sanders ...................... 474/249
5,778,287 A * 7/1998 Yu .............................. 399/167
5,899,603 A * 5/1999 Markovics .................. 399/167

FOREIGN PATENT DOCUMENTS

| JP | 5-72862 A | 3/1993 |
| JP | 7-319254 A | 12/1995 |
| JP | 9-80840 A | 3/1997 |
| JP | 9-160332 A | 6/1997 |
| JP | 10-26903 A | 1/1998 |
| JP | 10-111586 A | 4/1998 |
| JP | 10-161384 A | 6/1998 |
| JP | 2001-265165 | * 9/2001 |

* cited by examiner

Primary Examiner—Fred Braun
(74) Attorney, Agent, or Firm—Oliff & Berridge, PLC

(57) ABSTRACT

An image forming apparatus including a drive source for producing driving force; an image carrier driven by the driving force; and a driving force transmission apparatus for transmitting the driving force produced by the drive source to the image carrier, wherein the driving force transmission apparatus includes a first endless-shaped flat belt having a plurality of through holes along a travel direction thereof; and a rotation member having a plurality of projections to which said plural through holes of the first flat belt are fitted.

21 Claims, 34 Drawing Sheets

BELT TRAVEL DIRECTION

BELT TRAVEL DIRECTION

OVERLAP TWO SHEETS OF FLAT BELTS WITH EACH OTHER TO ALIGN END PORTIONS THEREOF

END PORTIONS OF TWO OVERLAPPED FLAT BELTS IS ABUTTED AND WELDED

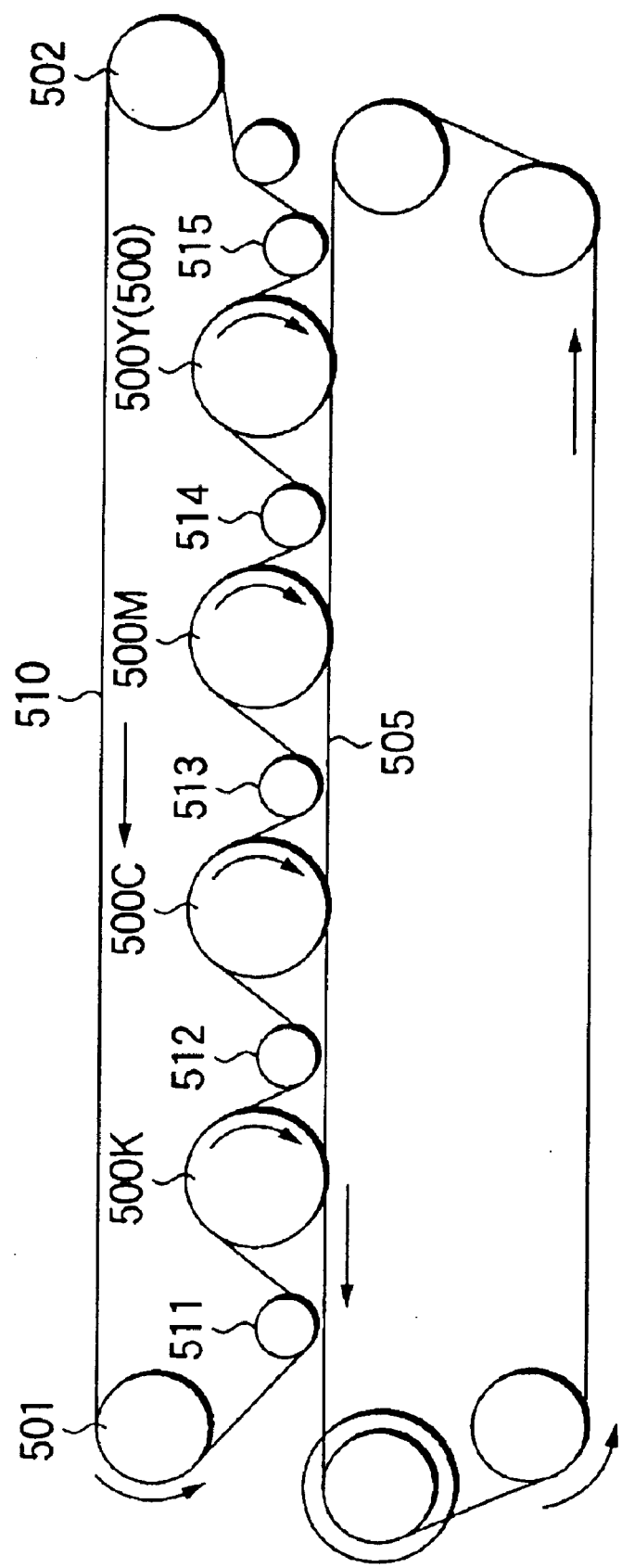

DRIVING FORCE TRANSMISSION APPARATUS AND IMAGE FORMING APPARATUS USING THE SAME

BACKGROUND OF THE INVENTION

1. Filed of the Invention

The present invention generally relates to a driving force transmission apparatus used in an image forming apparatus such as a copying machine, a printer, a facsimile, or a composite type machine made of these appliances. More specifically, the present invention relates to an improvement in such a driving force transmission apparatus for transmitting driving force by wearing, or tensioning an endless flat belt on a plurality of tension members, and also relates to an improvement in an image forming apparatus with employment of this driving force transmission apparatus.

2. Description of the Related Art

Driving force transmission apparatus which are utilized in image forming apparatus such as a printer and a copying machine own such specific characteristics that structural defects of these driving force transmission apparatus may directly induce image defects. Under such a circumstance, various sorts and higher requirements such as high engaging rates, high transmission rate, and suppression of rotation fluctuations.

In order to realize the high engaging rates and the high transmission rates, or in order to achieve the better low rotation fluctuation performance as driving force transmission apparatus of image forming apparatus according to the related art, there has been proposed a technique transmitting driving force to an image carrier by using helical gears (see, for instance, Japanese Laid-open Patent Applications No. Hei-9-80840, and No. Hei-5-72862).

Also, another technique using belts equipped with teeth has been proposed as driving force transmission member since employment of the belts equipped with teeth can realize lower rotation fluctuation performance than the employment of the helical gear.

Furthermore, in order to realize a lower rotation fluctuation than that realized by employing the belt equipped with teeth, another technique using a helical gear belt has been proposed (see, for example, Japanese Laid-open Patent Applications No. Hei-9-160332 and No. Hei-10-26903).

In general, in the case that a helical gear is employed as a driving force transmission member, the engaging rate is made large easily, as compared with such a case that a spur gear is employed as this driving force transmission member, and also, a meshing between a drive gear and a driven gear is carried out slowly. As a result, it can be found that meshing vibrations which are transferred to this driven gear can be considerably reduced. However, in such a case that a gear is employed as such a driving force transmission member, such a technical problem cannot be avoided. Namely, rotation fluctuations are produced by a back lash.

In other words, when the drive gear is meshed, or engaged with the driven gear so as to rotary-drive this driven gear, the teeth of the drive gear is mutually made in contact with the teeth of the driven gear only for a predetermined time duration. However, after this time duration elapses, the teeth of the drive gear and the teeth of the driven gear are brought into non-contact states until the next teethes are meshed with each other, which implies a back lash (play). As a result, a back lash produces vibrations when the next teethes of these drive/driven gears are engaged with each other, and the driven gear constitutes a factor by which periodic rotation fluctuations occur (namely, engagement between teethes of gears are repeated).

This back lash cannot be in principle avoided in the case that gears are used. In such a case that gears are employed as a driving force transmission member of an image forming apparatus, a driven gear is vibrated by such a gear engagement to be easily moved only by a movement corresponding to a back lash under non-constraint state. As a result, even such a small vibration force caused by the engagement vibration causes the periodic concentration (density) fluctuations to be produced in an output image.

Also, even when a helical gear is employed, a total number of meshed teeth cannot be largely increased, as compared with such a case that a spur gear is used. As a consequence, when a deformation problem as to teeth is considered, the helical gear is required to be manufactured by using such a material having a certain high hardness especially in a meshing contact portion thereof.

However, in such a case that a drive gear made of a material having a high hardness is engaged with a driven gear made of a material having a high hardness, since a portion capable of absorbing vibrations produced by this gear engagement is not present in a driving force transmission path (namely, within transmission path in case that several rotating members are driven by gear train), meshing vibrations which are produced by meshing the drive gear with the driven gear are not attenuated, but are directly transferred to the driven gear. As a result, there is another technical problem that periodic concentration fluctuations are produced in an output image.

On the other hand, in a driving force transmission apparatus with employment of a belt equipped with teeth, since the belt equipped with the teeth which is meshed with a pulley is made of such a material as a rubber material having superior flexibility, it is so expected that vibrations produced by engaging the pulley with the belt equipped with the teeth are smaller than those produced by the gears. However, as a result of the actual measurement, there is substantially no difference between the vibrations produced by the belt equipped with the teeth and the gears, as explained as follows:

That is to say, FIG. 31 is a diagram for representing rotation fluctuations in case that both a spur gear belt and a spur gear are employed as a driving force transmission member.

As apparent from FIG. 31, even when the spur gear belt is employed, rotation fluctuation results thereof are obtained which are not different from those of the spur gear.

Apparently, a rotation fluctuation can be improved by narrowing a pitch of teeth. However, when this pitch of the teeth is excessively narrowed, a so-called "teeth skipping phenomenon" caused by an increased load occurs, so that gears cannot be actually driven. Therefore, a great improvement could not be expected. As a result, even when the spur gear belt is employed, it is impossible to avoid an occurrence of concentration fluctuations in an output image.

FIG. 32 represents a relationship between a concentration fluctuation allowable value and a rotation fluctuation of an image carrier drum in an image forming apparatus such as a printer.

In this drawing, such a rotation fluctuation level of the image carrier drum, at which a concentration fluctuation contained in an output image can be recognized, is equal to approximately 0.3% in a speed variation rate of $\Delta V0\text{-}p$ (%) which constitutes an index of such a rotation fluctuation.

When such a speed variation rate larger than, or equal to this fluctuation level occurs, there is a problem as to concentration fluctuations of the output image. As a consequence, the engaging vibration levels produced in the gears and the belt equipped with the teeth constitute a very serious problem in view of this concentration (density) fluctuation.

In other words, as to the rotation fluctuation requirement as the image forming apparatus, very high levels are required. Even when a helical gear belt is employed, a so-called "teeth skipping phenomenon" occurs in a similar manner to that of the spur gear belt. It is practically difficult to achieve such an improvement that the rotation fluctuation level of the spur gear belt shown in FIG. 31 is reduced lower than, or equal to the allowable value.

As a consequence, as the techniques according to the related arts capable of solving such a technical problem, for instance, the following driving force transmission apparatus has already been proposed (see, for instance, Japanese Laid-open Patent Application No. Hei-7-319254). That is, as a driving force transmission apparatus for moving outer peripheral planes of a plurality of image carrier drums by the same move amounts, respectively, an endless-shaped flat belt is worn between a drive pulley and a driven pulley in order to transfer the driving force.

In this type of driving force transmission apparatus, since the driving force is transferred between the flat belt and the pulley (drive pulley and driven pulley) by way of friction force, in principle, such meshing vibrations which are produced by meshing the gear with the belt equipped with the gear are not produced between the flat belt and the pulley. As a result, this technique according to the related art can effectively prevent the periodic concentration fluctuation from being produced in the output image, which occurs in such a case that the gear and the belt equipped with the gear are employed.

However, in this sort of driving force transmission apparatus according to the related art using the flat belt, since the driving force transmission between the flat belt and the pulley is realized by utilizing the friction transmission, another technical problem newly occurs, namely, a slip occurs between the flat belt and the pulley.

In this case, FIG. 33 is a graph indicating a relationship between an average rotation speed of a driven pulley and load torque in a driving force transmission apparatus with employment of a flat belt.

As indicated in FIG. 33, the average rotation speed of the driven pulley is rapidly lowered when the load torque exceeds a limit value. This reason is given as follows: That is, while the normal slip amount is similarly increased in connection with an increase in the load given to the driven pulley shaft (namely, driven shaft), when the load becomes larger than, or equal to a certain limit value, the slip between the flat belt and the drive pulley, or the slip between the flat belt and the driven pulley is rapidly increased, so that the average rotation speed of the driven pulley is largely lowered.

When the driving force is transferred in the vicinity of the load amount of the driven pulley shaft under such a condition, the speed of this driven pulley is brought into unstable condition while time has passed. As a result, color shifts (color deviation) and/or transfer fluctuations occur in an output image, so that the normal image forming operation cannot be carried out. In the worst case, the image forming apparatus is stopped or malfunctions.

Also, in order to improve the limit value of the load torque, it is advantageous to increase the belt initial tension.

In other words, since the belt initial tension is increased, depression force used to depress the belt against the pulley is increased. As a result, since the friction driving force is increased, the limit value of this load torque is increased.

However, in such a case that a rubber belt and/or a resin belt is employed, rigidity of the belt itself is low, and thus, high tension cannot be applied thereto. As a result, the use of metal belts may be conceived in order to secure rigidity of a driving force transmission system and also to obtain stable driving force. However, since a friction coefficient between such a metal belt and a pulley is extremely smaller than a friction coefficient between either a rubber belt or a resin belt and a pulley, as represented in FIG. 33, a limit value of a load given to a driven pulley shaft cannot be largely improved. Even when doubled tension was applied to these rubber and resin belts, these belts could not be driven by achieving a target load amount of an image forming apparatus.

Also, in order that a limit value of load torque is improved by employing a metal belt, in such a case that very large belt initial tension is applied to this metal belt, shafts for supporting pulleys are flexed. As a result, the alignment of the respective pulley shafts is shifted, and the metal belt is largely meandered. Accordingly, since the flat belt was rubbed under large force with respect to the belt edge guides provided on the pulleys, distortions were produced in belt edge portions, so that the flat belt was driven under unstable condition.

As a consequence, under such a driven load condition predictable in an actual image forming apparatus, there is fatal defect, for instance, stable image forming operation cannot be realized. This metal belt employment could not also constitute the satisfactory solution.

Furthermore, a winding angle of a belt to a pulley is increased, and whereby belt depression force given to the pulley by tension can be increased. As a result, increasing of the belt winding angle to the pulley is effective with respect to a slip of a belt.

For instance, as indicated in FIG. 34, the following technique has already been proposed, i.e., while a driving pulley (not shown) is provided in a coaxial manner with respect to a plurality of photosensitive drums 500 (500Y, 500M, 500C, 500K) as a driving force transmission apparatus for the plural photosensitive drums, a flat belt 510 is wound on this driving pulley. In addition to both a drive tension pulley 501 and a driven tension pulley 502, several pieces of auxiliary tension pulleys 511 to 515 are provided, so that the winding angle of the flat belt 510 with respect to such a pulley for driving the photosensitive drums 500 can be secured to be large (for example, see Japanese Laid-open Patent Applications No. Hei-7-319254, No. Hei-10-111586, and No. Hei-10-161384). Incidentally, in FIG. 34, a reference numeral 505 denotes a belt unit used in an intermediate transfer operation, or used to transport paper.

However, in this type of driving force transmission apparatus, a large space is necessarily required so as to tension the belt (flat belt 510), and also, the supporting members for supporting the auxiliary tension pulleys 511 to 515 are necessarily provided. Such an arrangement is not preferably employed in view of compact/low cost aspects.

SUMMARY OF THE INVENTION

The present invention has been made to solve the above-explained technical problems, and therefore, has an object to provide a driving force transmission apparatus and an image forming apparatus with employment of this driving force transmission apparatus. That is to say, in such a driving force transmission apparatus in which an endless-shaped flat belt is worn over a plurality of tension members, while eliminating a transmission error of driving force which is caused by slips produced among the endless-type flat belt and the tension members such as pulleys, the driving force can be transferred under stable condition even under such a condition that a heavy load is given to a member to be driven.

According to an aspect of the invention, there is provided an image forming apparatus comprising: a drive source for producing driving force; an image carrier driven by said driving force; and a driving force transmission apparatus for transmitting the driving force produced by said drive source to said image carrier, wherein said driving force transmission apparatus comprises: an endless-shaped flat belt having a plurality of through holes along a travel direction thereof; and a rotation member having a plurality of projections to which said plural through holes of the flat belt are fitted.

BRIEF DESCRIPTION OF THE DRAWINGS

FIG. 34 is an explanatory diagram for showing one example of the driving force transmission apparatus according to the related art, using the flat belt.

DETAILED DESCRIPTION OF THE INVENTION

Figure 1:
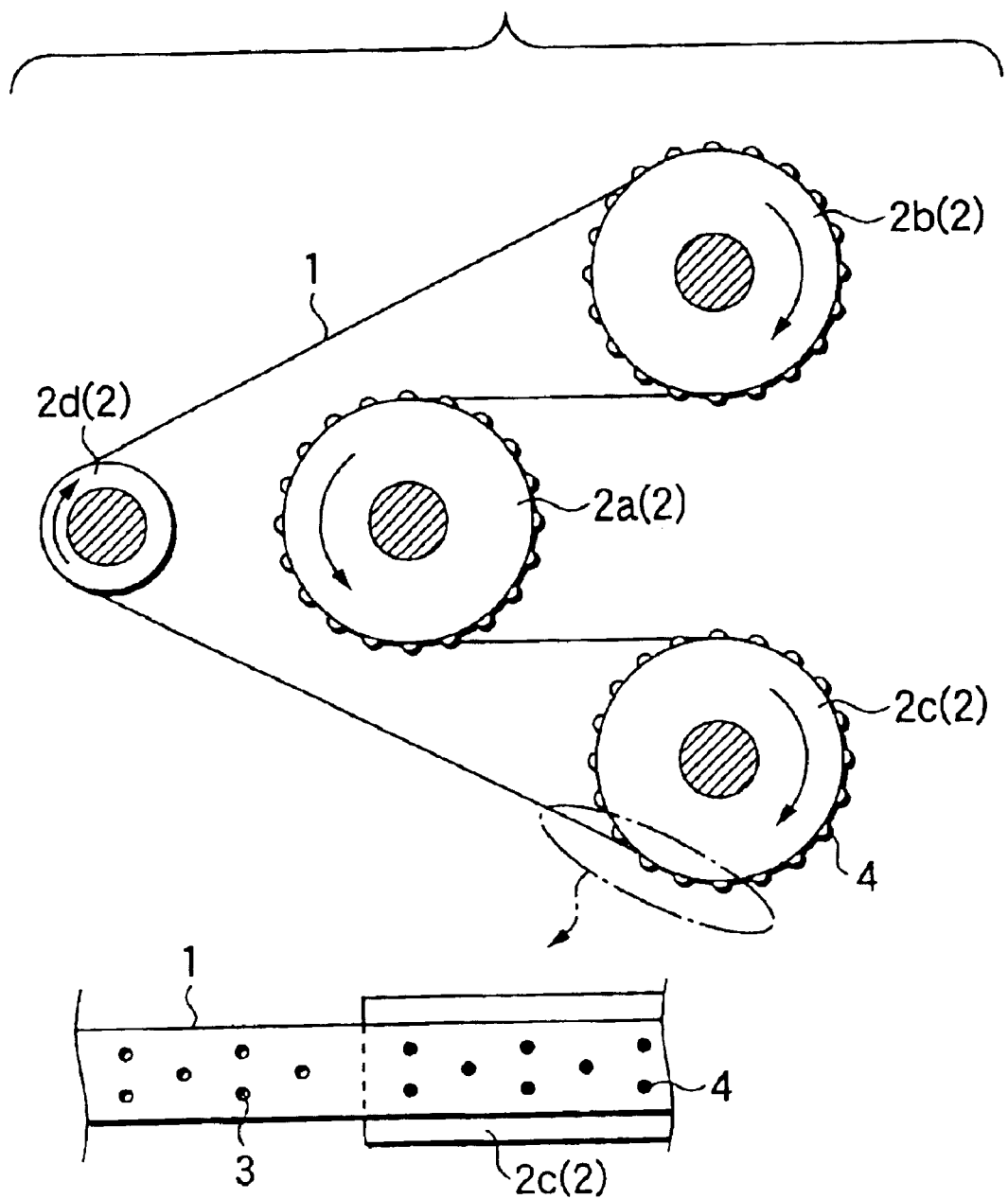
FIG. 1 is an explanatory diagram for showing an outline of a driving force transmission apparatus according to the present invention.

As shown in FIG. 1, the present invention is characterized in that in a driving force transmission apparatus for transferring driving force by wearing either one or a plurality sets of endless-shaped flat belts 1 over a plurality of tension members 2 (for example, 2a to 2d), a plurality of columns of through holes 3 are formed in at least one of the flat belts 1 along a travel direction of the flat belts 1, a plurality of columns of projections 4 engaging with the through holes 3 are provided on at least one of tension members 2 over which the flat belts 1 is worn along a rotation direction of the tension member 2.

Then, in FIG. 1, for example, when driving force derived from a drive source (not shown) is transferred to one tension member 2a, the driving force is transferred via this tension member 2a to the flat belt 1, and then, the driving force is transferred via this flat belt 1 to a member to be driven (not shown) which is provided in a coaxial manner to, for instance, tension members 2b and 2c.

In such a technical means, as the endless-shaped flat belt 1, the present invention is not limited only to a single set of endless-shaped flat belt, but also to a plurality sets of endless-shaped flat belts.

Also, the tension member 2 may be selected from any member capable of tensioning the flat belt 1, and thus, may widely involve a pulley, a roller, and the like.

Furthermore, in view of stable transmissions of the driving force, rigidity of each of members which constitute the driving force transmission apparatus is preferably selected to be high. As a result, preferably, the above-described flat belt 1 and tension member 2 is manufactured by employing such a material having a high rigidity, for example, a metal material. As a proper sort of metal materials, stainless steel is preferably employed in view of durability thereof.

Furthermore, in the flat belt 1, a plurality of through holes 3 are arrayed along a travel direction of this flat belt 1. Since the through holes 3 are fitted to the projections 4 which are formed on the rotating tension member 2, these through holes 3 are provided in a predetermined pitch interval along the travel direction of this flat belt 1.

Shapes of the projections 4 and of the through holes 3 may be arbitrarily selected. Generally speaking, considering the fitting characteristics between both the projections 4 and the through holes 3, the shapes of the projections 4 are selected to be semi-spherical, whereas the shapes of the through holes 3 are selected to be circular.

In particular, in accordance with the present invention, a plurality of columns of the above-described through holes 3 formed in the flat belt 1 may be formed along the travel direction of the flat belt 1.

In this case, the expression "the plurality of columns of through holes are formed along the travel direction of the flat belt 1" implies that the plurality of columns of these through holes 3 are arrayed with respect to a width direction perpendicular to the travel direction of the flat belt 1, and this array method may be arbitrarily selected.

As previously explained, when the plurality of columns of these through holes 3 are provided, even when heavy load torque is applied to shafts of the tension members 2 (for example, 2b and 2c) which are coupled to the member to be driven, the force may be received in a distribution manner by the plurality of columns of these through holes 3. Therefore, destruction occurred in portions of the through holes 3 can be effectively prevented.

Also, as to a preferable array of these through holes 3, such through holes 3 which are located adjacent to each other with respect to the width direction perpendicular to the travel direction of the flat belt 1 is preferably arranged at such a position where these through holes 3 are not overlapped with each other with respect to the travel direction of the flat belt 1.

With this through-hole arrangement, the belt rigidity among the through holes 3 is secured, and whereby even when large tension is applied as the belt initial tension, the destruction occurred in the hole portions of the through hole 3 which is caused by the belt meandering operation can be effectively prevented.

Furthermore, when the invention related to the above-explained driving force transmission apparatus is applied to an image forming apparatus, the following image forming apparatus is accomplished.

In other words, an image forming apparatus according to the present invention is an image forming apparatus having a drive source for generating driving force; an image carrier rotary-driven by receiving the driving force generated from the drive source; and a driving force transmission apparatus for transferring the driving force generated from the driving source to the image carrier, as shown in FIG. 1, the driving force transmission apparatus comprising a plurality of tension members 2 arranged between the drive source and the image carrier; and either one or a plurality of endless-shaped flat belts 1, which are worn over these plural tension members 2; wherein a plurality of columns of through holes 3 are formed in at least one of flat belts 1 along a travel direction of the flat belts 1; and a plurality of columns of projections 4 engaging with the through holes 3 are provided on at least one of tension members 2 over which the flat belt 1 is worn along a rotation direction of the tension member 2.

Here, as the image carrier, in addition to a photosensitive member, an intermediate transfer member and a sheet, such as paper, transport member are included. As modes of these image carrier members, in addition to a drum-shaped (cylindrical) member, an endless-type belt member is included.

In accordance with such an image forming apparatus, in the case that the above-described driving force transmission apparatus is applied as the image forming apparatus, in comparison with the driving force transmission mode according to the related art using the gear and the belt equipped with the gear, there is no vibration occurred when the through holes are engaged with the projections and thus it is possible to prevent such a problem that an image defect such as periodic concentration (density) fluctuation occurs in the outputs image.

Also, the driving force is transferred by mutually engaging the projections 4 of each of the tension members 2 with the through holes 3 of the flat belt 1. As a consequence, even when a heavy load is applied, both the flat belt and the pulleys do not slip, as compared with the related art in which the driving force is transferred by using friction force exerted between the flat belt and the pulley. Furthermore, even when a larger load is given, there is no risk that the hole portions of the through holes 3 are not destroyed. Therefore, it is possible to prevent an occurrence of an image defect, for example, a color shift, or color deviation, and/or an image transfer fluctuation occur in an output image. Thus, the stable image forming operation may be carried out.

Moreover, in view of energy saving aspect and cost reduction aspect, there is such a trend that the rotation loads given to the image carriers are increased in the below-mentioned cases: that is, not only such image carriers, but also rotation members such as a transfer roller and an electrostatic charging roller are rotary-driven by a single drive source, while these rotation members are rotary-driven in contact with the image carriers; and in order to reduce a total number of components, slide bearings are employed instead of roller bearings as to the bearings used for these image carriers and other rotation members. As a consequence, the present invention is preferably applied to such an image forming apparatus.

Also, there are such image forming apparatus equipped with a plurality of systems of image carriers among image forming apparatus.

In this case, in order to avail merits of the present invention, that is, even when the rotation load is large, no slip occurs between the flat belt 1 and the tension members 2 such as the pulleys; the destruction of the hole portions of the through holes 3 formed in the flat belt 1 can be prevented; and no image defect is produced, for example, neither color shifts, nor transfer fluctuations occur in output images, the present invention is preferably applied to the plurality of systems of image carriers to which heavier rotation loads are applied.

In such a case, an image forming apparatus of the present invention is realized by such an image forming apparatus comprising: a drive force for generating driving force; an image carrier rotary-driven by receiving the driving force generated from the drive source; and a driving force transmission apparatus for transferring the driving force generated from the driving source to the image carrier, the driving force transmission apparatus shown in FIG. 1 may be employed as such a driving force transmission apparatus capable of transferring the driving force to a system of an image carrier, in which the largest rotation load is applied, among plural systems of image carriers.

In this embodiment, the expression "driving force transmission apparatus capable of transferring driving force to system of image carrier, the rotation load of which is the largest load" implies such a driving force transmission system provided for a subject image carrier in such an assumption that there are plural image carriers belonging to a certain system, and driving force transmission systems for the respective image carriers are provided in a parallel manner. Also, this "driving force transmission apparatus" implies an entire driving force transmission system for a plurality of image carriers which contain such an image carrier having the largest rotation load in such an assumption that there are plural image carriers belonging to a certain system, and driving force transmission systems for the respective image carriers are provided in a series manner.

Furthermore, in such a case that a plurality of systems of image carriers are rotary-driven by a single drive source, there is such a risk that disturbance applied to one system of image carriers may give an influence to another image carrier. As this disturbance, the following cases are conceivable. For instance, a cleaning apparatus is made in contact with a transfer apparatus, and/or is separated from this transfer apparatus, and an article rides over a recording sheet, and/or ride down this recording sheet.

In such a case, in an image forming apparatus equipped with two systems of image carriers, according to the present invention, a driving force transmission apparatus may comprise: a first flat belt for transferring driving force from one drive source to a first system of an image carrier; and a second flat belt for transferring driving force from one drive source to a second system of an image carrier.

Since the image forming apparatus is configured in such a manner, even in a case that certain disturbance is applied to the first system of the image carrier and then this disturbance is transferred via the first flat belt to the drive source, the drive source may cancel this disturbance based upon its characteristic, so that this disturbance is not transferred via the second flat belt to the second system of the image carrier. As to this characteristic of the drive source, concretely speaking, while the drive source produces the drive torque (namely, summation of load torque applied to both first flat belt and second flat belt) from the own drive source to rotate, the disturbance is penetrated through a large DC torque generating source, by which an adverse influence with respect to this disturbance may become small, rather than such a case that a driven pulley directly receives disturbance (torque variation) from a flat belt, since the holding power of the drive source is made effective. Conversely, when the disturbance is applied to the second system of the image carrier, a similar effect may be achieved.

In this case, various embodiments may be conceived as to a relationship of two systems of image carriers: That is, for example, 1) the first system of the image carrier directly contacts with the recording sheet, but the second system of the image carrier does not directly contact with this recording sheet; 2) a color of a toner image held on the image carrier surface belonging to the first system is different from a color of a toner image held on the image carrier surface belonging to the second system; 3) the cleaning apparatus does not abut, but also is not separated from the first system of the image carrier, whereas the cleaning apparatus abuts, and is separated from the second system of the image carrier; 4) the transfer apparatus does not abut, but also is not separated from the first system of the image carrier, whereas the transfer apparatus abuts, and is separated from the second system of the image carrier; and also 5) both the cleaning apparatus and the transfer apparatus abut and are separated from the first and second systems of these image carriers at different timing.

Figure 2A:
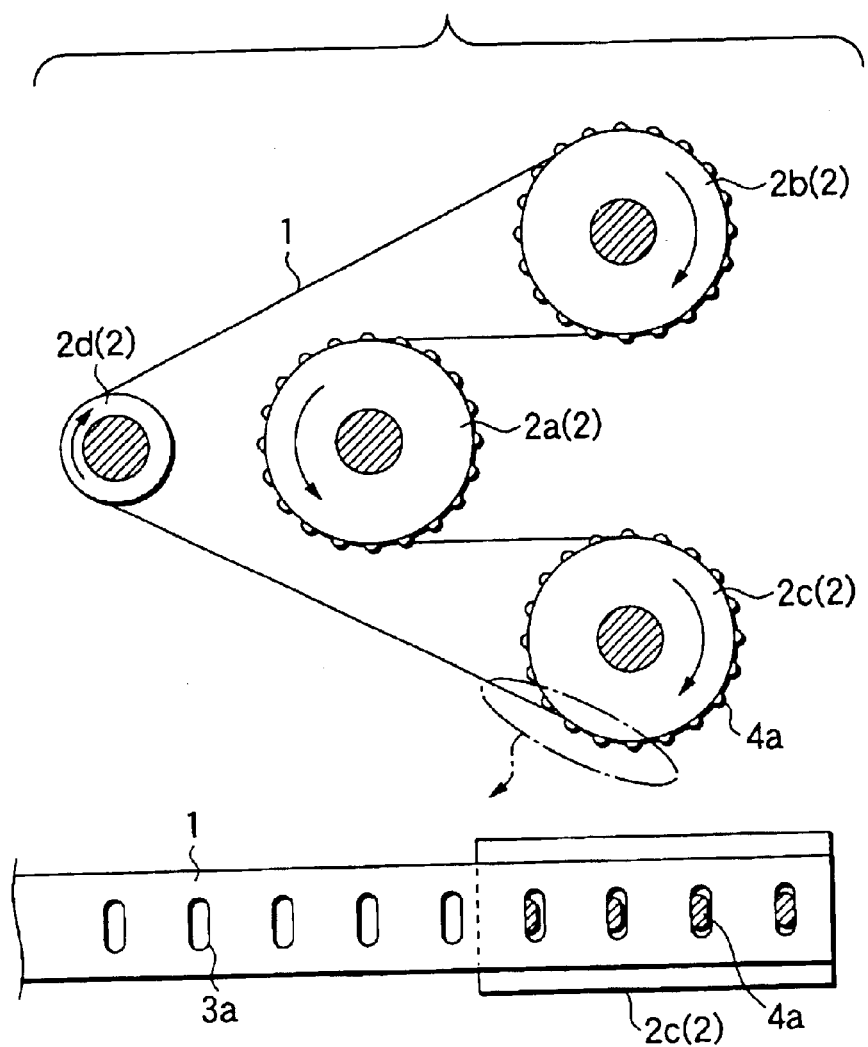
FIG. 2(a) is an explanatory diagram for showing an outline of a driving force transmission apparatus according to another mode of the present invention.

Also, as illustrated in FIG. 2(a), a driving force transmission apparatus according to another mode of the present invention is featured by that in such a driving force transmission apparatus for transferring driving force by wearing either one or a plurality of endless-shaped flat belts 1 over a plurality of tension members 2 (for example, 2a to 2d), elongated-hole shaped through holes 3a which are elongated along a width direction perpendicular to a travel direction of the flat belt 1 are formed in at least one of the flat belts 1 along the travel direction of the flat belts 1; and pillar-shaped projections 4a are formed on at least one of tension members over which the flat belt 1 is worn along a rotation direction of the tension member 2, the pillar-shaped projections 4a being fitted to the elongated-hole shaped through holes 3a of the flat belt 1, and further, being elongated along a width direction perpendicular to the rotation direction of the tension member 2.

In such a technical means, materials of the flat belt 1 and the tension member 2 are similar to those of the above-described mode shown in FIG. 1.

Also, the flat belt 1 has the elongated-hole shaped through holes 3a arranged along the travel direction. Since the respective through holes 3a are employed so as to be fitted to the pillar-shaped projections 4a formed on the rotating tension member 2, these through holes 3a are provided in a predetermined pitch interval along the travel direction of the flat belt 1.

In this case, normally, the shape of the elongated-hole shape through hole 3a owns a straight line portion along the longitudinal direction thereof, but also has a curved line portion.

On the other hand, normally, the shape of the pillar-shaped projection 4a is a semi-circular cylinder shape, but is not limited to this shape if the engaging/detaching operations thereof with respect to this elongated-hole shaped through hole 3a may be carried out in a smooth manner.

Furthermore, this mode may cover all of driving force transmission apparatus comprising the elongated-hole shaped through holes 3a and the pillar-shaped projections 4a. Alternatively, this mode may involve such driving force transmission apparatus in which circular-shaped through holes 3b (for example, see FIG. 2b) other than the elongated-hole shaped through holes 3a are provided, or semi-spherical shaped projections 4b (for example, see FIG. 2b) other than the pillar-shaped projections 4a are provided.

As previously described, if the elongated-hole shaped through holes 3a are provided, even when the large load torque is applied to the shafts of the tension members 2 (for example, 2b, 2c) which are coupled to the member to be driven, then the engaging (meshing) manner between the elongated-hole shaped through holes 3a of the flat belt 1 and the pillar-shaped projections 4a of the tension members 2 is not equal to such a point contact of circles having different diameters (namely, circular through-holes and semi-spherical shaped projections), but is equal to a linear contact portion. That is, the driving force may be distributed to be received by this linear contact portion established between the longitudinal line-shaped portion (either a straight line portion or a curved line portion) of the elongated-hole shaped through hole 3a, and the line-shaped portion of the pillar-shaped projection 4a formed on the tension member 2. As a result, the destruction occurred in the hole portions of the elongated-hole shaped through holes 3a can be effectively prevented.

Furthermore, when the inventive idea related to the above-explained driving force transmission apparatus is applied to an image forming apparatus, the following image forming apparatus may be accomplished.

In other words, an image forming apparatus, according to the present invention, is featured by such an image forming apparatus comprising: a drive source for generating driving force; an image carrier rotary-driven by receiving the driving force generated from the drive source; and a driving force transmission apparatus for transferring the driving force generated from the driving source to the image carrier, as represented in FIG. 2(a), in which: the driving force transmission apparatus is comprised of: a plurality of tension members 2 arranged between the drive source and the image carrier; and either one or a plurality of endless-shaped flat belts 1, which are worn over these plural tension members 3; elongated-hole shaped through holes 3a which are elongated along a width direction perpendicular to a travel direction of the flat belt 1 are formed in at least one of the flat belts 1 along the travel direction of the flat belt 1; and pillar-shaped projections 4a which are fitted to the elongated-hole shaped through holes 3a of the flat belt 1 and also are elongated along a width direction perpendicular to a rotation direction of the tension member 2 are provided on at least one of the tension members 2 over which the flat belt 1 is worn along the rotation direction of the tension member 2.

In this case, as the image carrier, a photosensitive member, and also a sheet transport member such as an intermediate transfer member and paper may be included. As modes of these image carrier members, drum-shaped (cylindrical) members and endless-type belt members may be included.

Also, in accordance with this mode, similar operation and effects to those of the mode indicated in FIG. 1 may be achieved.

Figure 2B:
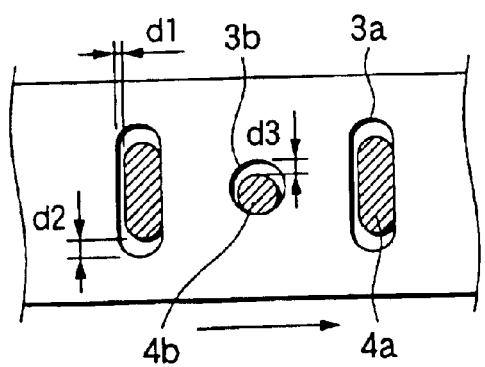
FIG. 2(b) is an explanatory diagram for showing a major portion thereof.

Also, as shown in FIG. 2(a) and FIG. 2(b), there is the following mode within the driving force transmission apparatus of this mode: That is, at least one of the flat belts 1 owns either the elongated-hole shaped through holes 3a or both the elongated-hole shaped through holes 3a and the circular-shaped through holes 3b, whereas at least one of the tension members 2 owns both the pillar-shaped projections 4a and the semi-spherical shaped projections 4b. The pillar-shaped projections 4a are fitted to the elongated-hole shaped through holes 3a, whereas the semi-spherical shaped projections 4b are fitted to either the elongated-hole shaped through holes 3a or the circular-shaped through holes 3b.

At this time, in the mode in which the circular-shaped through holes 3b are provided, these circular-shaped through holes 3b are provided in a predetermined pitch interval, and the semi-spherical shaped projections 4b may be provided in correspondence with these circular-shaped through holes 3b.

In this case, as to the layouts between the pillar-shaped projections 4a and the semi-spherical shaped projections 4b, any properly-selected projection layouts may be employed, for example, every one projection may be formed, or every two projections may be formed with respect to the corresponding through holes. As to the quantities of these projections 4a and 4b, total numbers of both the projections 4a and 4b are not always equal to each other, but may be distributed based upon a proper distribution ratio.

Moreover, in the mode in which the circular-shaped through holes 3b are not provided, the semi-spherical shaped projections 4b are fitted to the elongated-hole shape through holes 3a. In this case, although the shapes of the elongated-hole shaped through holes 3a which are fitted to both the pillar-shaped projections 4a and the semi-spherical shaped projections 4b may be made different from those of the projections 4a/4b, it is preferable to employ such elongated-hole shaped through holes 3a having the same structure when considering such a technical point that the structure of the flat belt 1 may be simplified.

Also, normally, one pair of semi-spherical shaped projections 4b which are fitted to the elongated-shaped through holes 3a are provided on both sides of the elongated-hole shaped through holes 3 along the longitudinal direction.

However, the present invention is not limited to this structure. For example, 3, or more sets of semi-spherical shaped projections 4b may be formed.

In such a mode, as represented in FIG. 2(a) and FIG. 2(b), a relationship of "d1≦d3≦d2" may be preferably satisfied based upon the following assumptions. That is, a space between an edge portion of the pillar-shaped projection 4a and an edge portion of the elongated-hole shaped through hole 3a along the travel direction of the flat belt 1 is assumed as "d1"; another space between an edge portion of the pillar-shaped projection 4a and an edge portion of the elongated-hole shaped through hole 3a along the width direction of the flat belt 1 is assumed as "d2"; and also, another space between an edge portion of the semi-spherical shaped projection 4b and an edge portion of either the elongated-hole shaped or the circular-shaped through hole 3a, or 3b along the width direction of the flat belt 1 is assumed as "d3".

In this case, the pillar-shaped projections 4a may mainly distribute the operation force with respect to the load torque executed to the tension member 2, whereas the semi-spherical shaped projections 4b may mainly restrict the positions with respect to the meander direction of the flat belt 1.

As a result, while the meandering operation of the flat belt 1 can be effectively avoided, the load torque can be distributed and also the destruction of these through hole portions (namely, elongated-hole shaped through holes 3a and circular-shaped through holes 3b) can be prevented.

Also, the present invention is directed to such an image forming apparatus into which such a driving force transmission apparatus capable of satisfying the above-explained relationship (d1≦d3≦d2) is assembled.

In this case, the image forming apparatus of the present invention may be realized by such an image forming apparatus comprising: a drive source for generating driving force; an image carrier rotary-driven by receiving the driving force generated from the drive source; and a driving force transmission apparatus for transferring the driving force generated from the driving source to the image carrier, as represented in FIG. 2(a) and FIG. 2(b), in which: the driving force transmission apparatus is comprised of: a plurality of tension members 2 arranged between the drive source and the image carrier; and either one or a plurality of endless-shaped flat belts 1, which are worn over these plural tension members 3; and such a driving force transmission apparatus is capable of satisfying the above-explained relation (d1≦d3≦d2).

While there are some image forming apparatus equipped with plural systems of image carriers among these image forming apparatus, the inventive idea of the present invention may be preferably applied to such an image carrier belonging to a system whose a rotation load is large, in a similar manner to the above-described image forming apparatus into which the driving force transmission apparatus shown in FIG. 1 is assembled.

In such a case, an image forming apparatus of the present invention may be realized by such an image forming apparatus comprising: a drive force for generating driving force; an image carrier rotary-driven by receiving the driving force generated from the drive source; and a driving force transmission apparatus for transferring the driving force generated from the driving source to the image carrier, the driving force transmission apparatus shown in FIG. 2 may be employed as such a driving force transmission apparatus capable of transferring the driving force to a system of an image carrier, in which the largest rotation load is applied, among plural systems of image carriers.

Furthermore, in such a case that two systems of image carriers are rotary-driven by using a single drive source, an image forming apparatus equipped with two systems of image carriers, according to the present invention, is featured by that a driving force transmission apparatus may be comprised of: a first flat belt for transferring driving force from one drive source to a first system of an image carrier; and a second flat belt for transferring driving force from one drive source to a second system of an image carrier.

Figure 3:
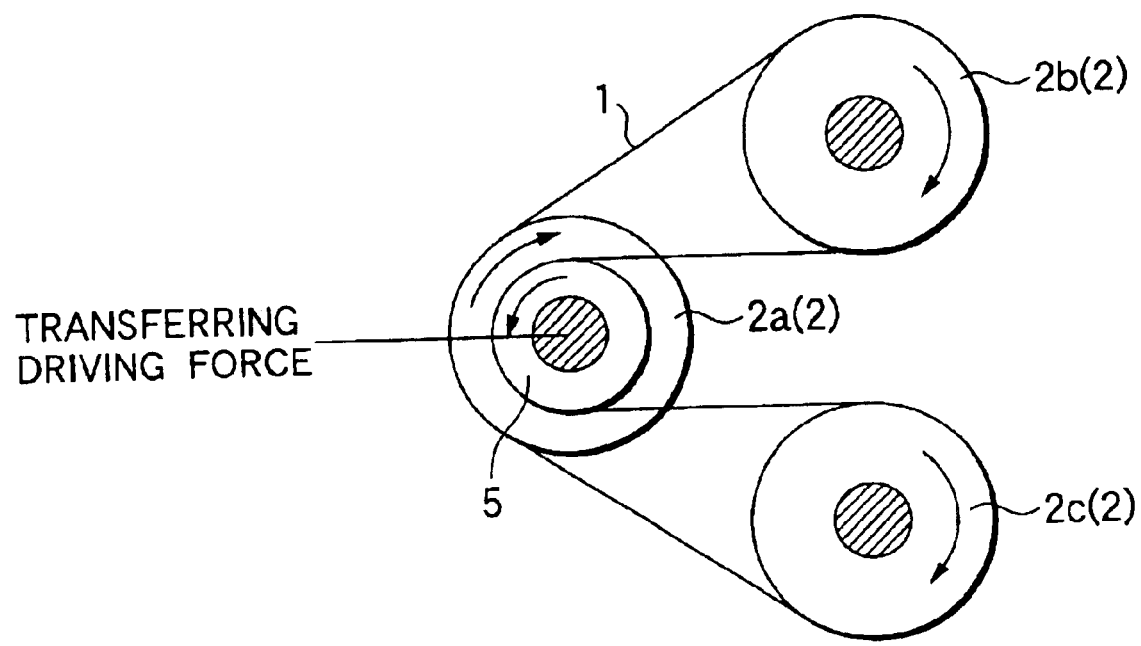
FIG. 3 is an explanatory diagram for showing an outline of a driving force transmission apparatus according to a further mode of the present invention.

Also, a driving force transmission apparatus, according to an further aspect of the present invention, is featured by such a driving force transmission apparatus for transferring driving force by wearing either one or a plurality of endless type flat belts 1 over a plurality of tension members 2 (for example, 2a to 2c), as indicated in FIG. 3, in which a free rotating member 5 is provided on at least one (for example 2a) of these tension members 2 to which the driving force is transferred in such a manner that the free rotating member 5 is freely rotatable, and is arranged in a coaxial manner with respect to a rotation shaft of this tension member 2a; and the flat belt 1 is worn via the free rotating member 5 over tension members 2 (for example, 2b and 2c) which are different from the tension member (for example, 2a) on which this free rotating member 5 is provided, and are located adjacent to each other.

Then, in FIG. 3, when the driving force is transferred to the tension member 2 (for example, 2a), the driving force is transferred via this tension member 2a to the flat belt 1, and then, the driving force is transferred via this flat belt 1 to a member to be driven (not shown) which is provided in a coaxial manner to, for example, the tension members 2b and 2c.

At this time, since the flat belt 1 is worned via the free rotating member 5 with respect to the tension members 2b and 2c, the winding angle of this flat belt 1 with respect to the tension members 2b and 2a may be secured as a sufficiently large winding angle, and also the friction resistance between this flat belt 1 and the tension members 2b/2c to which the driven member is coupled may become sufficiently high friction resistance. Thus, the driving force derived from the flat belt 1 may be firmly transferred to the tension members 2b and 2c.

On the other hand, since the free rotating member 5 is freely rotatably provided on the rotation shaft of the tension member 2 (for example, 2a) in a coaxial manner, there is no necessity for especially securing the setting space of the free rotating member 5.

As a consequence, the extra members for conventionally supporting the auxiliary tension pulley, and also the specific space are not required. Also, the winding angle of the flat belt 1 can be set to a sufficiently large winding angle with respect to the tension members 2 (for example, 2b and 2c) to which the driving member is coupled.

In such a technical means, as the flat belt 1, the present invention is not limited only to a single set of flat belt, but also to plural sets of flat belts. Also, the tension member 2 may widely involve a pulley, a roller, and the like.

In this case, the expression "tension member 2 (for example, 2a) to which driving force is transferred" implies that the tension member 2 may be directly coupled to the drive source, or the tension member 2 may be driven by another drive transmission system.

Furthermore, the expression "free rotating member 5" implies such a member which can be freely rotated and must be provided in a coaxial manner with respect to the rotation shaft of the tension member 2 (for example, 2a) to which the drive force is transferred, and may widely involve a bearing, a collar, and the like.

Also, in the mode shown in FIG. 3, the flat belt 1 may involve the normal belt. Alternatively, in view of effectively avoiding the slip produced between the flat belt 1 and the tension member 2, the following modification mode may be preferably employed. That is, while either one column or plural columns of through holes (not shown) are formed in at least one of flat belts 1 along a travel direction of this flat belt, projections (not shown) which are fitted to the through holes of the flat belt 1 are provided on at least one of tension members 2 over which this flat belt 1 is worn.

In accordance with such a modification mode, since the winding angle of the flat belt 1 with respect to the tension member 2 can be made large, the force which is exerted to the through-hole portions fitted to these projections can be distributed, and the destruction of these through hole portions can be effectively prevented.

Furthermore, when the free rotating member 5 is moved along the rotation shaft direction of the tension member 2, since the flat belt 1 which is worn over this free rotating member 5 is meandered, it is preferable to restrict the position of this free rotating member 5 along the shaft direction, in view of such a technical aspect that the meandering operation of the flat belt 1 is effectively prevented.

In this case, the free rotating member 5 may be positionally restricted by a position restriction member (not shown) with respect to the shaft direction of the rotation shaft of the tension member 2.

Furthermore, even when the free rotating member 5 itself is positionally restricted along the shaft direction, there is such a risk that the flat belt 1 itself which is worn over the free rotating member 5 is meandered. In view of such a technical aspect capable of effectively preventing the occurrence of such a belt meandering operation, the free rotating member 5 is provided with a position restricting portion for restricting a position of this free rotating member 5 with respect to a width direction perpendicular to the travel direction of the flat belt 1 which is worn over this free rotating member 5.

In this case, the expression "position restricting portion" may widely involve projections which are fitted to through holes if the flat belt 1 is equipped with the through holes, and also a restriction wall capable of preventing the meandering operation of the flat belt 1.

Furthermore, when the inventive idea related to the above-explained driving force transmission apparatus is applied to an image forming apparatus, the following image forming apparatus may be accomplished.

Figure 4:
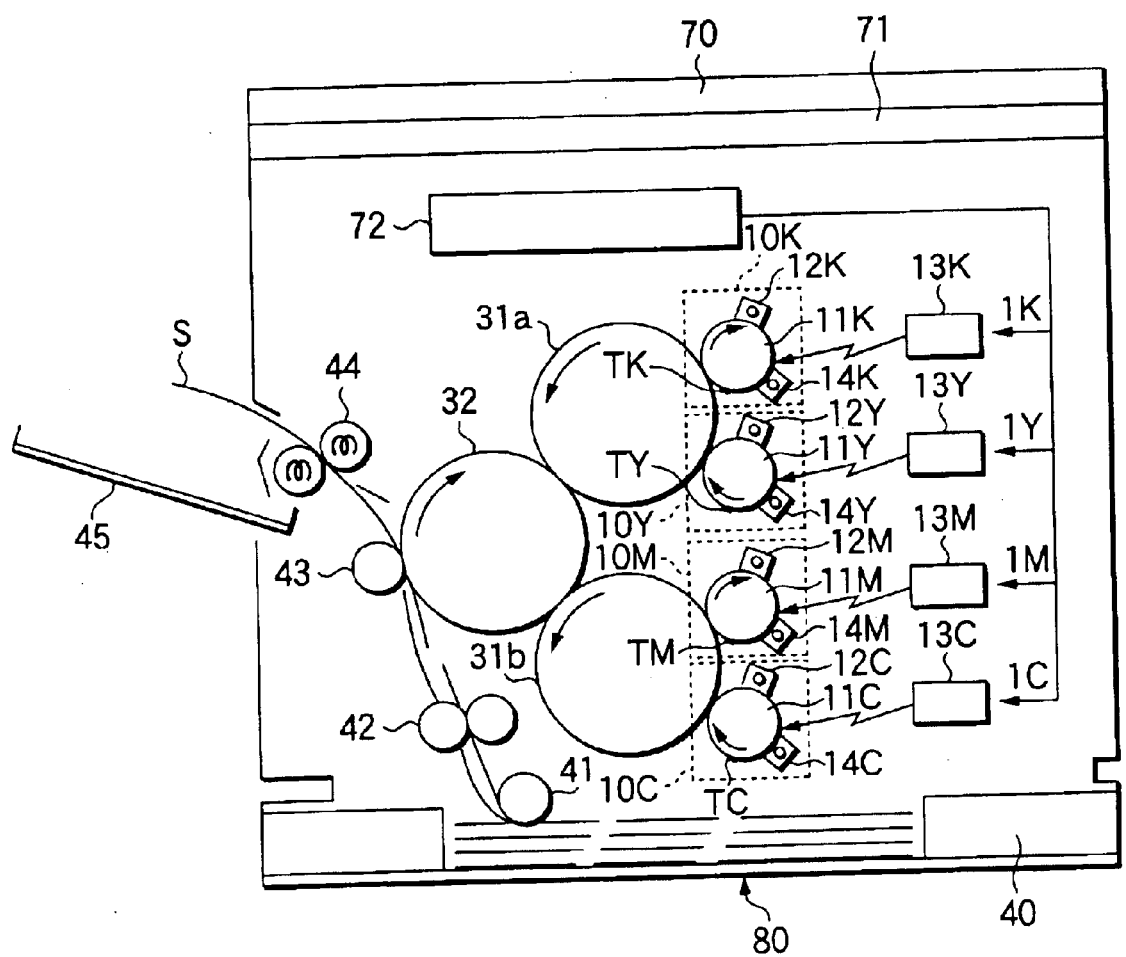
FIG. 4 is an explanatory diagram for showing an entire structure of an image forming apparatus according to an embodiment 1.

In other words, an image forming apparatus, according to the present invention, is featured by such an image forming apparatus comprising: a drive source for generating driving force; an image carrier rotary-driven by receiving the driving force generated from the drive source; and a driving force transmission apparatus for transferring the driving force generated from the driving source to the image carrier, as represented in FIG. 4, in which: the driving force transmission apparatus is comprised of: a plurality of tension members 2 (for example, 2a to 2c) arranged between the drive source and the image carrier; and either one or a plurality of endless-shaped flat belts 1, which are worn over these plural tension members 3; a free rotating member 5 which is freely rotatable and is arranged in a coaxial manner with respect to a rotation shaft of one tension member (for example, 2a) among the tension members 2 is provided on at least one tension member 2a, to which the driving force is transferred; and also the flat belt 1 is worn via the free rotating member 5 with respect to such tension members 2 (for example, 2b and 2c) which are located adjacent to each other, and are different from the tension member 2a where this free rotating member 5 is provided.

In accordance with such an image forming apparatus, the driving force transmission apparatus indicated in FIG. 3 can secure the large winding angle of the flat belt 1 with respect to a plurality of tension members 2 without unnecessarily enlarging the layout space, and also can reduce the transmission error of the driving force. As a consequence, while this image forming apparatus can satisfy the requirements of compact/low cost aspects, it is possible to avoid an occurrence of an image defect, for example, a color shift, or color deviation, and/or an image transfer fluctuation occurred in an output image. Thus, the stable image forming operation may be carried out.

Moreover, in view of energy saving aspect and also cost reduction aspect, there is such a trend that the rotation loads given to the image carriers are increased in the below-mentioned cases: That is, not only such image carriers, but also rotation members such as a transfer roller and an electrostatic charging roller are rotary-driven by a single drive source, while these rotation members are rotary-driven in contact with the image carriers; and in order to reduce a total number of components, slide bearings are employed instead of roller bearings as to the bearings used for these image carriers and other rotation members. As a consequence, the inventive idea of the present invention may be preferably applied to such an image forming apparatus.

Also, there are such image forming apparatus equipped with plural systems of image carriers among image forming apparatus. In this case, the inventive idea of the present invention may be preferably applied to plural systems of image carriers to which heavier rotation loads are applied similar to the image forming apparatus into which the driving force transmission apparatus shown in FIG. 1 has been assembled.

In such a case, an image forming apparatus of the present invention may be realized by such an image forming apparatus comprising: a drive force for generating driving force; an image carrier rotary-driven by receiving the driving force generated from the drive source; and a driving force transmission apparatus for transferring the driving force generated from the driving source to the image carrier, the driving force transmission apparatus shown in FIG. 3 may be employed as such a driving force transmission apparatus capable of transferring the driving force to a system of an image carrier, in which the largest rotation load is applied, among plural systems of image carriers.

Furthermore, in the case that two systems of image carriers are rotary-driven by a single drive source, an image forming apparatus, according to the present invention, may be realized by that in an image forming apparatus equipped with two systems of image carriers, a driving force transmission apparatus may be comprised of: a first flat belt for transferring driving force from one drive source to a first system of an image carrier; and a second flat belt for transferring driving force from one drive source to a second system of an image carrier.

In the driving force transmission apparatus and/or the image forming apparatus, normally, the structure of the flat belt 1 is constructed by one sheet of belt member. However, considering such technical aspects that the flat belts 1 may be easily worn over the tension members 2 and further the destruction occurred in the hole portions of the respective through holes (3, 3a, 3b) may be more firmly prevented, at least one of flat belts 1 may be preferably formed as follows: That is, a plurality of belt members having either the same materials or the substantially same material characteristics are superimposed with each other in such a manner that at least portions of these belt members are fixed, and furthermore, these belt members may be independently compressed/expanded.

In other words, the flat belt 1 of this embodiment is wound on either the tension members 2 or the free rotating member 5 in such a way that a plurality of belt members having the same materials, or the substantially same material characteristics (concretely speaking, tensile strength and bending strength) are superimposed with each other.

At this time, even when a plurality of belt members are superimposed with each other, the bending rigidity of this flat belt 1 is substantially equal to bending rigidity owned by one sheet of belt member, namely, small bending rigidity may be obtained. As a result, this flat belt 1 may be wound on the tension members 2 and the free rotating member 5 under stable condition.

Also, since the belt members having the same materials, or the substantially same material characteristics are superimposed with each other and the superimposed belt members are used, the rigidity of the flat belt 1 with respect to the force exerted to the hole portions of the through holes (3, 3a, 3b) may be increased. Also, in the case that the load torque is produced to the tension member 2 around which the flat belt 1 is wound, the plural belt members are deformed having the substantially same shape in response to a change in the belt tension. As a result, the operation force is not given to the through-hole portion of a single flat belt 1 in a concentration manner, and also, the destruction of this through-hole portion can be effectively prevented, resulting in stable belt driving operations.

Moreover, in this embodiment, since the flat belt 1 is equipped with the respective through holes 3, 3a, 3b, the belt members which are superimposed with each other are preferably and mutually positioned with each other.

In this case, at lease one portions of the belt members are required to be fixed. As a fixing method for the belt members, one portions of these belt members are welded, or adhered to each other. As a result, these belt members can be always and firmly superimposed with each other, while each of these belt members need not be initially positioned (namely, initial positioning along belt travel direction and along direction perpendicular to this belt travel direction).

DETAILED DESCRIPTION OF THE PREFERRED EMBODIMENTS

Referring now to the accompanying drawings, the present invention will be described in detail.

[Embodiment 1]

FIG. 4 is a sectional diagram for schematically representing an embodiment 1 of a copying machine (image forming apparatus) 80 to which the present invention is applied.

In this drawing, an arrangement of this copying machine 80 will now be explained, while this arrangement is subdivided into an image input system, an image forming system, and a sheet transporting system.

The image input system is provided with an original mounting base 70 on which an original is mounted, an original reading apparatus 71 for reading the original mounted on this original mounting base 70, and an image processing apparatus 72 for processing image information read by this original reading apparatus 71.

The image forming system is provided with an image forming station 10, an exposing apparatus 13, two first intermediate transfer drums 31, and one second intermediate transfer drum 32. The image forming stations 10 (concretely speaking, reference numerals 10K, 10Y, 10M, 10C, namely, portions surrounded by dotted lines in this drawing) correspond to each of black, yellow, magenta, and cyan colors. The exposing apparatus 13 (concretely speaking, reference numerals 13K to 13C) expose the image forming stations 10 in response to image data supplied from the image processing apparatus 72. Images formed in the respective image forming stations 10 are sequentially transferred to and held on the two first intermediate transfer drums 31 (concretely speaking, reference numerals 31a and 31b).

In this case, each of the image forming stations 10 is equipped with electrophotographic devices such as a photosensitive drum 11 (concretely speaking, reference numerals 11K to 11C), a charging apparatus 12 (concretely speaking, reference numerals 12K to 12C) charging the photosensitive drum 11, a developing apparatus 14 (concretely speaking, reference numerals 14K to 14C) developing a latent image written on the charged photosensitive drum 11 by using the exposing apparatus 13 by using the respective color toners and the like.

Incidentally, (primary) transferring apparatus (not shown) are arranged at portions where the respective photosensitive drums 11 (11K to 11C) and the first immediate transfer drums 31a and 31b face to each other and (secondary) transferring apparatus (not shown) are provided at portions where the first intermediate transfer drums 31a and 31b and the second intermediate transfer drum 32 face to each other.

Furthermore, the sheet transporting system is provided with a sheet tray 40 on which recording sheets such as paper are stacked/mounted, a pick-up roller 41 for picking up the recording sheets in the sheet tray 41 one by one, a register roller 42 for positioning the picked-up recording sheets, a (thirdly) transfer roller 43 for transferring the image on the second intermediate transfer drum onto the recording sheets, a fixing roller 44 for fixing the image transferred onto the recording sheets, and an ejection tray 45 for storing thereinto the ejected recording sheet.

Next, a description will now be made of basic full-color copying operations of such a copying machine 80.

First, when a user mounts an original to be read on the original mounting base 70, and then, instructs a full-color copying operation by using a user interface (not shown), the image reading apparatus 71 scans this original so as to optically read the content of this scanned original, and then, converts the read original content into an electric signal (image data "I"). This image data I is color-separated into a black color, a yellow color, a magenta color, and a cyan color in the image processing apparatus 72. Also, this image processing apparatus 72 performs such an image processing operation that a predetermined weighting factor in which a characteristic of marking device/process is taken into consideration is applied to the image data "I (namely, IK, IY, IM, IC)" having these colors.

On the other hand, the photosensitive drums 11 employed within the respective image forming stations 10 are rotary-driven by a belt driving apparatus 100 (see FIG. 5 and FIG. 6, will be explained later) along directions indicated by arrows as shown in this drawing. The surfaces of these photosensitive drums 11 are uniformly charged at a predetermined potential by the charging apparatus 12. Then, the respective exposing apparatus (13K to 13C) expose exposure light corresponding to the respective image data I (IK to IC) onto the surfaces of the respective photosensitive drums 11 (11K to 11C) at predetermined timing, so that latent images are formed by potential differences on the surfaces of the respective photosensitive drums 11 (11K to 11C). The latent images are converted into toner images "T" (K, Y, M, C) in such a manner that the toners are electrostatically adhered onto these latent images by the respective developing apparatus 14 (14K to 14C).

On the other hand, both the first intermediate transfer drums 31a/31b, and the second intermediate transfer drum 32 are rotary-driven by the belt driving apparatus 100 (see FIG. 5 and FIG. 6, will be explained later) along directions indicated by arrow, as shown in this drawing. Then, this toner image T(K, Y) is electrostatically transferred from the photosensitive drum 11 (11K, 11Y) to the first intermediate transfer drum 31a by a primary transferring apparatus (not shown) and the toner image T(M, C) is electrostatically transferred (primary transfer) from the photosensitive drum 11 (11M, 11C) to the first intermediate transfer drum 31b. In this case, the toner image T(K, Y) is superimposed with each other on the surface of the first intermediate transfer drum 31a and the toner image T(M, C) is superimposed with each other on the surface of the first intermediate transfer drum 31b.

Furthermore, the toner image T(KY) superimposed with each other on the first intermediate transfer drum 31a is electrostatically transferred (secondary transfer) to the second intermediate transfer drum 32 by a secondary transferring apparatus (not shown), and similarly, the toner image (MC) superimposed with each other on the first intermediate transfer drum 31b is electostatically transferred to this secondary intermediate transfer drum 32. In this case, the toner image T(KY) is superimposed with the toner image T (MC) on the surface of the second intermediate transfer drum 32, so that a full-colored toner image (KYMC) is formed thereon.

As explained above, while the toner image T(KYMC) is formed, one sheet of the recording sheet "S" stored in the sheet tray 40 is picked-up by the pick-up roller 41, and then, is transported to the register roller 42. For instance, the register roller 42 starts to be rotated from the stop condition up to predetermined timing, whereby a timing when the full-colored toner image T(KYMC) electrostatically formed on the second intermediate transfer drum 32 is reached to a nip portion (not shown) with respect to the transfer roller 43 coincident with another timing when the recording sheet S is reached to this nip portion. Thus, the full-colored toner image T(KYMC) formed on the second intermediate transfer drum 32 is electrostatically transferred to the recording sheet S.

Thereafter, when the recording sheet S passes through the nip portion of the fixing roller 44, while the full-colored toner image T(KYMC) is electrostatically held on the surface of this recording sheet S, this full-colored toner image T(KYMC) is fixed on this surface by receiving heat (thermal energy) and pressure given from the respective fixing rollers 44 and also effects thereof, and then, the recording sheet S on which the full-colored toner image has been fixed is ejected to the ejection tray 45 provided outside the copying machine 80.

While such a series of copying steps is defined as one cycle, this copy cycle is continuously carried out, so that full-colored images can be successively copied.

Figure 5:
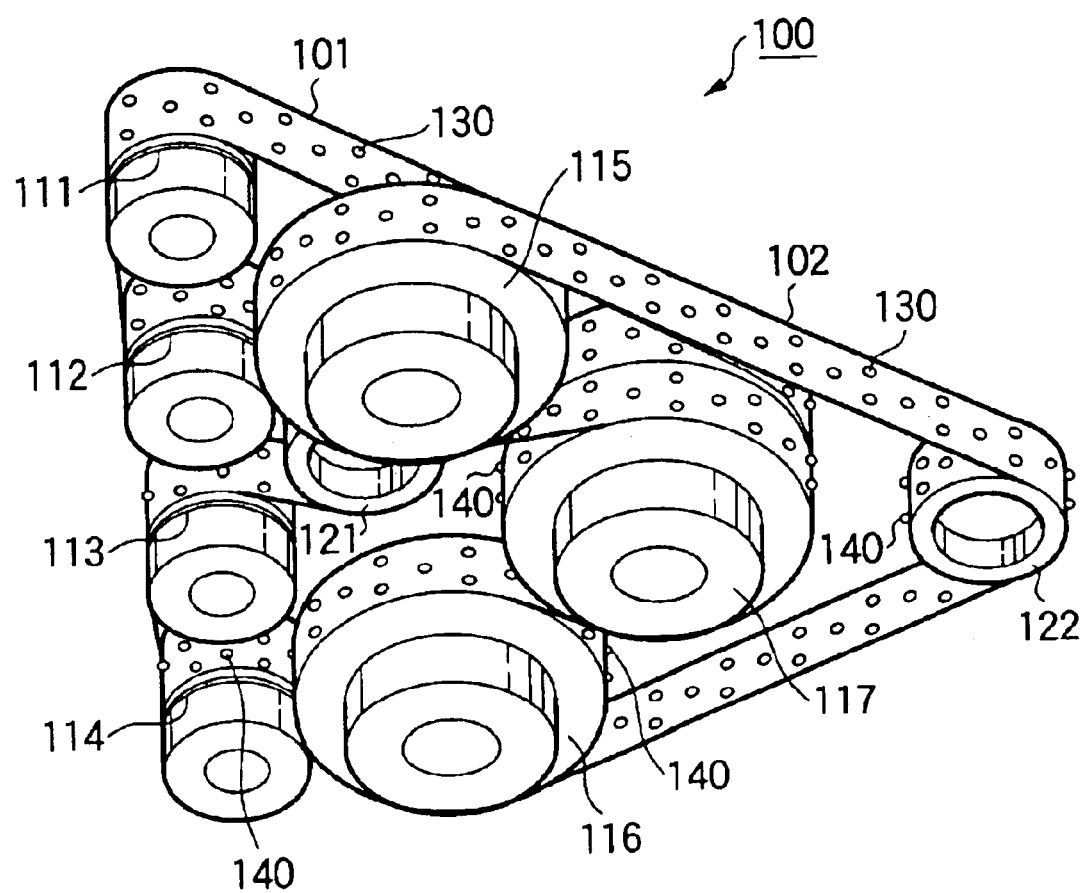
FIG. 5 is a perspective explanatory diagram for showing a driving force transmission apparatus employed in the embodiment 1 in detail.
Figure 6A:
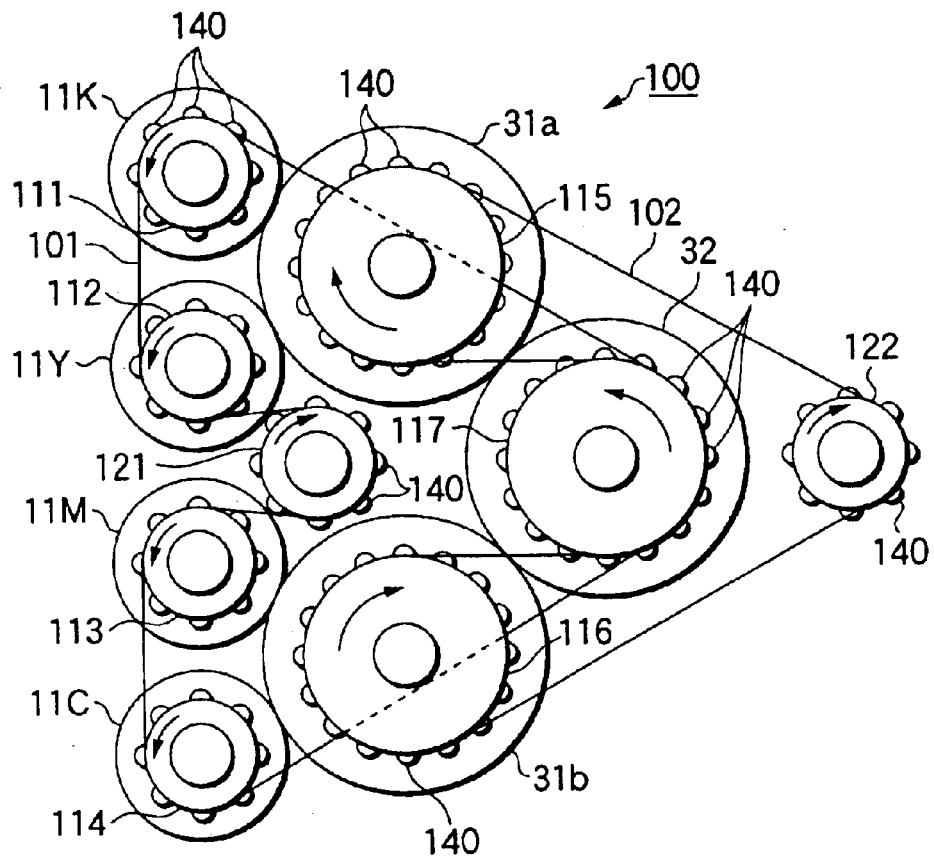
FIG. 6(a) is an explanatory diagram for showing a front view of the driving force transmission apparatus employed in the embodiment 1.
Figure 6B:
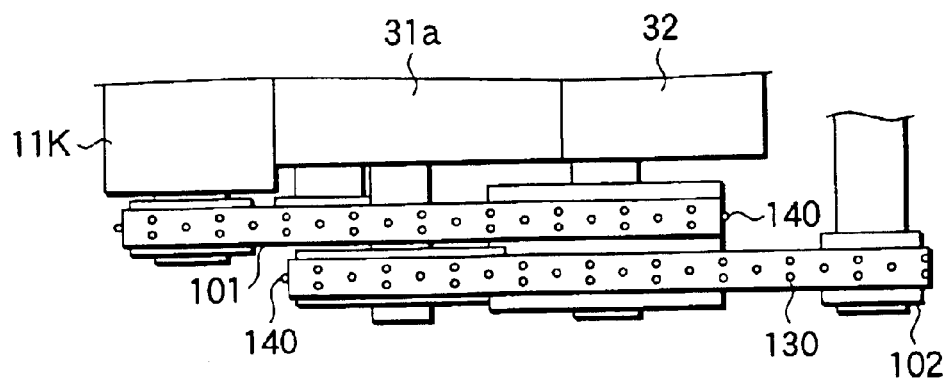
FIG. 6(b) is an explanatory diagram for showing a plan view thereof.

FIG. 5 is a perspective view showing the belt driving apparatus 100 which drives this copying machine 80. This drawing shows a structure of this belt driving apparatus 100, as viewed from a rear surface side of FIG. 4. Incidentally, FIG. 6(a) is an explanatory diagram showing a front view of the belt driving apparatus 100 of FIG. 5, and FIG. 6(b) is an explanatory diagram showing a plan view thereof.

In the drawings, the belt driving apparatus 100 is employed so as to drive the respective photosensitive drums 11 (11K to 11C), the first intermediate transfer drums 31a, 31b, and also the second intermediate transfer drum 32. This belt driving apparatus 100 is provided with two flat belts 101/102, and various sorts of tension members on which these flat belts 101 and 102 are tensioned, or worn.

In this case, as the above-described tension member, there are driven pulleys 111 to 117, and tension pulleys 121 and 122 for circulating the respective flat belts 101/102. The driven pulleys 111 to 117 are mounted on one ends of the respective photosensitive drums 11 (11K to 11C), the first intermediate transfer drums 31a/31b, and the second intermediate transfer drum 32 along axial directions thereof.

Incidentally, in this embodiment, the driven pulley 117 mounted on the second intermediate transfer drum 32 owns a two-stage belt hanging plane over which the first flat belt 101 and the second flat belt 102 are hung, respectively.

Then, the first flat belt 101 is hung over the tension pulley 121, the driven pulleys 111 to 114 which are mounted on the axes of the respective photosensitive drums 11 (11K to 11C), and the driven pulley 117 which is mounted on the axis of the second intermediate transfer drum 32.

On the other hand, the second flat belt 102 is hung over the tension pulley 122, the driven pulleys 115 and 116 which are mounted on the axes of the first intermediate drums 31a/31b, and the driven pulley 117 which is mounted on the axis of the second intermediate transfer drum 32.

Incidentally, pulley shafts (not shown) provided with the respective pulleys 111 to 117, 121, and 122 are supported by respective slide bearings which are provided on side surfaces of the copying machine 80, and therefore, these pulley shafts can be freely rotated.

In this case, the way how to apply power derived from a driving motor (drive source, i.e., not shown) to which shaft is that it is preferable to employ such configuration that the driving force derived from the driving motor is inputted to a pulley shaft having large winding angles between flat belts and pulleys.

In this embodiment, for instance, the driving force derived from the driving motor may be set to be inputted to the shaft of the second intermediate transfer drum 32. Alternatively, the driving force derived from the driving motor may be inputted to another pulley shaft.

Resin materials may be employed as manufacturing materials of these flat belts 101 and 102. However, metal materials such as stainless steel, nickel, and titanium are preferably used in view of durability and processing precision etc. More specifically, stainless steel is more preferably employed in view of cost, durability, and mechanical strengths etc.

Similarly, resin materials may be employed as manufacturing materials of these pulleys, however, metal materials such as stainless steel, aluminum, and carbon steel are preferably used in view of durability and processing precision etc. More specifically, generally speaking, a pulley made of a metal owns larger inertia moment, as compared with a pulley made of resin. As a result, this metal pulley may expect an attenuation effect with respect to high frequency vibrations such as mesh vibrations, which may induce a problem, i.e., image defect of an image outputted from an image forming apparatus. In view of this attenuation effect, a metal material is preferably employed as this pulley material. In particular, a stainless steel is more preferably employed as this pulley material among the metal materials in view of these cost, durability, and mechanical strengths.

FIG. 7 is an explanatory diagram showing structures of a flat belt and a pulley more in detail.

In this case, the flat belts 101/102 and the respective pulleys 110 (namely 111 to 117, 121, 122), which are employed so as to drive the intermediate transfer drums of FIG. 4, will now be described as an example.

A not shown cleaner abuts against the first intermediate transfer drums 31a and 31b shown in FIG. 4, and thus, a relatively heavier load is given to these first intermediate transfer drums, as compared with other drums. As a consequence, in this embodiment, plural columns (three columns in this example) of through holes 130 are formed in the first and second flat belts 101 and 102 along travel directions thereof. Also, plural columns (three columns in this example) of projections 140 are formed on either all or a portion of these pulleys 110 (a case of all pulleys is illustrated in this example). These projections 140 are located in correspondence with the through holes 130 of the flat belts 101 and 102. Since the projections 140 of the pulley 110 are fitted to the through holes 130 of the flat belts 101/102, the stable driving operations of the flat belts 101/102 is realized.

In this embodiment, for example, circular holes are employed as the through holes 130 and semi-spherical-shaped projections are used as the projections 140.

Figure 7A:
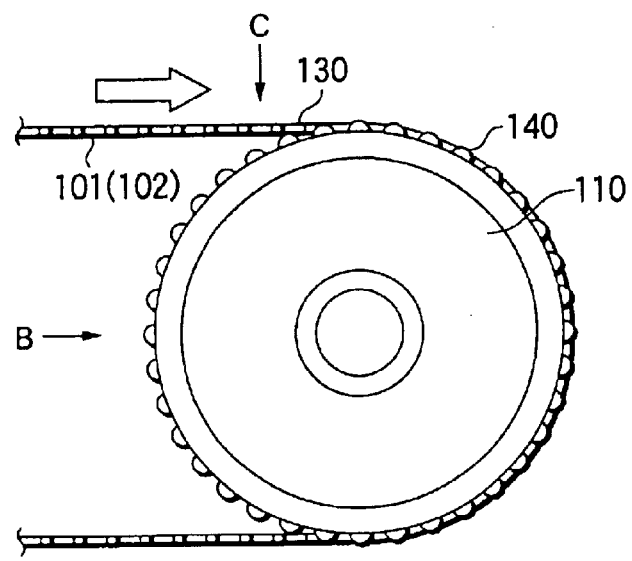
FIG. 7(a) is an explanatory diagram for showing a major portion of the driving force transmission apparatus employed in the embodiment 1.
Figure 7B:
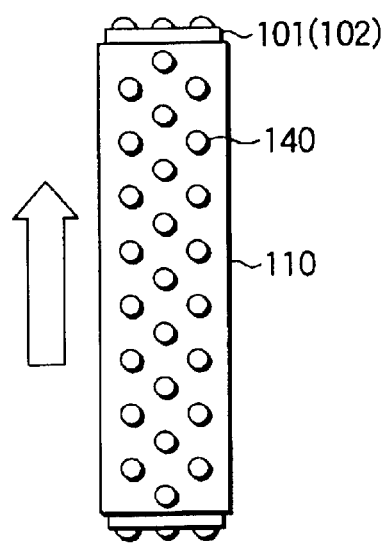
FIG. 7(b) is a diagram viewed from a direction "B" of FIG. 7(a)
Figure 7C:
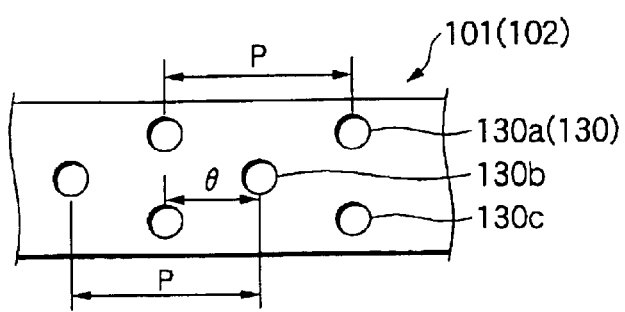
FIG. 7(c) is a diagram viewed from a direction "C" of FIG. 7(a).

In this embodiment shown in FIG. 7(a), 7(b), 7(c), the pitches of these through holes 130 along all of the columns are set to the same intervals (equi-interval) in the flat bets 101 and 102. However, the present invention is not limited thereto, but the intervals may be changed in the respective columns. Also, among the three columns of through holes, a pitch "p" of a central column of the through holes 130b is made equal to pitches "p" of both side columns of the through holes 130a and 130c. However, a phase "θ" is shifted by 180 degrees.

This phase-shift setting is intended so as to avoid destruction of through-hole portions which are caused by belt meanders (will be explained later).

Also, in this embodiment, while the plural columns of through holes 130 are formed in the flat belts 101 and 102, the plural columns of projections 140 are formed in correspondence with the above-explained through holes 130 in the pulley 110. However, these projections 140 need not be provided in correspondence with all of these through holes 130, but may be provided on at least a pulley 110 having the largest load.

As a result, the projections 140 need not be fitted to all of the columns of these through holes 130, but may be fitted only to one column among the three columns thereof. Alternatively, the pitch of these projections 140 may be made equal to a pitch larger than the through-hole pitch multiplied by an integer. As a result, the fitting specifications of the flat belts 101/102 in which the plural columns of through holes 130 are formed, and also, the fitting specifications of the several pulleys 110 around which the flat belts 101 and 102 are wound may be freely designed every use case.

Figure 8A:
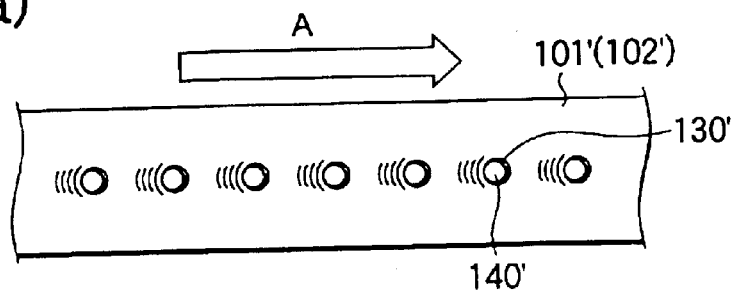
FIG. 8(a) is an explanatory diagram for showing an engagement state between through holes of flat belts and projections of pulleys in a comparison mode.
Figure 8B:
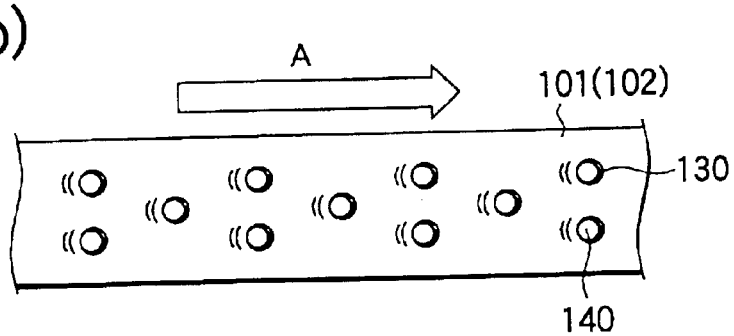
FIG. 8(b) is an explanatory diagram for showing an engagement state between through holes of flat belts and projections of pulleys in this embodiment.
Figure 8C:
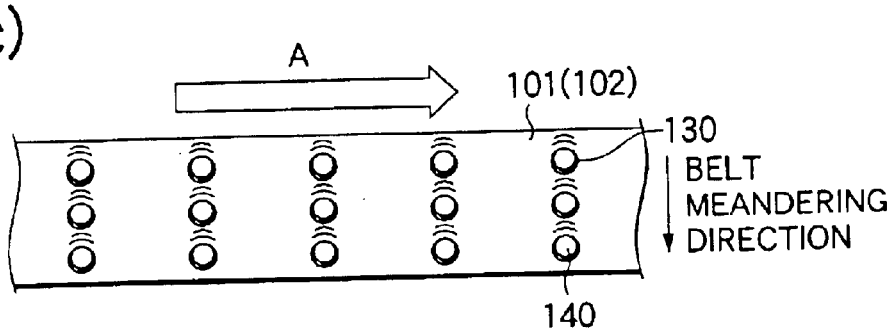
FIG. 8(c) is an explanatory diagram for showing an engagement state between through holes of flat belts and projections of through holes in a modified mode of this embodiment when the flat belt is meandered.
Figure 8D:
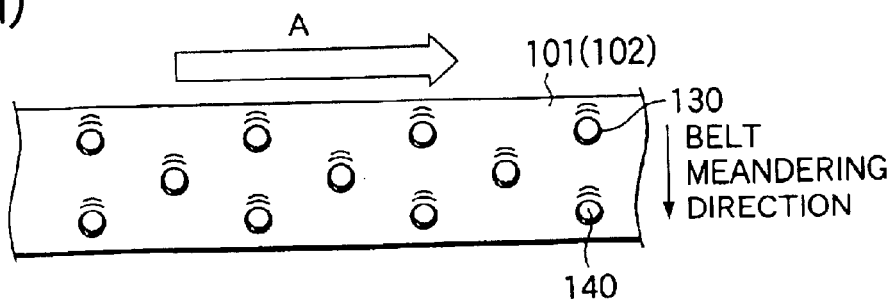
FIG. 8(d) is an explanatory diagram for showing an engagement state between through holes of flat belts and projections of through holes in this embodiment when the flat belt is meandered.

FIG. 8(a) and FIG. 8(b) shows a summary of effects with respect to the load of the structure of the image forming apparatus according to this embodiment, and FIG. 8(c) and FIG. 8(d) shows a summary of effects with regard to the belt meandering operations thereof more in detail.

FIG. 8 shows both a perforation belt moved in a circulation manner along a direction indicated by an arrow (namely, flat belt equipped with through holes) and projections which are provided on a pulley and are fitted to through holes formed in this flat bet.

FIG. 8(a) shows a drive condition in a comparison mode (flat belts 101' and 102') in which one column of through holes 130' are formed. In a case of a heavy load, as indicated in this drawing, the flat belts 101' and 102' are moved along a direction opposite to the circulation direction of the through holes 130', so that a distortion is produced at portions where these through holes 130' are engaged with the projections 140'. When a magnitude of this distortion becomes larger than, or equal to a certain magnitude, a belt portion of the through hole 130' is destroyed, so that the belt drive operation is brought into unstable drive operation.

In order to reduce adverse influences of this distortion to drive the belts under stable conditions, in this embodiment, as shown in FIG. 8(b), plural columns of through holes 130 are formed in the flat belts 101 and 102 with respect to circulation directions. As a result, a distortion occurred in a portion of one through hole 130 when the pulley 110 to which a heavy load is given is driven can be reduced, and thus, driving force can be transferred under stable condition.

FIG. 8(c) showns a modification mode in which the plural columns of through holes 130 are formed in the flat belts 101 and 102 to have the same phase condition in this embodiment.

In this case, similar effects to those of FIG. 8(b) may be achieved with respect to a load, and thus, a distortion occurred per a single hole portion of the through hole 130 may be reduced. However, under such a condition that belt meandering operations are produced, the pitches of the hole portions of the through holes 130 with respect to the meander direction are excessively narrowed, so that there is no region capable of absorbing distortions, which may readily conduct destruction of hole portions of these through holes 130.

To avoid this problem, when the belt meander direction is considered, as explained in this embodiment, it is preferable to employ a belt structure as indicated in FIG. 8(d).

To this end, in the case that widths of flat belts are made sufficiently wide, since pitches of plural columns of through holes along the meander direction is large, there is no problem even if the belt structure of FIG. 8(c) is employed. However, in the case that a compactness of an apparatus such as an image forming apparatus is required, it is preferable to employ such a belt structure shown in FIG. 8(d). As a consequence, since the belt structures as indicated in FIG. 8(b) and FIG. 8(d) are employed in this embodiment, the stable belt driving operations can be realized.

Therefore, in accordance with this embodiment, there is no risk that the hole portions of the through holes 130 formed in the flat belts 101 and 102 are destroyed, and furthermore, the driving force derived from the drive motor can be firmly transferred to the photosensitive drums 11 (11K to 11C), the first intermediate transfer drums 31a/31b, and the second intermediate transfer drum 32.

This fact is proved in an example 1 (will be discussed later).

More specifically, in the technical field of color image forming apparatus which have been currently and advantageously developed, in order to reduce electric power consumption and manufacturing cost, a drive system is required in which not only photosensitive drums, but also intermediate transfer drums and intermediate transfer belts, and furthermore, transfer rollers and charge rollers are driven by a single drive motor. There is such a trend that load torque is gradually increased, and driving force transfer members should endure this increased load torque to realize color image forming operations.

In addition, in order to reduce cost of parts, there are many possibilities that as to bearings for supporting rotation shafts of respective image carrier drums, roller bearings which have been conventionally used are replaced by slide bearings. Under such a bearing change environment, load torque would be increased by replacing these roller bearings with these slide bearings.

This embodiment can achieve very large effects even under such a requirement. This merit may be similarly achieved in the below-mentioned embodiments.

Figure 9A:
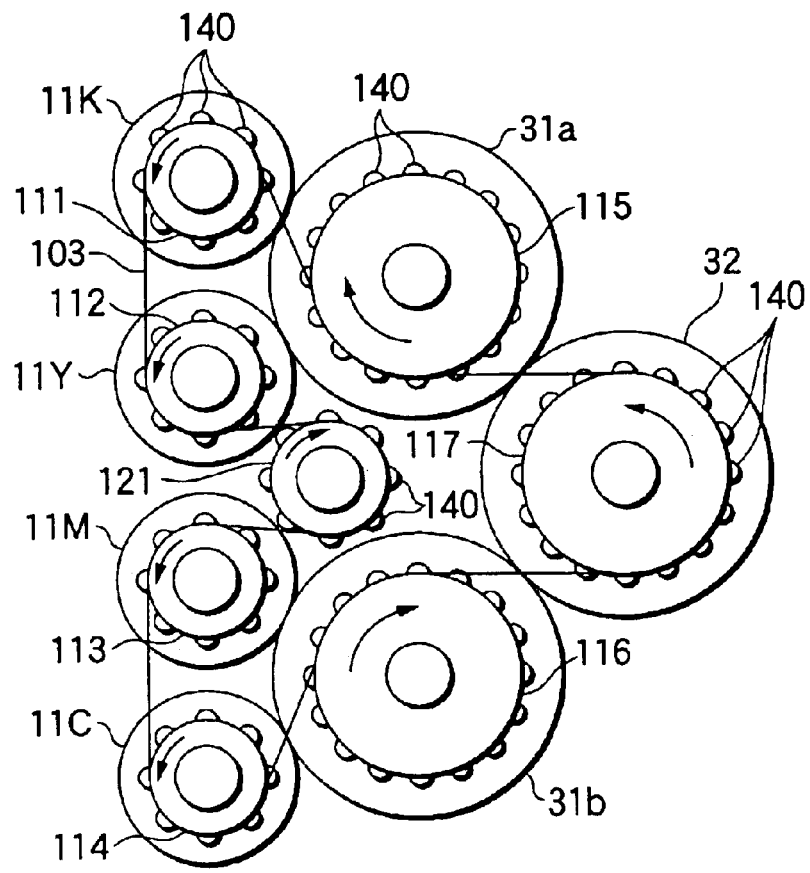
FIG. 9 is an explanatory diagram for showing a modified mode of the driving force transmission apparatus employed in the embodiment 1.
Figure 9B:
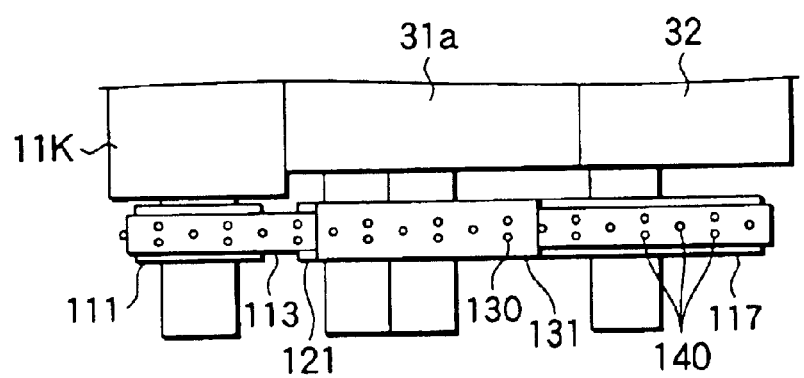

Incidentally, in this first embodiment, as the belt driving apparatus 100, such a belt driving apparatus has been employed which is constituted by the two flat belts 101 and 102, and the pulleys 110 (111 to 117, 121, 122) for hanging these flat belts. However, the present invention is not limited to this belt driving apparatus, but may be applied to another belt driving apparatus as shown in FIG. 9. That is, while this belt driving apparatus 100 is equipped with a single flat belt 103, and pulleys (namely, driven pulleys 111 to 117, and tension pulley 121) for hanging this single flat belt 103, for example, the driving force derived from the drive motor may be applied to the driven pulley coupled to the second intermediate transfer drum 32, and also this driving force may be transferred to the respective pulleys 110 via the single flat belt 103 which is hung over the respective pulleys 110 so as to drive the photosensitive drums 11 (11K to 11C), the first intermediate transfer drums 31a/31b, and the second intermediate transfer drum 32.

[Embodiment 2]

Figure 10:
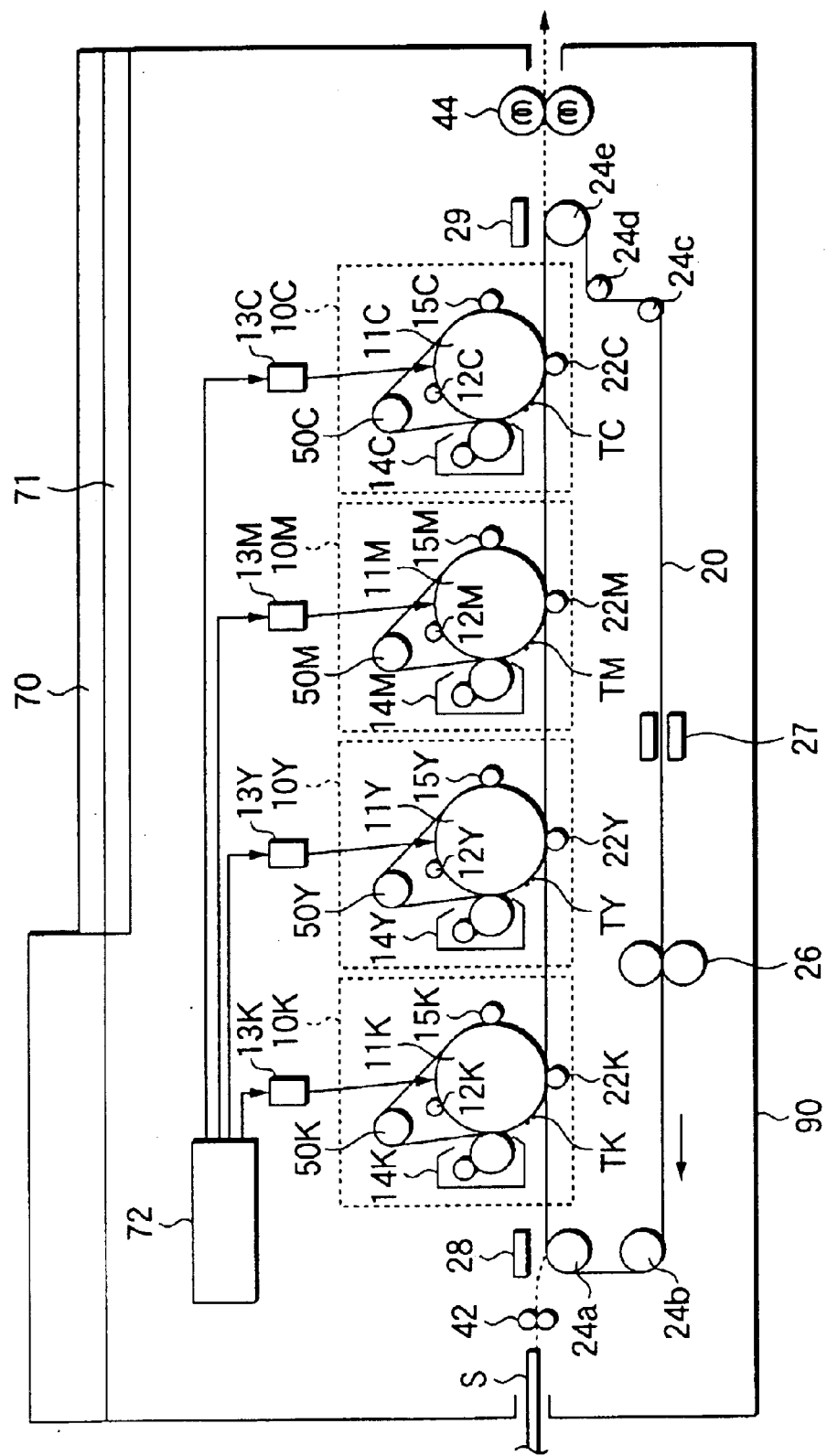
FIG. 10 is an explanatory diagram for showing an overall structure of an image forming apparatus according to an embodiment 2.

FIG. 10 is a sectional diagram for schematically representing an embodiment 2 of a copying machine (image forming apparatus) 90 to which the present invention is applied.

In this drawing, an arrangement of this copying machine 90 will now be explained, while this arrangement is subdivided into an image input system, an image forming system, and a sheet transporting system.

The image input system is provided with an original mounting base 70, an original reading apparatus 71, and an image processing apparatus 72.

The image forming system is provided with an image forming station 10, an exposing apparatus 13, two first intermediate transfer drums 31, and one second intermediate transfer drum 32. The image forming stations 10 (concretely speaking, reference numerals 10K, 10Y, 10M, 10C, namely, portions surrounded by dotted lines in this drawing) correspond to each of black, yellow, magenta, and cyan colors. The exposing apparatus 13 (concretely speaking, reference numerals 13K to 13C) expose the image forming stations 10 in response to image data supplied from the image processing apparatus 72.

In this case, the image forming stations 10 (10K to 10C) is equipped with electrophotographic devices such as a photosensitive drum 11 (concretely speaking, reference numerals 11K to 11C), a charging apparatus 12 (concretely speaking, reference numerals 12K to 12C), a developing apparatus 14 (concretely speaking, reference numerals 14K to 14C), a drum cleaner 15 (concretely speaking, reference numeral 15K to 15C), and a transfer roller 22 (concretely speaking, reference numerals 22K to 22C). The charging apparatus 12 charges the photosensitive drum 11. The developing apparatus 14 develops a latent image written on the charged photosensitive drum 11 by using the exposing apparatus 13, by using the respective color toners. The drum cleaner 15 cleans toners left on the photosensitive drum 11. The transfer roller 22 transfers an image formed on the photosensitive drum 11 to the recording sheet "S."

In particular, in this embodiment, the photosensitive drums 11 (reference numbers 11K to 11C) are driven by belt driving apparatus 50 (concretely speaking, reference numerals 50K to 50C), respectively. In the belt driving apparatus 50 (reference numerals 50K to 50C), driving force derived from a single drive motor is supplied via an entire belt driving apparatus (not shown) to the driving force transfer shafts of each of belt driving apparatus 50.

Further, the sheet transporting system is provided with a sheet transporting belt 20, and a fixing roller 44, and so on. This sheet transporting belt 20 transports a recording sheet "S" in correspondence with each of the image forming stations 10 (reference numerals 10K to 10C) and is positioned at a post stage of a register roller 42. The fixing roller 44 is provided at a post stage of this sheet transporting belt 20.

Then, in this embodiment, the sheet transporting belt 20 is tensioned and worn over a plurality of tension rollers 24 (reference numerals 24a to 24e) including at least a driving roller 24a. Around this sheet transporting belt 20, there are provided a belt cleaner 26, a belt erasing apparatus 27, a sucking electrostatic charging apparatus 28, and a stripping electrostatic charging apparatus 29. The sucking electrostatic charging apparatus 28 sucks and holds the recording sheet "S" onto the sheet transporting belt 20. The stripping electrostatic charging apparatus 29 stripes the recording sheet "S" from the sheet transporting belt 20.

Next, a description will now be made of basic full-color copying operations of such a copying machine 80.

First, when a user mounts an original to be read on the original mounting base 70, and then, instructs a full-color copying operation by using a user interface (not shown), the image reading apparatus 71 scans this original so as to optically read the content of this scanned original, and then, converts the read original content into an electric signal (image data "I"). This image data I is color-separated into a black color, a yellow color, a magenta color, and a cyan color in the image processing apparatus 72. Also, this image processing apparatus 72 performs such an image processing operation that a predetermined weighting factor in which a characteristic of a marking device/process is taken into consideration is applied to the image data "I (namely, IK, IY, IM, IC)" having these colors.

On the other hand, the photosensitive drums 11 employed within the respective image forming stations 10 are rotary-driven by a belt driving apparatus 50 (reference numerals 50K to 50C) along directions indicated by arrows as shown in this drawing. The surfaces of these photosensitive drums 11 (reference numerals 11K to 11C) are uniformly charged at a predetermined potential by the charging apparatus 12 (reference numerals 12K to 12C). Then, the respective exposing apparatus 13 (13K to 13C) expose exposure light corresponding to the respective image data I(IK to IC) onto the surfaces of the respective photosensitive drums 11 (11K to 11C) at predetermined timing, so that latent images are formed by potential differences on the surfaces of the respective photosensitive drums 11 (11K to 11C). The latent images are converted into toner images "T" (K, Y, M, C) in such a manner that the toners are electrostatically adhered onto these latent images by way of the respective developing apparatus 14 (14K to 14C).

As explained above, while the toner image T (K, Y, M, C) is formed, one sheet of the recording sheet "S" stored in a sheet tray (not shown) is picked-up by a pick-up roller 41 (not shown), and then, is transported to the register roller 42.

For instance, since the register roller 42 starts to be rotated from the stop condition up to predetermined timing, the recording sheet "S" is transferred to the sheet transporting belt 20 which is rotary-driven by a driving apparatus (not shown) along a direction denoted by an arrow of this drawing.

Incidentally, while the recording sheet "S" is transferred from the register roller 42 to the sheet transporting belt 20, electron charges are applied from the sucking electrostatic charging apparatus 28 to the sheet transporting belt 20 in such a manner that this recording sheet "S" is sucked to the sheet transporting belt 20.

Then, the toner images T (K, Y, M, C) formed on the photosensitive drums 11 (11K to 11C) are sequentially transferred from the respective photosensitive drums 11 (11K to 11C) onto the sheet transporting belt 20 by the transfer roller 22 (22K to 22C) in an electrostatic manner. In this case, the toner image T(K) is firstly transferred (primary-transferred) onto the recording sheet "S", the toner image T(Y) is transferred onto this toner image T(K), and then, the toner image T(M) is transferred onto this toner image T(Y), and furthermore, the toner image T(C) is superimposed onto this toner image T(M) in a sequential manner. As a result, a full-colored toner image T (K, Y, M, C) is formed.

Incidentally, articles such as toners which are partially left on the surfaces of the respective photosensitive drums 11 (11K to 11C) after the primary transfer operation is eliminated by drum cleaners 15 (reference numerals 15K to 15C). Also, articles such as toners which remain on the surface of the sheet transporting belt 20 is removed by the belt cleaner 26. Furthermore, potential histories which are left on the sheet transporting belt 20 is eliminated by the belt erasing apparatus 27.

Thereafter, when the recording sheet S passes through the nip portion of the fixing roller 44, while the full-colored toner image T (K, Y, M, C) is electrostatically held on the surface of this recording sheet S, this full-colored toner image T(K, Y, M, C) is fixed on this surface by receiving heat (thermal energy) and pressure given from the respective fixing rollers 44 and also effects thereof, and then, the recording sheet "S" on which the full-colored toner image has been fixed is ejected to the ejection tray 45 provided outside the copying machine 90.

In this case, when the recording paper "S" is transferred from the sheet transporting belt 20 to the fixing roller 44, such electron charges are applied by the stripping electrostatic charging apparatus 29 to the recording sheet "S", by which this recording sheet "S" is stripped from the sheet transporting belt 20.

While such a series of copying steps is defined as one cycle, this copy cycle is continuously carried out, so that full-colored images can be successively copied.

Similar to the embodiment 1, when both the flat belt equipped with plural columns of holes and the pulley equipped with projections are applied to the respective belt driving apparatus 50 (50K to 50C) and the entire belt driving apparatus, which are employed so as to drive the respective photosensitive drums 11 (11K to 11C) of the copying machine 90, both operations and effects similar to those of the embodiment 1 can be achieved.

Also, a belt driving apparatus similar to that of the embodiment 1 may be also applied to the driving apparatus of the sheet transporting belt 20. Alternatively, the belt driving apparatus similar to those of the embodiment 1 may be applied to both apparatus.

[Embodiment 3]

Any of the above-described embodiments 1 and 2 represent the belt driving apparatus applicable to the image forming apparatus. In contrast, this embodiment shows a typical mode of belt driving apparatus for widely driving a member to be driven.

A belt driving apparatus 100 related to FIG. 11(a) to FIG. 11(d) is equipped with a single flat belt 105 and tension members on which this flat belt 105 is worn. In each of FIGS. 11(a) to 11(d), as this tension member, a drive pulley 151 to which driving force derived from a drive motor (not shown) is transferred, two driven pulleys 152, 153, and also a tension pulley 154 are provided. These driven pulleys 152 and 153 are positioned adjacent to this drive pulley 151, and are coupled to the member to be driven (not shown). The tension pulley 154 is employed so as to circulate the flat belt 105.

Similar to the above-described embodiment 1, in this embodiment 3, plural columns (three columns in this example) of through holes 130 are formed in the flat belt 105 along a travel direction thereof. Also, plural columns of projections 140 are formed on either all or a portion of these pulleys 151 to 154 (in this example, the projections 140 are formed on the drive pulley 151, the driven pulleys 152 and 153). These projections 140 are located in correspondence with the through holes 130 of the flat belt 105. Since the projection 140 of the pulley 110 are engaged to the through holes 130 of the flat belt 105, the stable driving operation of the flat belt 105 is realized.

In accordance with this embodiment 3, similar to the embodiment 1, even in such a case that heavy loads are given to the driven pulleys 152 and 153 to which the member to be driven is coupled, and also the flat belt 105 tries to meander, the driving force can be firmly transferred to the member to be driven, while the operation force given to the hole portions of the through hole 130 of the flat belt 105 is distributed.

Figure 11A:
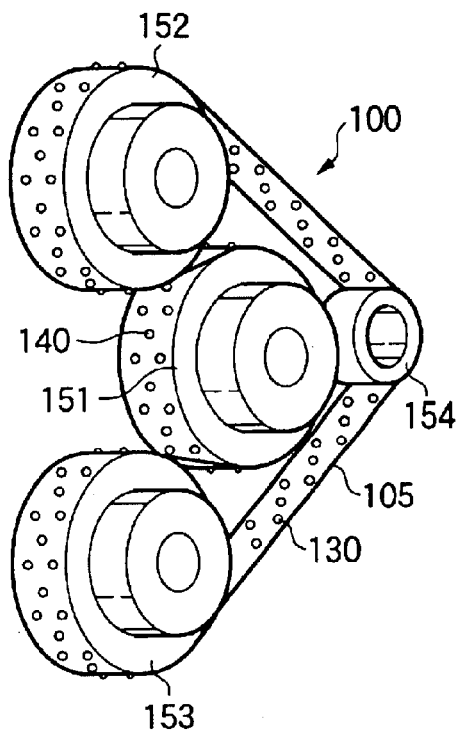
FIG. 11(a) to FIG. 11(b) are explanatory diagrams for showing both a driving force transmission apparatus and modified embodiments thereof, according to an embodiment 3.
Figure 11B:
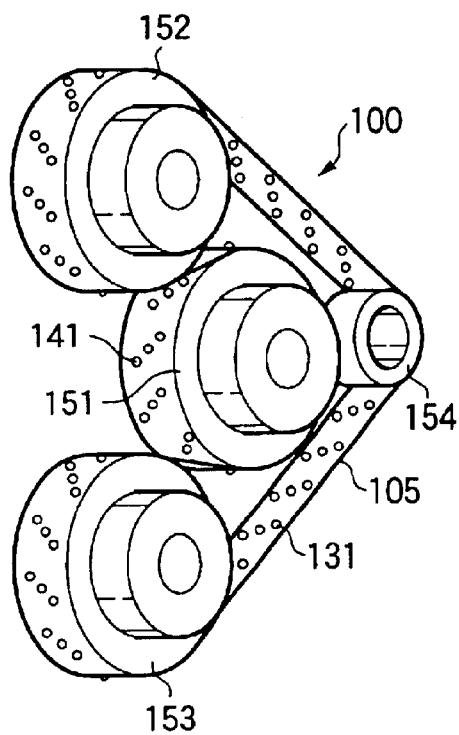

Also, the belt driving apparatus 100 related to FIG. 11(b) is constructed of 3-column through hole type in such a manner that plural columns of through holes 131 are arrayed in an oblique manner along a belt meander direction (namely, width direction located perpendicular to travel direction), while these plural through holes 131 are not overlapped with each other. Furthermore, projections 141 corresponding to the above-explained through holes 131 are provided on either all, or a portion of pulleys 151 to 154. As a result, this belt driving apparatus 100 can strength rigidity with respect to the belt width direction, as compared with the rigidity of the belt driving apparatus shown in FIG. 11(a).

Figure 11C:
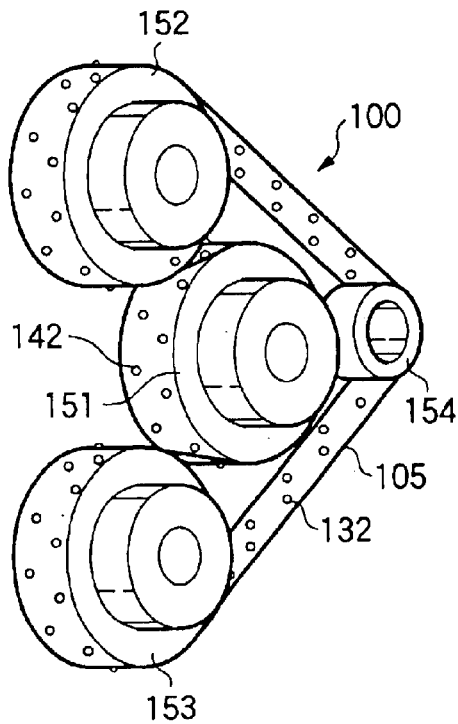

Further, the belt driving apparatus 100 related to FIG. 11(c) is constructed of 2-column through hole type in such a manner that plural columns of through holes 132 are arrayed in an oblique manner along a belt meander direction (namely, width direction located perpendicular to travel direction), while these plural through holes 132 are not overlapped with each other. Furthermore, projections 142 corresponding to the above-explained through holes 132 are provided on either all, or a portion of pulleys 151 to 154.

Figure 11D:
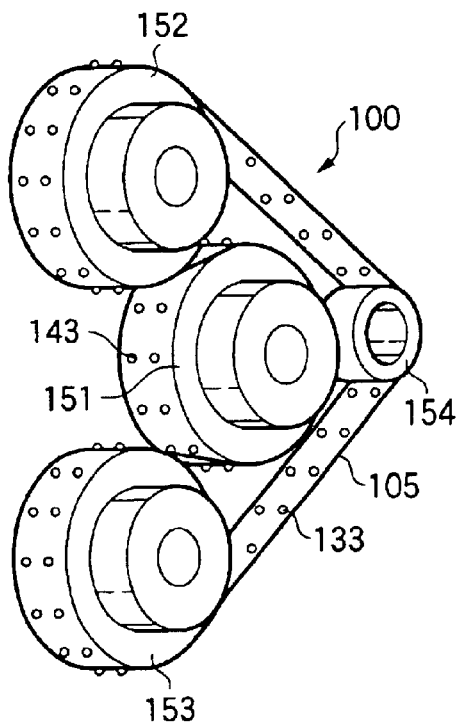

Moreover, the belt driving apparatus 100 related to FIG. 11(d) is constructed of 2-column through hole type in such a manner that plural columns of through holes 133 are arrayed in a parallel manner along a belt meander direction (namely, width direction located perpendicular to travel direction). Furthermore, projections 143 corresponding to the above-explained through holes 133 are provided on either all, or a portion of pulleys 151 to 154.

This mode of the belt driving apparatus 100 shown in FIG. 11(d) is not suitably operated in such a case that a large belt meandering operation occurs. However, when a load is given to both the driven pulleys 152 and 153, the two columns of through holes 133 are engaged with the projections at the same time to drive the belt 105. As a consequence, when a heavy load is driven by the belt 105, the array of these through holes and projections of this belt driving apparatus 100 may achieve advantages.

Therefore, several modes of these belt driving apparatus according to this embodiment are combined with each other in accordance with a drive specification to be applied, and whereby the belt can be driven under stable condition, and further, higher rotation fluctuation preventing precision can be achieved.

[Embodiment 4]

Figure 12:
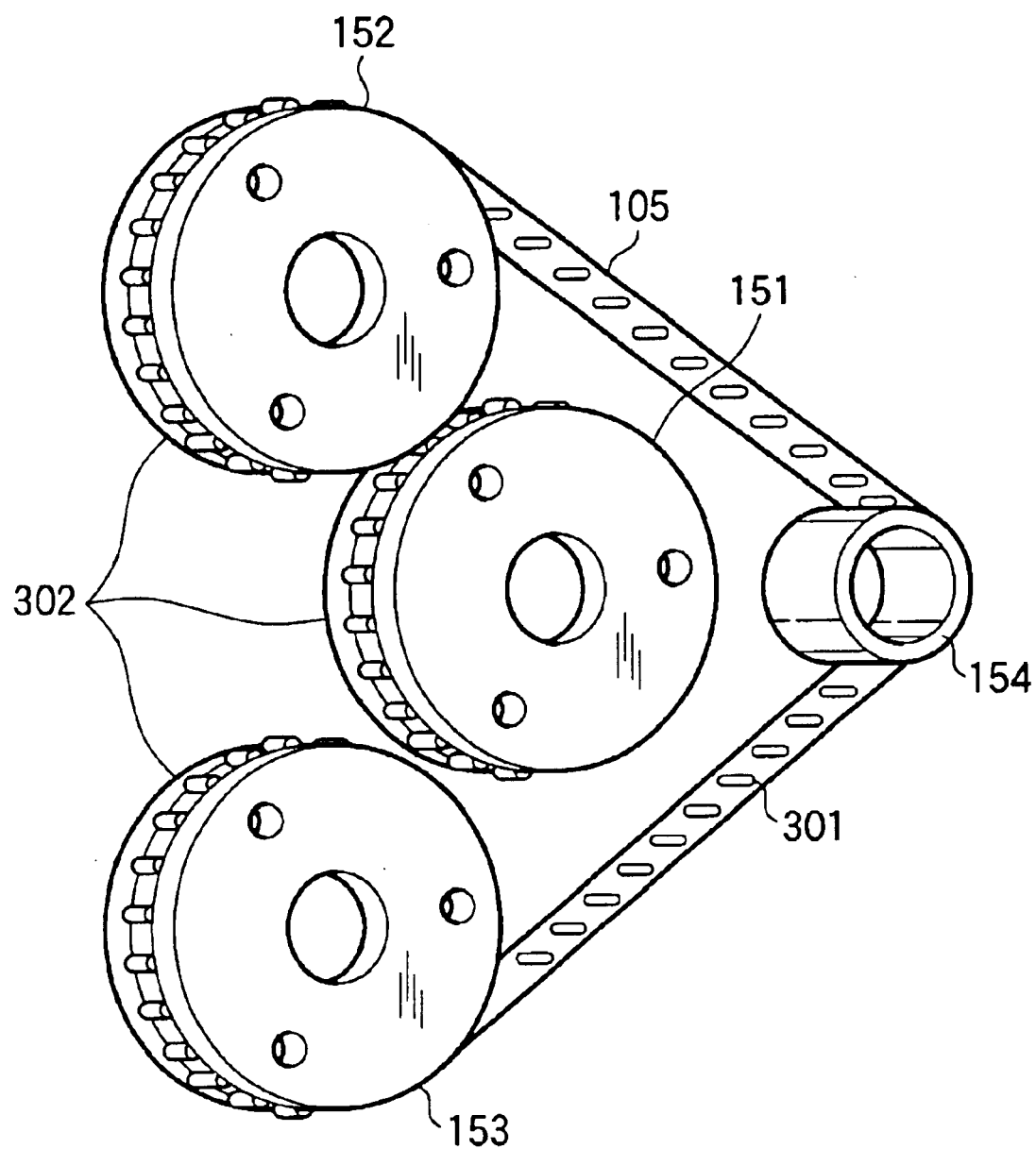
FIG. 12 is an explanatory diagram for showing a driving force transmission apparatus according to an embodiment 4.

FIG. 12 illustratively shows an embodiment 4 of a belt driving apparatus 100 to which the present invention is applied.

This belt driving apparatus 100 shown in FIG. 12 is arranged in a substantially similar manner to that of the embodiment 3, namely, is provided with a single flat belt 105, and a tensions member (i.e., drive pulley 151, driven pulleys 152 and 153, and tension pulley 154) over which this flat belt 105 is tensioned. Different from the above-described embodiment 3, in this belt drive apparatus 100, through holes having elongated-hole shapes 301 are formed in the single flat belt 105, as shown in this drawing. These elongated-hole shaped through holes 301 are elongated along a width direction perpendicular to a travel direction of the flat belt 105. In either all or a portion of these pulleys 151 to 154 (in this example, all pulleys), pillar-shaped projections 302 having semi-circular cylinder shapes are provided in correspondence with the above-described elongated-hole shaped through holes 301. The pulley-shaped projections 302 formed on the respective pulleys 151 to 154 are engaged with the elongated-hole shaped through holes 301 formed in the flat belt 105, and whereby it is realized to drive the flat belt 105 under stable condition.

Next, the pulleys 151 to 154 and the flat 105 employed in this embodiment will be given in detail.

Figure 13A:
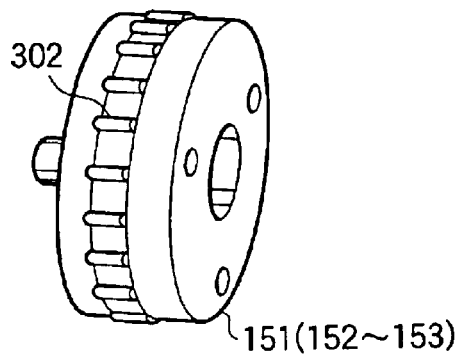
FIG. 13(a) is an explanatory diagram for showing a tension roller employed in this embodiment.

In this embodiment 4, an shown in FIG. 13(a), the pulleys 151 to 153 are provided with the pillar-shaped projections 302 having the semi-circular cylinder shapes around peripheral surfaces of these pulleys. For instance, as shown in 13(c), in these pulleys 151 to 153, pin engagement grooves 312 having semi-circular cylinder shapes are formed in a properly-selected interval within a circumferartial surface of a pulley main body 311, circular cylinder-shaped pins 313 are pressed and inserted into the respective pin engagement proves 312 from an outer side of the pulley main body 311 along a radial direction thereof, so that the pillar-shaped projections 302 are formed, and this pulley main body 311 is sandwiched by two holding disks 314 and 315, and the pulley main body 311 is fixed by using a fastening member 316 such as a screw.

Figure 13B:
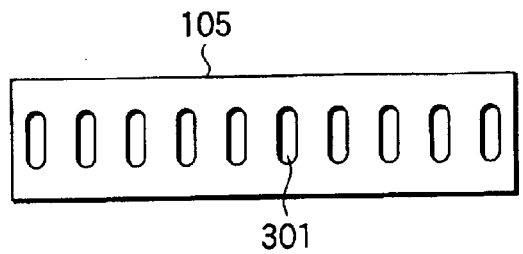
FIG. 13(b) is an explanatory diagram for showing a shape of a flat belt employed in this embodiment.

Also, as represented in FIG. 13(b), the flat belt 105 is equipped with the elongated-hole shaped through hole 301. This elongated-hole shaped through hole 301 can be realized in such a way that the flat belt 105 made of, for example, an SUS material is etched away to become an elongated-hole shape. Alternatively, this elongated-hole shaped through hole 301 may be realized by employing a press working, and/or a discharging working.

With respect to a relationship between the elongated-hole shaped through hole 301 and the pillar-shaped projection 302, in view of such a point that a fitting characteristic between both the members 301 and 302 is maintained under good condition, the dimension of the elongated-hole shaped through hole 301 is preferably made slightly larger than the dimension of the pillar-shaped projection 302. Then, in order to maintain the fitting characteristic between both the members 301/302 under better condition, both edge portions of the elongated-hole shaped through hole 301 along the longitudinal direction thereof are preferably made in arc shapes, and on the other hand, both end portions of the pillar-shaped projections 302 along the longitudinal direction also are preferably formed in smooth curved-plane shapes.

Figure 14:
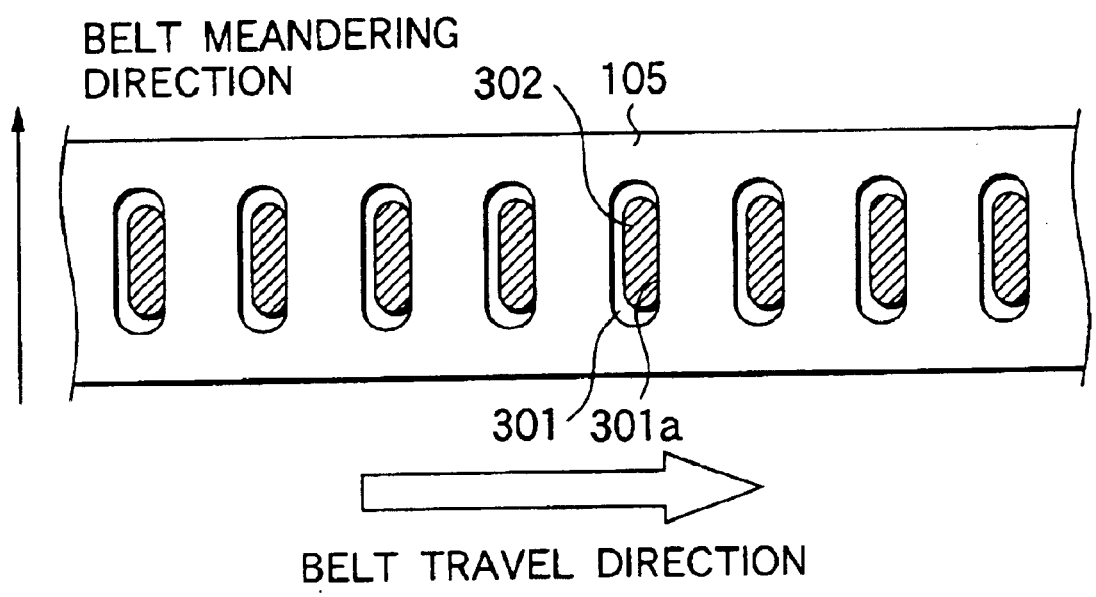
FIG. 14 is an explanatory diagram for showing operations of the driving force transmission apparatus according to this embodiment.

As a consequence, in accordance with this embodiment, as indicated in FIG. 14, even when a heavy load is given to the driven pulleys 152 and 153 to which the member to be driven is coupled, the driving force can be firmly transferred to the member to be driven, while the operation force applied to the hole portions of the elongated-hole shaped through holes 301 of the flat belt 105 is received by a straight line portion 301a of this through hole 301.

Therefore, the structure of the belt driving apparatus according to this embodiment is employed, and whereby the stable belt driving operation can be carried out, and further, the higher rotation fluctuation preventing precision can be achieved.

[Embodiment 5]

FIG. 5 shows a main portion of a belt diving apparatus of an embodiment 5 to which the present invention is applied.

Figure 15:
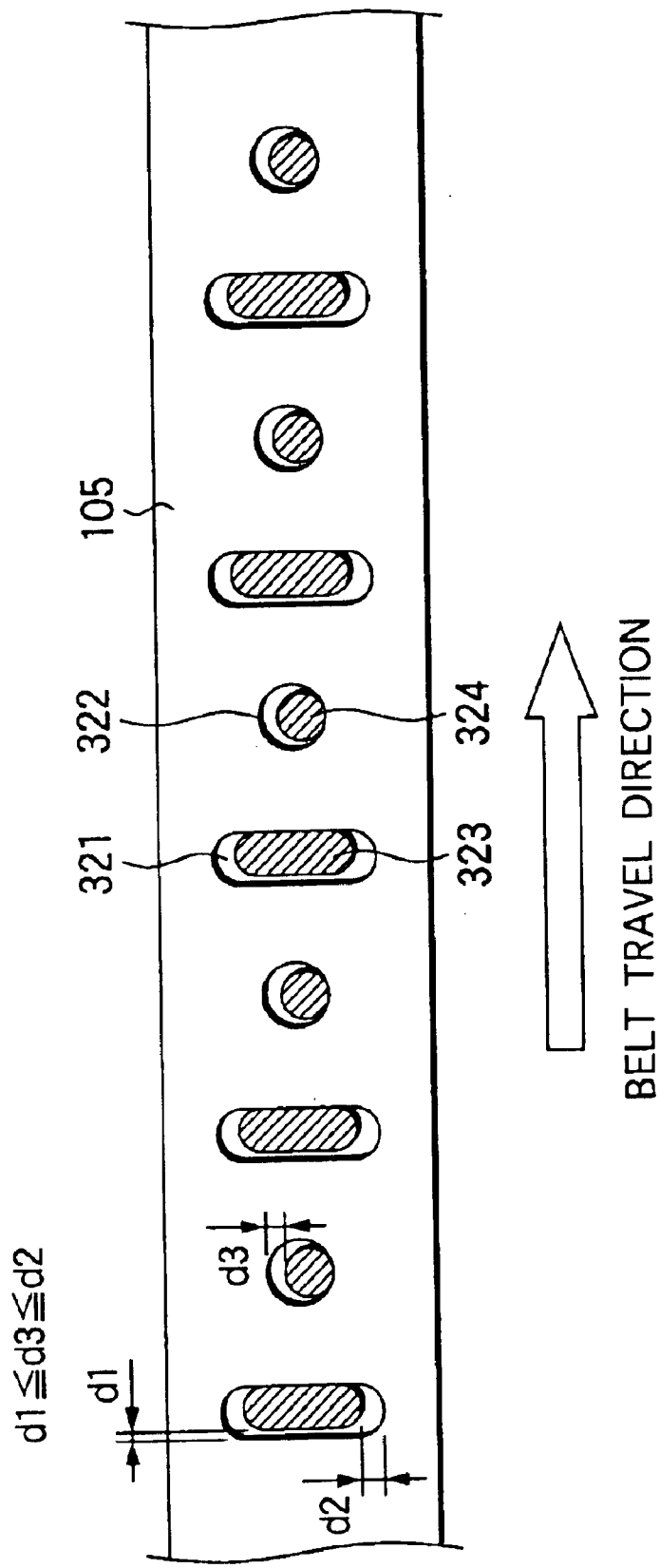
FIG. 15 is an explanatory diagram for showing a major portion of a driving force transmission apparatus according to an embodiment 5.

As indicated in FIG. 15, in this embodiment 5, both elongated-hole shaped through holes 321 extended along a direction perpendicular to a travel direction of this flat belt 105 and circular-shaped through holes 322 are alternatively formed in a predetermined pitch interval in a flat belt 105. Also, both pillar-shaped projections 323 having semi-circular cylinder shapes and semi-spherical shaped projections 324 are formed on either all or a portion of pulleys 151 to 154 in correspondence with the above-described through holes 321 and 322. The respective projections 323 and 324 of the pulleys 151 to 154 are fitted to the respective through holes 321 and 322 formed in the flat belt 105, and whereby the stable driving operation of the flat belt 105 can be realized.

Figure 13C:
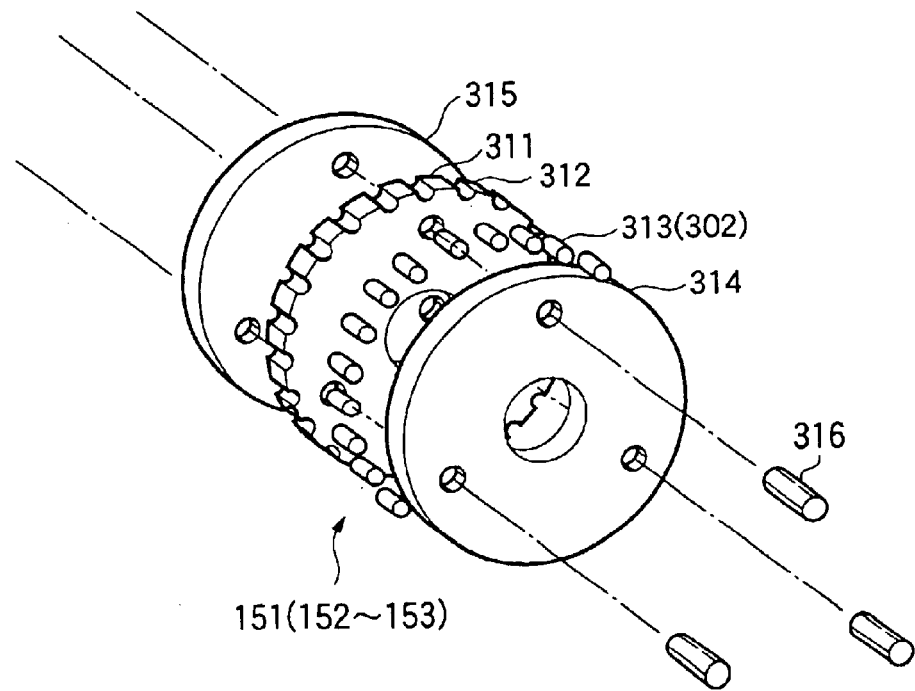
FIG. 13(c) is an exploded perspective view of this tension roller.

For instance, in the embodiment 4, when the pulleys 151 to 154 are manufactured by way of the method indicated in FIG. 13(c), since the pillar-shaped projection 302 is sandwiched by the two holding disks 315 and 316, it is preferable to employ the circular cylinder pin 313, which constitutes the pillar-shaped projection 302, having a shorter width than the width of the central pulley main body 311 sandwiched by these holding disks.

However, if the manufactured pillar-shaped projection 302 having the semi-circular cylinder shape owns a fluctuation with respect to the positions along the axial directions of the pulleys 151 to 154, in such a case that the flat belt 105 is driven in the meander manner, then only one piece of these elongated-hole shaped through holes 301 restricts the meandering drive of this flat belt 105 in the worst case. As a result, there is a risk that large operation force is applied to this elongated-hole shaped through hole 301.

As indicated in FIG. 15, in accordance with this embodiment, the arrangement of the belt driving members is set in such a manner that a relationship of "$d1 \leq d3 \leq d2$" can be satisfied based upon the following assumptions. That is, a space between an edge portion of the pillar-shaped projection 323 and an edge portion of the elongated-hole shaped through hole 321 along the travel direction of the flat belt 105 is assumed as "d1"; another space between an edge portion of the pillar-shaped projection 323 and an edge portion of the elongated-hole shaped through hole 321 along the width direction of the flat belt 105 is assumed as "d2";

and also, another space between an edge portion of the semi-spherical shaped projection 324 and an edge portion of the circular-shaped through hole 322 along the width direction of the flat belt 105 is assumed as "d3".

When the structural members of the belt driving apparatus are set to satisfy such a dimensional relationship, a function separate type belt driving apparatus can be realized. That is, the meandering operation of the flat belt 105 is restricted by the semi-spherical shaped projections 324 and the circular-shaped through holes 322 of this flat belt 105. Also, in relation to the operation force caused by the load torque, the flat belt 105 is driven/transported under such a condition that this operation force is distributed by the pillar-shaped projections 323 having the semi-circular cylinder shapes and the elongated-hole shaped through hole 324 of the flat belt 105.

As a consequence, similar to the embodiment 4, even when the heavy load is given to the driven pulleys 152 and 153 to which the member to be driven is coupled, and also, the flat belt 105 is driven in the meandering manner, the driving force can be firmly transferred to the member to be driven, while the operation force given to the through holes (elongated-hole shaped through holes 321 and circular-shaped through holes 322) formed in the flat belt 105 is distributed. This operation force is produced by both the force exerted along the travel direction of the flat belt, which is caused by the load, and the force caused by the meandering drive of the flat belt 105 along the direction substantially perpendicular to the travel direction.

[Embodiment 6]

Figure 16A:
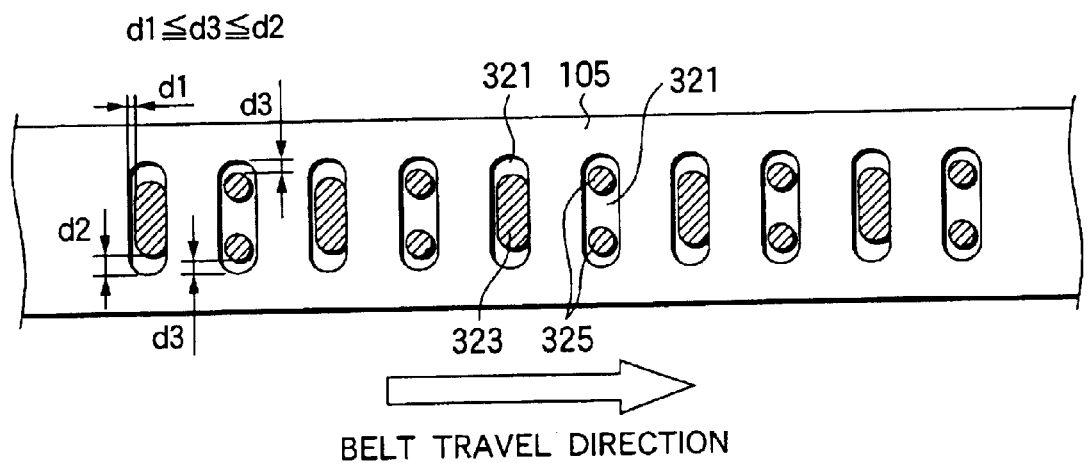
FIG. 16(a) is an explanatory diagram for showing a major portion of a driving force transmission apparatus according to an embodiment 6.

FIG. 16 shows an embodiment 6 of a belt driving apparatus to which the present invention is applied.

In this drawing, the belt driving apparatus according to this embodiment is arranged in a substantially similar manner to that of the above-described embodiment 5. Different from the embodiment 5, in this belt driving apparatus, elongated-hole shaped through holes 321 extended along a direction perpendicular to the travel direction of this flat belt 105 are formed in the flat belt 105 in a predetermined pitch interval, as shown in this drawing, and both pillar-shaped projections 323 having semi-circular cylinder shapes and semi-spherical shaped projections 325 having pair structures are alternately provided in a predetermined pitch interval (the predetermined pitch interval is set to be twice longer than the pitch interval of the elongated-hole shaped through holes 321 in this example) in either all or a portion of pulleys 151 to 154 in correspondence with the above-explained elongated-hole shaped through holes 321, and the respective projections 323 and 325 of the pulleys 151 to 154 are fitted to the respective through holes 321 formed in the flat belt 105, whereby the stable driving operation of the flat belt 105 can be realized.

As a consequence, as indicated in FIG. 6(a), in accordance with this embodiment, the arrangement of the belt driving members is set in such a manner that a relationship of "d1≦d3≦d2" can be satisfied based upon the following assumptions. That is, a space between an edge portion of the pillar-shaped projection 323 and an edge portion of the elongated-hole shaped through hole 321 along the travel direction of the flat belt 105 is assumed as "d1"; another space between an edge portion of the pillar-shaped projection 323 and an edge portion of the elongated-hole shaped through hole 321 along the width direction of the flat belt 105 is assumed as "d2"; and also, another space between an edge portion of the semi-spherical shaped projection 325 and an edge portion of the circular-shaped through hole 322 along the width direction of the flat belt 105 is assumed as "d3".

Figure 16B:
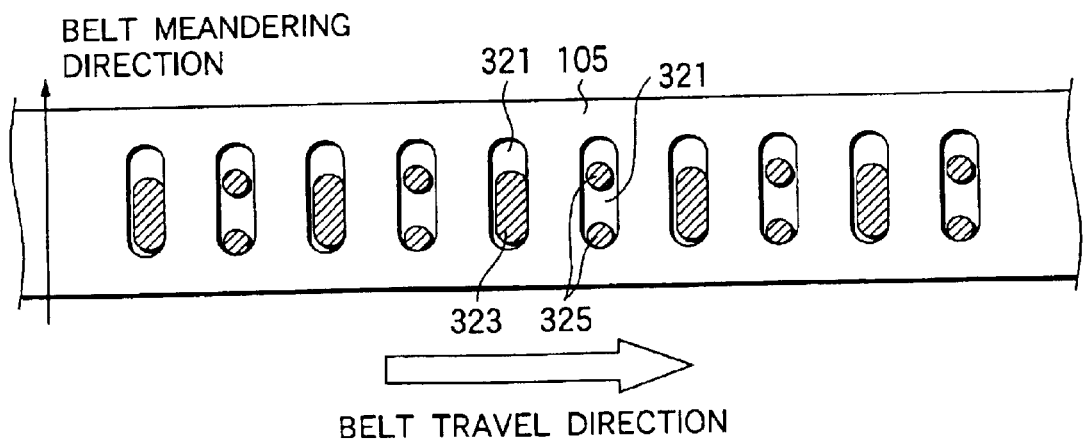
FIG. 16(b) is an explanatory diagram for showing operation of this driving force transmission apparatus.

When the structural members of the belt driving apparatus are set to satisfy such a dimensional relationship as shown in FIG. 16(b), a function separate type belt driving apparatus can be realized. That is, the meandering operation of the flat belt 105 is restricted by the semi-spherical shaped projections 325 and the elongated-hole through holes 321 of this flat belt 105. Also, as to the operation force caused by the load torque, the flat belt 105 is driven/transported under such a condition that this operation force is distributed by the pillar-shaped projections 323 having the semi-circular cylinder shapes and the elongated-hole shaped through hole 324 of the flat belt 105.

Accordingly, in the embodiment mode, even when the heavy load is given to the driven pulleys 152 and 153 to which the member to be driven is coupled and the flat belt 105 is driven in the meandering manner, the driving force can be firmly transferred to the member to be driven, while the operation force (the force exerted along the travel direction of the flat belt, which is caused by the load, and the force caused by the meandering drive of the flat belt 105 along the direction substantially perpendicular to the travel direction) given to the hole portions of the elongated-hole shaped through holes 321 formed in the flat belt 105 is distributed.

In particular, in this embodiment, since the elongated-hole shaped through holes 321 are formed in the predetermined pitch interval in the flat belt 105, the patterns of the various sorts of projections which are constituted on the side of the pulleys are increased the degree of freedom.

For example, the pillar-shaped projections 301 (321) may be formed every arranging pitch interval of the elongated-hole shaped through holes 321. Also, both the pillar-shaped projections 323 and the pair-constructed semi-spherical shaped projections 325 may be formed in such an interval twice longer than the arranging pitch of the elongated-hole shaped through hole 321. Both the pillar-shaped projections 323 and the pair-constructed semi-spherical shaped projections 325 may be formed in a ratio of 2:1 with respect to the elongated-hole shaped through holes 321.

[Embodiment 7]

Figure 17:
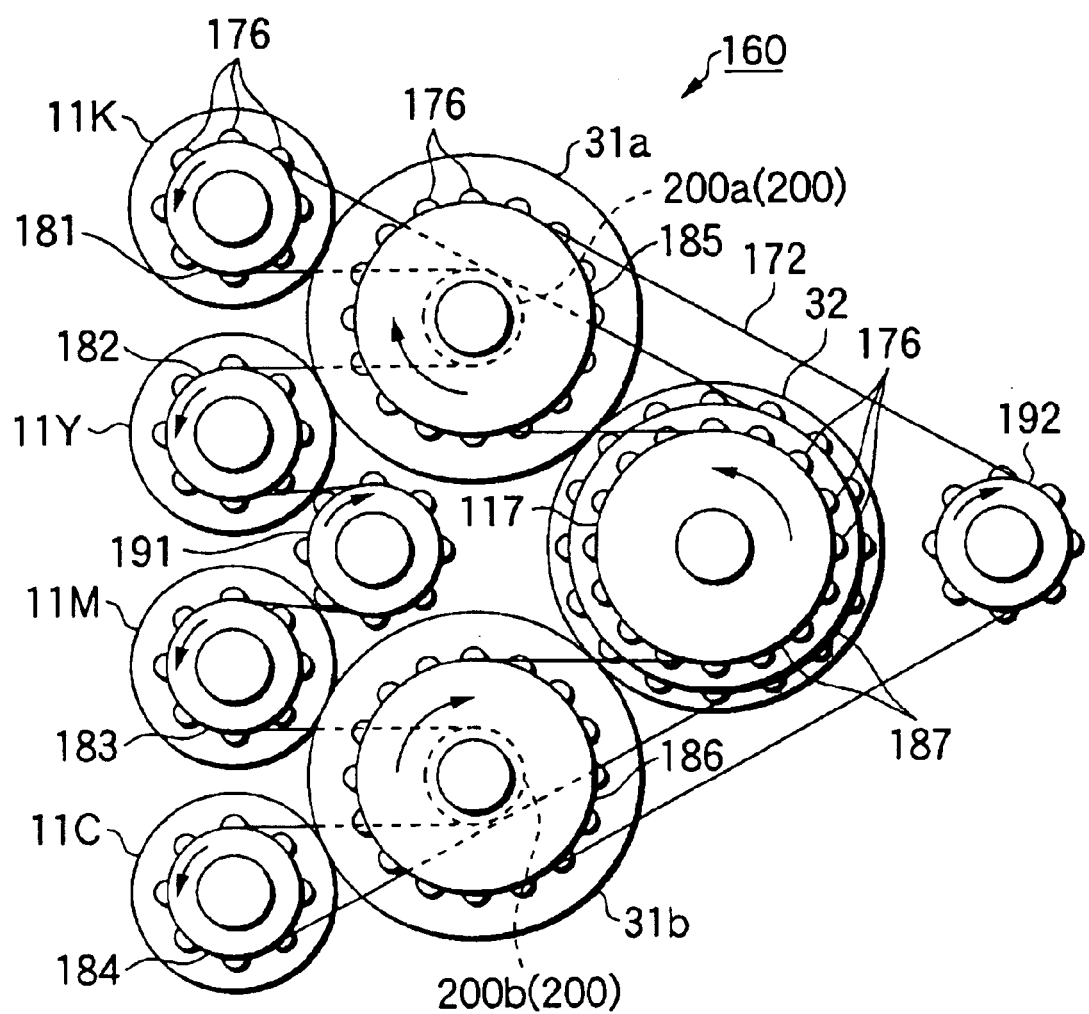
FIG. 17 is an explanatory diagram for showing a major portion of an image forming apparatus according to an embodiment 7.

FIG. 17 shows a belt driving apparatus which is applied to a copying machine (image forming apparatus) 80 of an embodiment 7 to which the present invention is applied.

In this drawing, a basic arrangement of the copying machine 80 is substantially similar to that of the embodiment 1, and is equipped with four photosensitive drums 11 (reference numerals 11K to 11C), two first intermediate transfer drums 31a and 31b, and a second intermediate transfer drum 32. However, an construction of a belt driving apparatus 160 employed in this embodiment 7 is different from that of the embodiment 1. Incidentally, the same, or similar reference numerals shown in the embodiment 1 will be employed as those for denoting the same, or similar structural elements of this embodiment 7, and therefore, detailed explanations thereof are omitted.

Figure 18:
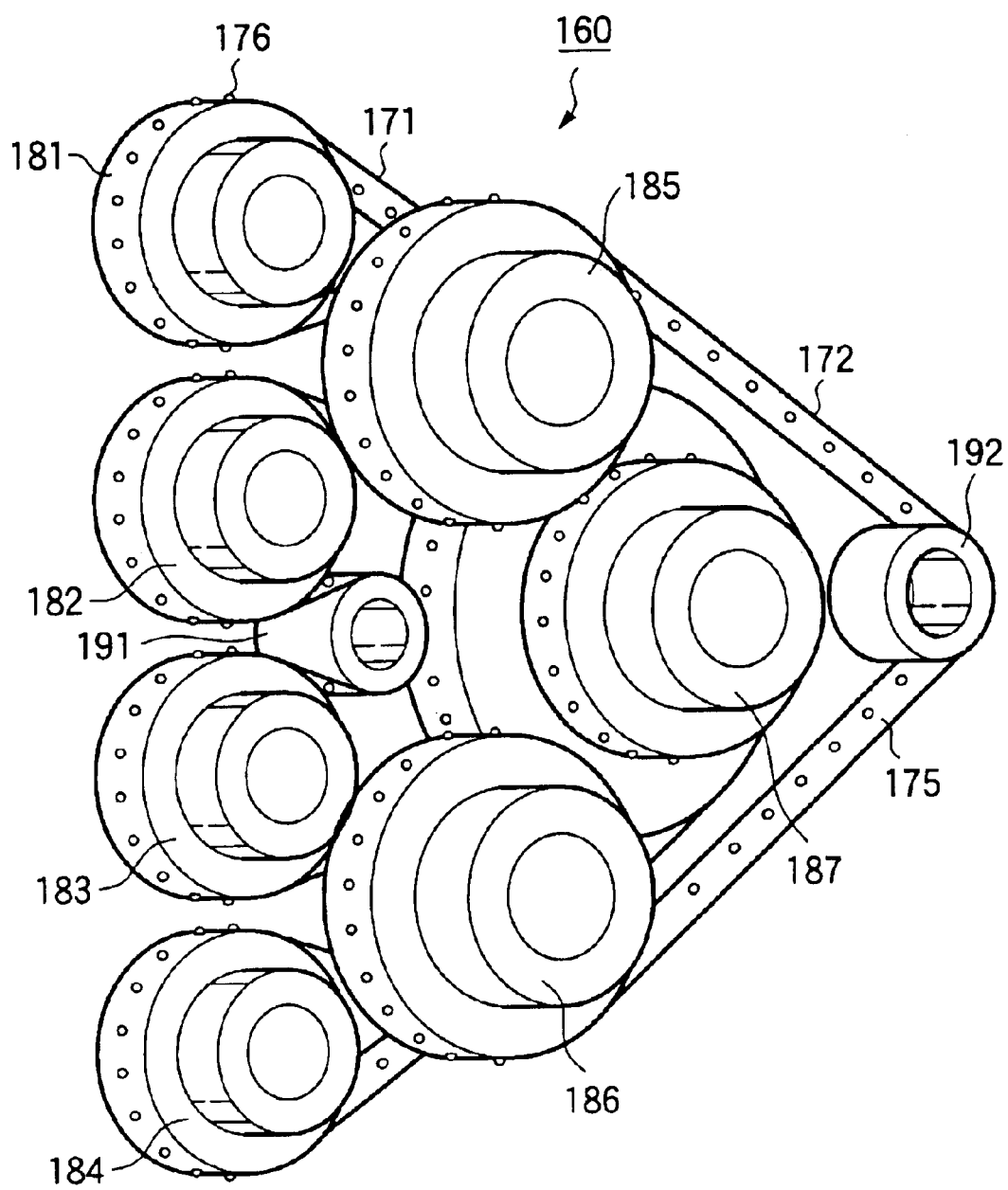
FIG. 18 is a perspective explanatory diagram for showing an outline of a driving force transmission apparatus employed in the embodiment 7.
Figure 19:
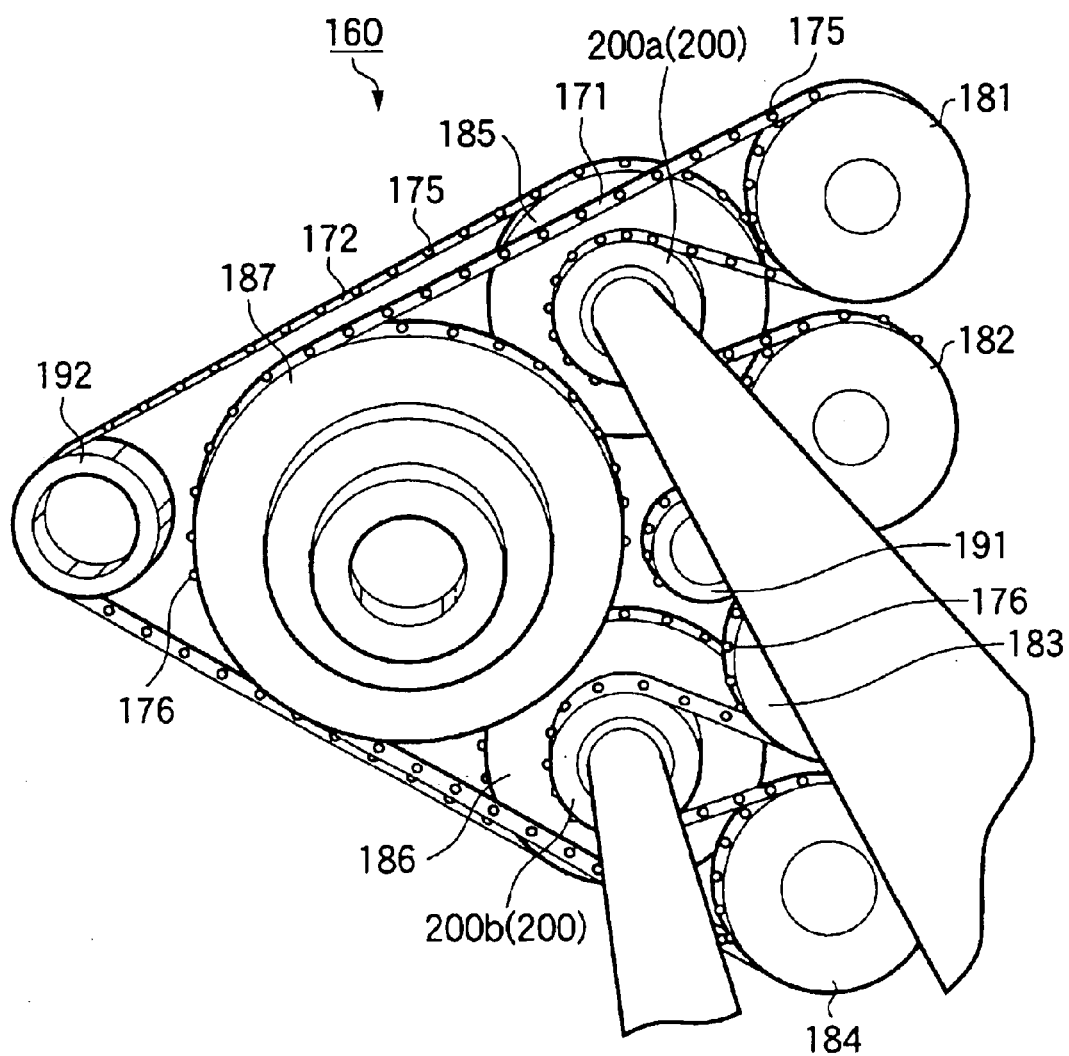
FIG. 19 is a perspective explanatory diagram for showing the driving force transmission apparatus employed in the embodiment 7, as viewed from a rear surface side of FIG. 18.

In this embodiment, as shown in FIG. 17 to FIG. 19, the belt driving apparatus 160 drives respective photosensitive drums 11 (11K to 11C), first intermediate transfer drums 31a, 31b, and a second intermediate transfer drum 32. This belt driving apparatus 160 is provided with two flat belts 171, 172, and various sorts of tension members on which these flat belts 171 and 172 are tensioned or worn.

In this case, as the above-described tension member, there are driven (driven) pulleys 181 to 187, and tension pulleys 191 and 192 for circulating the respective flat belts 171 and 172. The driven pulleys 181 to 187 are mounted on one ends of the respective photosensitive drums 11 (11K to 11C), the first intermediate transfer drums 31a and 31b, and the second intermediate transfer drum 32 along axial directions thereof, respectively.

Incidentally, in this embodiment, the driven pulley 187 mounted on the second intermediate transfer drum 32 has a two-stage belt hanging plane over which the first flat belt 171 and the second flat belt 172 are hung.

Then, the first flat belt 171 is hung over the tension pulley 191, the driven pulleys 181 to 184 which are mounted on the axes of the respective photosensitive drums 11 (11K to 11C), and the driven pulley 117 which is mounted on the axis of the second intermediate transfer drum 32.

On the other hand, the second flat belt 172 is hung over the tension pulley 192, the driven pulleys 185 and 186 which are mounted on the axes of the first intermediate drums 31a and 31b, and the driven pulley 187 which is mounted on the axis of the second intermediate transfer drum 32.

Incidentally, pulley shafts (not shown) provided with the pulleys 181 to 187, 191, and 192, respectively, are supported by respective slide bearings which are provided on side surfaces of the copying machine 80, and therefore, these pulley shafts can be freely rotated. Also, in this example, among the two-stage belt hanging planes of the driven pulley 187, the diameter of the belt hanging plane provided for the first flat belt 171 is formed larger than the diameter of the belt hanging plane provided for the second flat belt 172.

More specifically, in accordance to this embodiment, while the flat belts 171 and 172 are equipped with, for instance, one column of through holes 175 along travel directions of these flat belts 171 and 172, respectively, projections 176 corresponding to the above-described through holes 175 are provided on either all of a portion of the pulleys over which these flat belts 171 and 172 are hung. These flat belts are constituted by such a perforation belt capable of transferring driving force by fitting these projections 176 to the through holes 175.

In this case, as to a way how to apply power derived from a driving motor (drive source not shown) to which shaft, it is preferable that the driving force derived from the driving motor is entered to a pulley shaft, whose winding angles between flat belts and pulleys are large.

In this embodiment, for instance, the driving force derived from the driving motor may be entered to the shaft of the second intermediate transfer drum 32. Alternatively, the driving force derived from the driving motor may be entered into another pulley shaft.

Also, with respect to materials of these flat belts and materials of these pulleys, any materials may be properly selected in a similar manner to that of the embodiment 1. For example, as these flat belts, metal materials such as stainless steel, nickel, and titanium are preferably used in view of durability and processing precision etc. On the other hand, as materials of these pulleys, metal materials such as stainless steel, aluminum, and carbon steel are preferably used in view of durability and processing precision etc.

In particular, in this embodiment, free rotating members 200 (concretely speaking, reference numerals 200a and 200b) are mounted on the driven pulleys 185 and 186 of the first intermediate transfer drums 31a and 31b. The free rotating members 200 are freely rotatable and are positioned in a coaxial manner to shafts of these driven pulleys 185 and 186. The flat belt 171 is worn via the free rotating member 200a over the driven pulleys 181 and 182 of the photosensitive drums 11 (11K, 11Y) On the other hand, the flat belt 171 is worn via the free rotating member 200b over the driven pulleys 183 and 184 of the photosensitive drums 11 (11M, 11C).

Figure 20A:
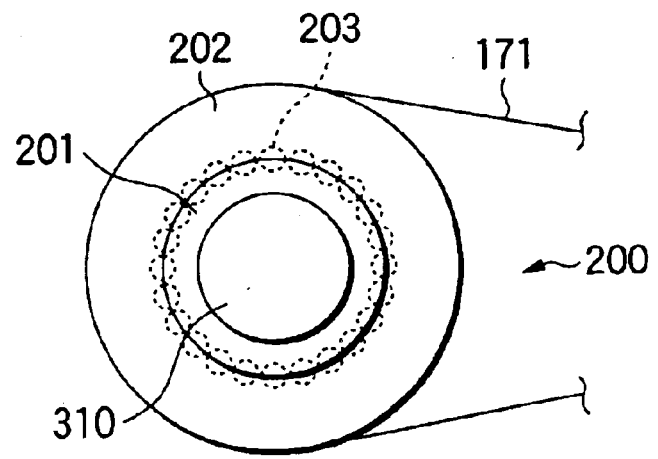
FIG. 20(a) is an explanatory diagram for showing a concrete example of a free rotating member.

In this case, as the free rotating members 200, various sorts of members may be freely selected, for instance, a collar is selectable if these selected members are freely rotatable with respect to the shafts of the driven pulleys. In this example, for example, as illustrated in FIG. 20(a), a ball bearing is employed. This ball bearing is constituted by an inner ring case 201 and an outer ring case 202. The inner ring case 201 is inserted under pressure and coupled to the shafts of the above-explained driven pulleys 185 and 186. The outer ring case 202 is rotatably provided via a ball 203 on the outer side of the inner ring case 201.

Also, the free rotating members 200 may preferably restrict the positions of the first intermediate transfer drums 31a and 31b with respect to the axial direction of the rotary shaft 310.

When the above-described free rotating members 200 has the degree of freedom along the axial direction, this may cause the meandering operations of the flat belts 171 and 172 to occur. For example, in a case that a flat belt equipped with holes such as a perforation belt is used, either the projections 176 formed on the driven pulleys 181 and 182 provided for the photosensitive drums 11 (namely, drums 11K and 11Y in this example) or the projections 176 formed on the driven pulleys 183 and 184 provided for the photosensitive drums 11 (namely, drums 11M and 11C in this example) are rubbed with the through holes 175 formed in the flat belts 171 and 172, so that the hole portions of the through holes 175 is easy to destroy. The driven pulleys 181 and 182 are located on the upper stream side of the free rotating members 200, whereas the driven pulleys 183 and 184 are located on the lower stream side thereof.

Figure 20B:
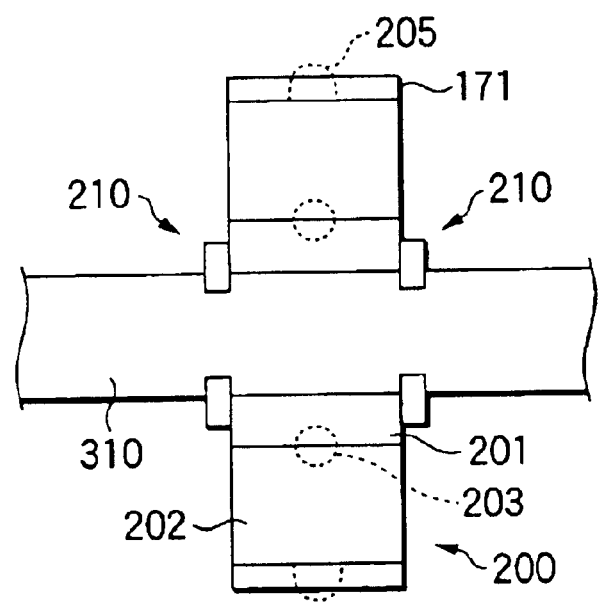
FIG. 20(b) is an explanatory diagram for showing an example of position restrictions with respect to an axial direction of the free rotating member.

In this case, as the axial direction restriction of the free rotating member 200, as shown in FIG. 20(b), for example, a position restricting member 210 such as an E-ring and an O-ring may be provided on both sides, or one side of this free rotating member 200. In this example, the position restricting members 210 are provided on both sides of the free rotating member 200.

Also, in this embodiment, the flat belts 171 and 172 are worn over the peripheral planes of the free rotating members 200. As indicated by a virtual line of FIG. 20(b), it is preferable that while projections 205 are provided on the peripheral planes of the free rotating member 200 (in this case, peripheral plane of outer ring case 202) in correspondence with the through holes 175 of the flat belts 171 and 172, the positional restriction is carried out with respect to the axial directions between the free rotating member 200 and the flat belts 171 and 172.

Next, a description will be given on operations of the belt driving apparatus of the image forming apparatus according to this embodiment.

In this embodiment, when driving force derived from a drive motor is entered to the rotation shaft of the second intermediate transfer drum 32, the driven pulley 187 of this second intermediate transfer drum 32 is rotated, so that the driving force is transferred via the second flat belt 172, the driven pulleys 185 and 186, and the tension pulley 192 to the first intermediate transfer drums 31a and 31b.

On the other hand, when the driven pulley 187 of the second intermediate transfer drum 32 is rotated, the driving force is transferred via the first flat belt 171, the driven pulleys 181 to 184, the tension pulley 192, and the free rotating members 200 (namely, members 200a and 200b) to the respective photosensitive drums 11 (namely, drums 11K to 11C).

At this time, the first flat belt 171 is worn via the free rotating member 200a, the tension pulley 191, and the rotating member 200b over the driven pulleys 181 to 184, which are located adjacent to the respective photosensitive drums 11 at a winding angle larger than or equal to approximately 180 degrees.

Under this condition, since the winding regions between the first flat belt 171 and the respective driven pulleys 181 to 184 are increased, not only transferring the driving force applied to the driven pulleys 181 to 184 is stable, but also since the force exerted to the hole portions of the through holes 175 is distributed, which is caused by fitting the through holes 175 of the first flat belt 171 to the projections 176 of the driven pulleys 181 to 184, the destruction of the hole portions of the through holes 175, which is caused by that local stress is applied to the hole portions of the through holes 175, can be advantageously avoided.

Particularly, in this example, although the rotation shaft direction of the first intermediate transfer drums 31a and 31b is reversed with respect to the rotation direction of the free rotating member 200, since the free rotating member 200 can be freely rotated with respect to the rotation shafts of the first intermediate transfer drums 31a and 31b, movement of the first flat belt 171 is not deteriorated.

Assuming now that the free rotating member 200 is not employed, the first flat belt 171 is directly worn on the rotation shafts of the first intermediate transfer drums 31a and 31b. However, in this assumption case, both a load and a driving load given to the flat belt 171 are increased and the damage of the first flat belt 171 caused by this friction would be increased, thus to be undesirable.

In addition, since the free rotating members 200 use the rotation shafts of the first intermediate transfer drums 31a and 31b as the supporting members, the exclusively-used tension pulley supporting member is not required. Also, the installation space of the free rotating members 200 is not unnecessarily enlarged.

Figure 21:
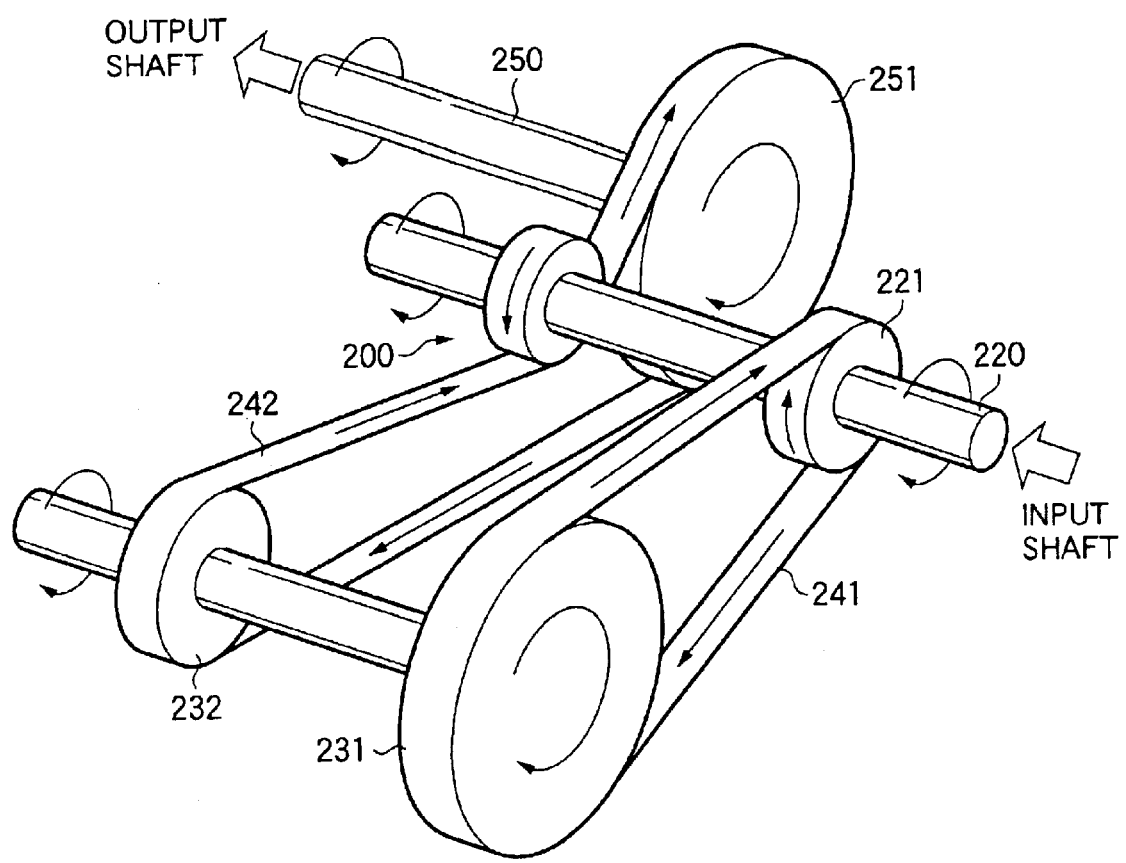
FIG. 21 is an explanatory diagram for showing a modified mode of a driving force transmission apparatus employed in the embodiment 7.

The belt driving apparatus 160 according to the embodiment is not limited only to the above-explained structures, but also this design of the belt driving apparatus 160 may be changed as shown in, for example, FIG. 21.

The belt driving apparatus 160 shown in FIG. 21 utilizes a mode with employment of a speed reduction mechanism.

In this drawing, the speed reduction mechanism is that driving force derived from a drive motor (not shown) is entered into a shaft 220 by which a drive pulley 221 is rotatably supported, a rotation speed is reduced by way of a belt transmission, and the driving force is transferred to an output axis.

In this case, a rotation shaft of a driven pulley 231 and a rotation shaft of a driven pulley 232 are common. A first flat belt 241 is worn over a drive pulley 221 which accepts input power supplied from the drive motor and is worn over the driven pulley 231. On the other hand, a second flat belt 242 is worn between the driven pulley 232 and another driven pulley 251 provided at an output shaft 250.

In such a reduction mechanism, in a case that a heavy load is given to the output shaft 250, a belt tensile load given to the first flat belt 241 is different from a belt tensile load given to the second flat belt 242. The second flat belt 242 receives larger tensile load force. As a result, there is a risk that such a winding angle which is sufficient in the first flat belt 241 in view of slips may be insufficient in the second flat belt 242.

Under such a circumstance, in a case that the winding angle of the second flat belt 242 which is worn around the driven pulley 251 is increased, as shown in FIG. 21, the rotation shaft (input shaft) 220 of the driving pulley 221 is provided with the free rotating member 200, which is freely rotatable and is positioned in a coaxial manner to this rotation angle 220. The second flat belt 242 is wounded with respect to this free rotating member 200, and whereby the winding angles of the second flat belt 242 with respect to the driven pulley 232 and the driven pulley 251 increases, while such an extra tension pulley supporting member is not provided and also the space is not required.

Incidentally, as apparently from the foregoing descriptions, the belt driving apparatus 160 (namely, mode using free rotating members 200) of this embodiment may be applied to the belt driving apparatus of the image forming apparatus according to the embodiment 2.

[Embodiment 8]

Figure 22A:
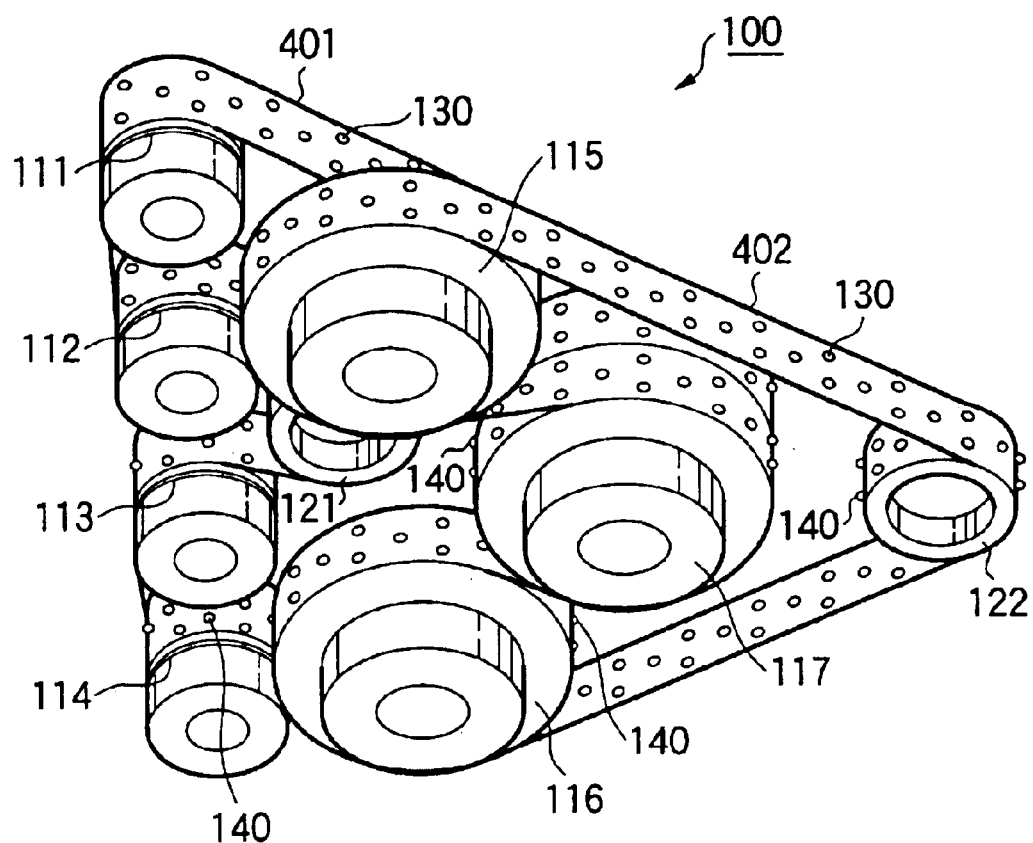
FIG. 22(a) is an explanatory diagram for showing a driving force transmission apparatus according to an embodiment 8.

FIG. 22(a) shows an embodiment 8 of a belt driving apparatus to which the present invention is applied.

The belt driving apparatus 100 according to this embodiment, as well as is arranged in a substantially similar to that of the embodiment 1. The belt driving apparatus 100 drives the respective photosensitive drums 11 (11K to 11C), the first intermediate transfer drums 31a, 31b, and the second intermediate transfer drum 32. This belt driving apparatus 100 is provided with two flat belts 401 and 402 and various sorts of tension members on which these flat belts 401 and 402 are tensioned or worn.

In this case, as the above-described tension member, there are driven pulleys 111 to 117 and tension pulleys 121 and 122 for circulating the respective flat belts 401 and 402. The driven pulleys 111 to 117 are mounted on one ends of the photosensitive drums 11 (11K to 11C), the first intermediate transfer drums 31a and 31b, and the second intermediate transfer drum 32 along axial directions thereof, respectively.

Incidentally, in this embodiment, the driven pulley 117 mounted on the second intermediate transfer drum 32 has a two-stage belt hanging plane over which the first flat belt 401 and the second flat belt 402 are hung, respectively.

Figure 22B:
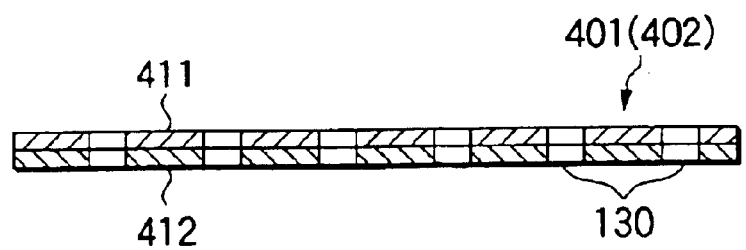
FIG. 22(b) is an explanatory diagram for showing a structure of a flat belt employed in this embodiment.

In particular, as shown in FIG. 22(b), the flat belts 401 and 402 employed in this embodiment are manufactured in such a manner that portions of two belt members 411 and 412 are fixed and are superimposed with each other.

Then, in this embodiment, plural columns of through holes 130 formed in the flat belts 401 and 402 are arranged, and plural columns of pulley projections 140 are arranged. However this embodiment is not limited to these arrangements. Alternatively, the shapes of these through holes, the arrays of these through holes, the shapes of the pulley projections, and the arrays of the pulley projections may be freely designed.

Next, a detailed description will now be given on an engagement (meshing) condition between the flat belts 401 and 402 and the pulley projections 140 in the belt driving apparatus 100 according to this embodiment.

Figure 23A:
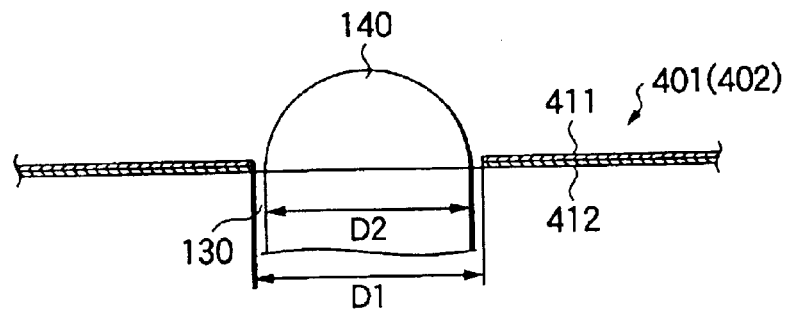
FIG. 23(a) is an explanatory diagram for showing a portion near through holes of the driving force transmission apparatus according to this embodiment.

For instance, as represented in FIG. 23(a), an engagement between the flat belts 401/402 and the pulley 111 and the like in which load torque is produced is made in contact with one side of a through hole 130.

Since clearances D1 and D2 are provided in the dimensions of the through hole 130 and of the pulley projection 140, the through holes 130 formed in the flat belts 401 and 402 are made in contact with the projections 140 of the pulley 111 and the like along a depression (tensile) direction due to the load.

Figure 23B:
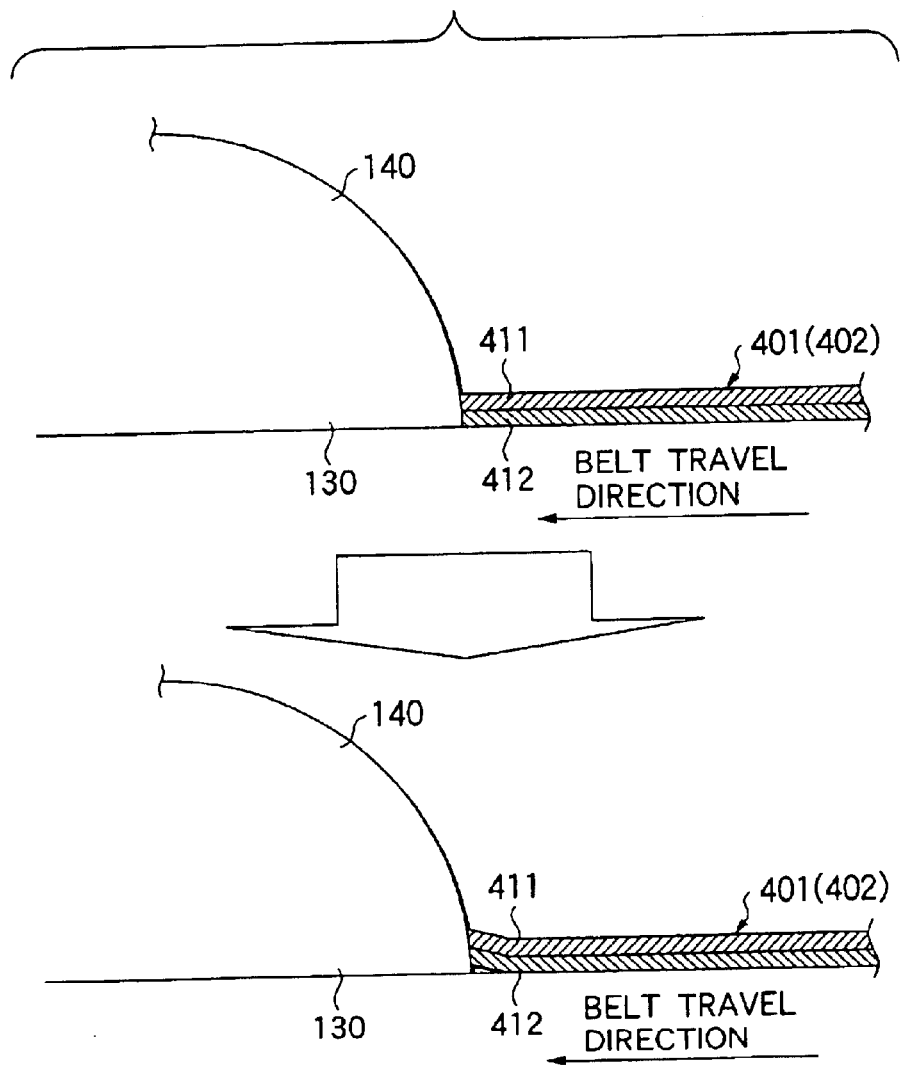
FIG. 23(b) is an explanatory diagram for showing operations of the driving force transmission apparatus according to this embodiment.

In accordance with this embodiment, as shown in FIG. 23(b), since two sheets of the belt materials 411 and 412 are overlapped with each other in order to double the thickness of the flat belts 401 and 402, deformation of the hole portions of the through holes 130, which is caused by the engagement, can be suppressed.

Incidentally, as to the flat belts 401 and 402 of this embodiment, since two sheets of the belt members 411 and 412 are overlapped with each other in such a manner that these flat belts can be independently deformed in expansion/depression manners, the bending rigidity of these flat belts 401 and 402 is substantially equal to that of a single belt member, so that these flat belts 401 and 402 can be wound on the pulley 111 and the like under stable conditions.

Figure 24:
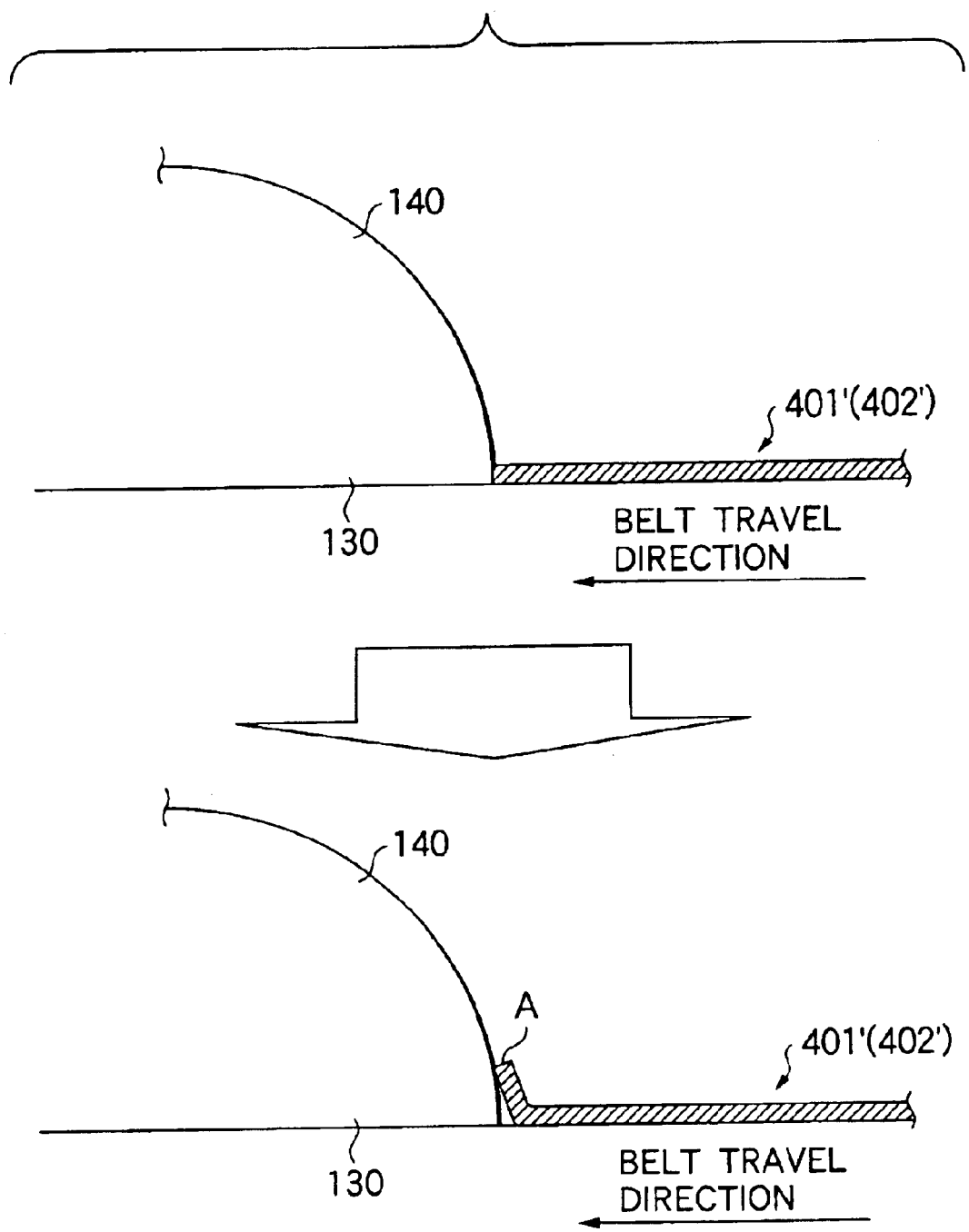
FIG. 24 is an explanatory diagram for showing operations of a driving force transmission apparatus according to a comparison mode.

On the other hand, as to flat belts 401' and 402' made of one sheet of a belt member, as indicated in FIG. 24, in such a case that a strength of a hole portion of a through hole 130 cannot endure a magnitude of load torque, this hole portion of the through hole 130 is deformed in such a manner that this hole portion rides over the projection 140 of the pulley 111 and the like. Then, when the deformed hole portions of the through holes 130 formed in the flat belts 401' and 402' are separated from the pulley 111 and the like, this deformation is recovered.

However, in the case that the magnitude of this deformation excessively becomes large, the hole portions of the through holes 130 formed in the flat belts 401' and 402' are plastic-deformed, as indicated by symbol "A" in FIG. 24. Then, after subsequent engagement, the deformed hole portions of the through holes 130, which are not recovered, are engaged with the pulley projections 140. As a result, rotation amounts transferred to the pulley 111 and the like are fluctuated. Also, since the deformation/recovery operations are repeatedly carried out during the belt drive operation, the strengths of the hole portions of these through holes 130 formed in the flat belts 401' and 402' are gradually lowered. In the worst case, there is such a risk that a crack is produced in the hole portions of the through hole 130, and thus, these flat belts are destroyed.

Figure 25:
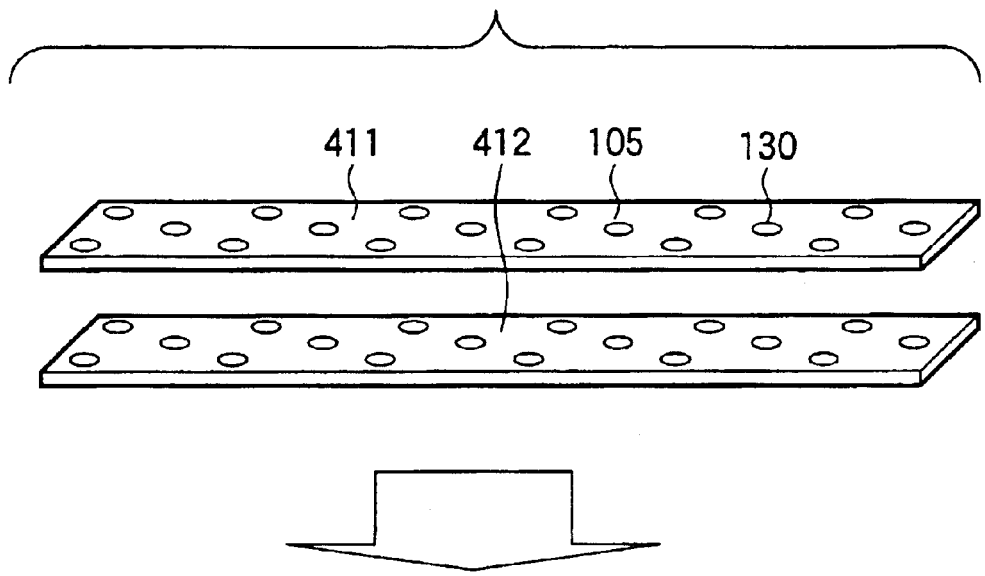
FIG. 25 is an explanatory diagram for representing a manufacturing method of a flat belt employed in this embodiment.
Figure 25:
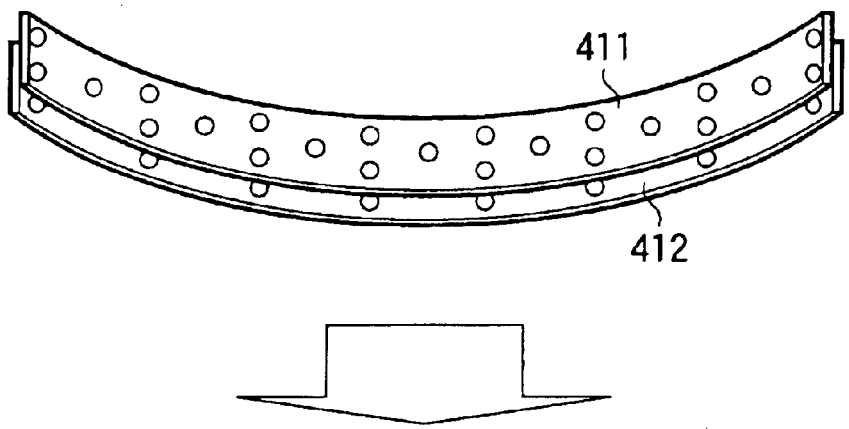
Figure 25:
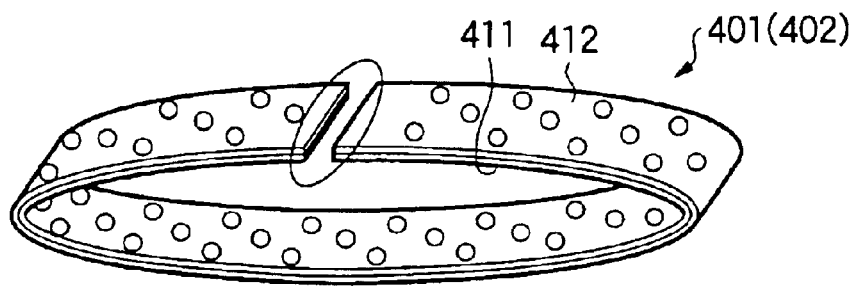

Also, in this embodiment, FIG. 25 shows a manufacturing example of the above-described flat belts 401 and 402.

This example shows such an example that after two sheets of belt materials 411 and 412 are overlapped with each other so as to align edge portions thereof, these aligned edge portions are coupled to each other by way of welding process and the like.

In this case, in order to adjust a positional relationship between these two belt members 411 and 412, or in order to prevent deterioration of the effects achieved in this embodiment in such a case that the meandering directions of these flat belts 401 and 402 are different from each other, the welding process and the like are carried out to couple these edge portions.

However, in such a case that the widths of the flat belts 401 and 402 are short, since a difference between peripheral lengths of both sides of these flat belts 401 and 402 can be made small, there is no fluctuation in meandering directions which occur due to the difference between the peripheral lengths. As a consequence, there is a rare case that the two sheets of belt members 411 and 412 are meandered along different directions. In substantially all cases, since the flat belts are meandered by inclining pulleys, the two sheets of belt members 411 and 412 worn on the same pulley will be meandered along the same direction.

In such a case, the two sheets of belt members 411 and 412 can be independently used, while the edge portions of these belt members are not coupled to each other. Incidentally, since the positional shifts of the through holes 130 must be avoided, at least a portion of these through holes 130 must be fixed.

In the example shown in FIG. 25, the sheet-shaped belt members 411 and 412 are overlapped, while the lengths of these two sheets are adjusted and the pitches of the through holes thereof are adjusted. Then, both the edge portions of these belt members 411 and 412 abut against each other, and are welded at the same time. As a result, the two sheets of belt members 411 and 412 can be coupled to each other at the welding portion.

To avoid such a possibility that a stepped portion is produced in the welding portion, as illustrated in this drawing, it is preferable to conduct butt welding. Also, although only one portions of these belt members are welded in this example, a plurality of portions thereof may be welded. Furthermore, instead of welding, the two sheets of belt members 411 and 412 may be coupled to each other by employing adhesive agent.

Figure 26:
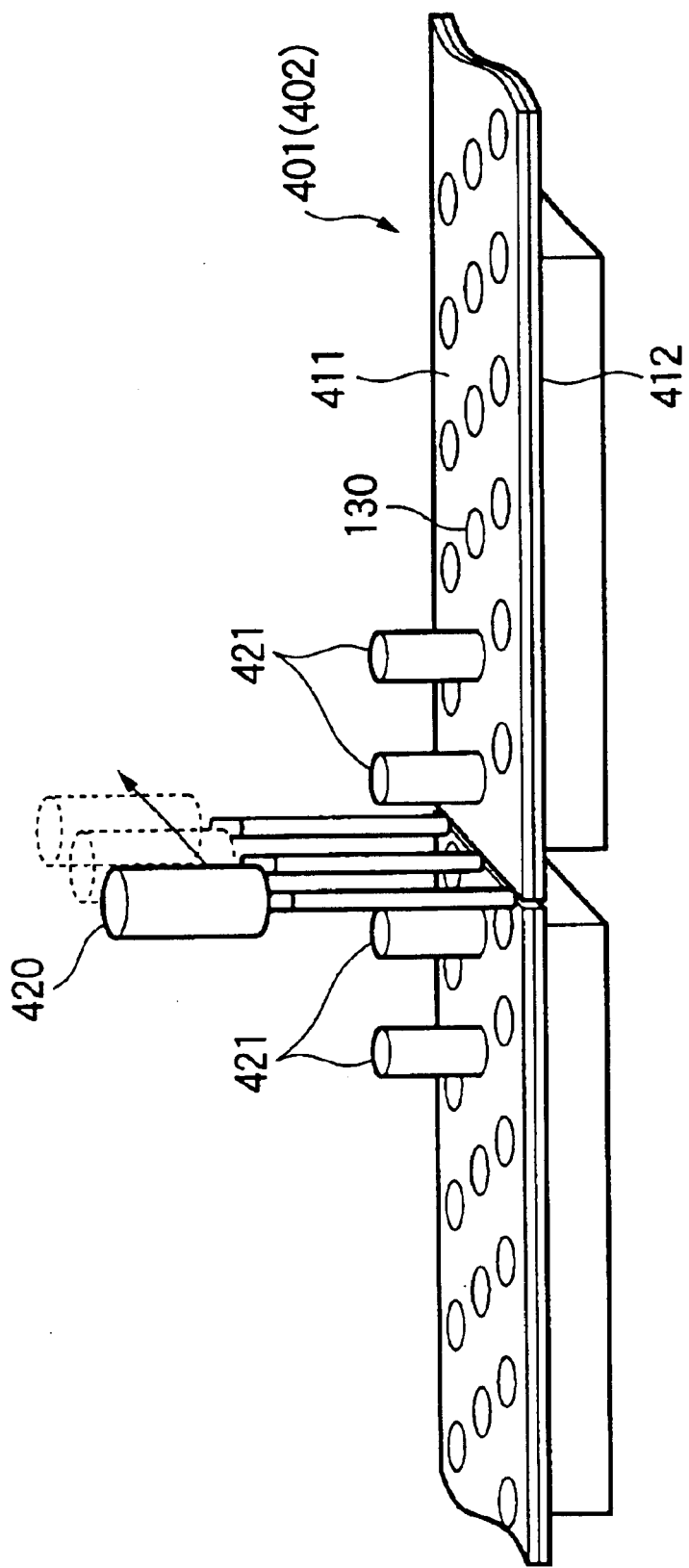
FIG. 26 is an explanatory diagram for showing in detail an edge portion welding step in the manufacturing method of the flat belt shown in FIG. 25.

For instance, when these belt members 411 and 412 are welded, as represented in FIG. 26, the welding operation is carried out by using a welding apparatus 420, while employing a jig 421 used for positioning positions of the through holes and also intervals of the through holes. As a consequence, it is possible to suppress distortions occurred during the welding operation, as well as fluctuations in positional relationships among these through holes.

EXAMPLE 1

While the image forming apparatus according to the embodiment 1 is employed as an experiment model, the Inventors of the present invention actually investigated concentration fluctuations in output images and positional shifts in images. As a result of their experiments, even under such a condition that driven pulley shaft torque was given by which a flat belt having no hole was could not be driven, this image forming apparatus could succeed to reduce both the concentration fluctuations in the output images and the positional shifts of the images lower than, or equal to recognizable limit values.

Figure 27:
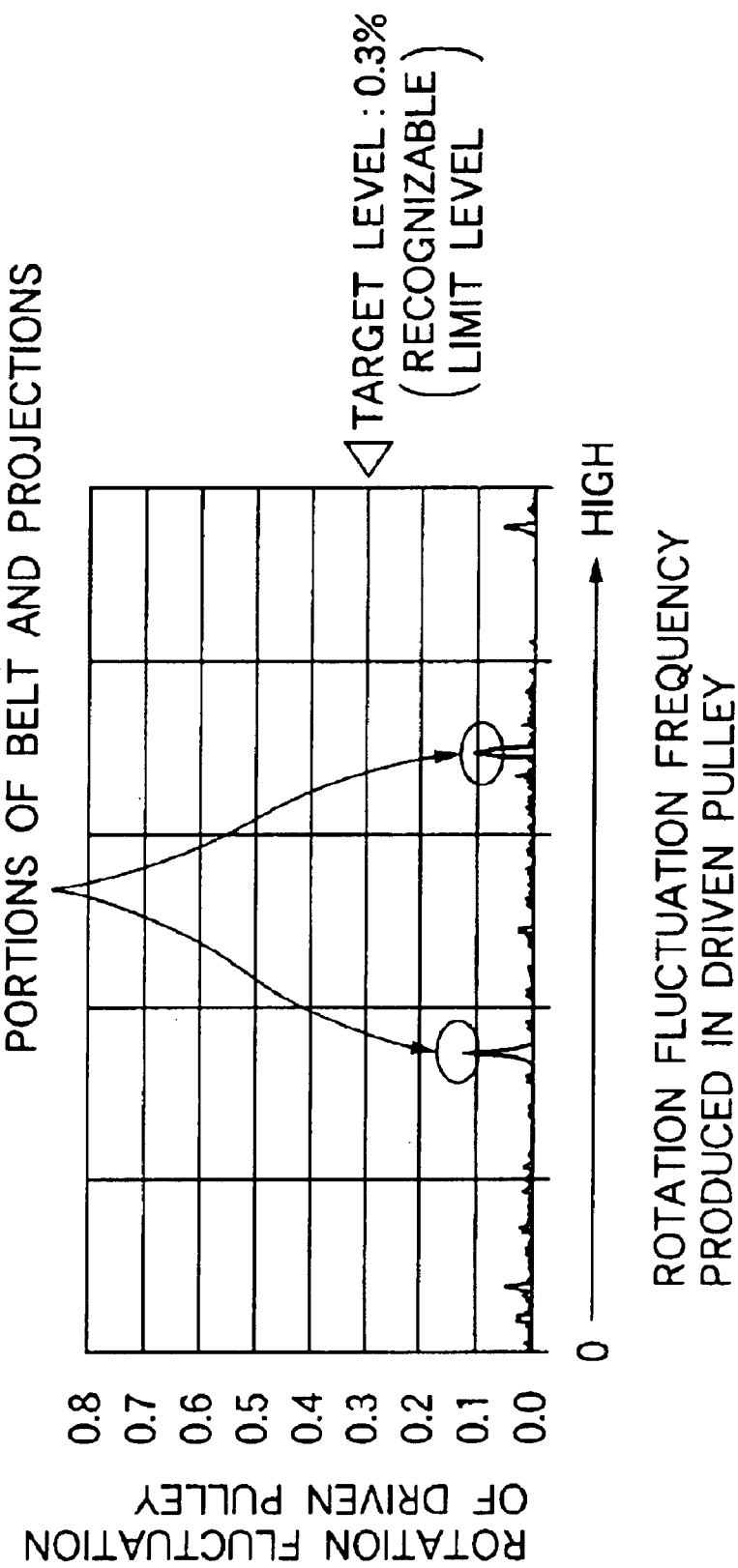
FIG. 27 is an explanatory diagram for showing a rotation fluctuation in a driven pulley employed in a driving force transmission apparatus according to an example 1.

One example of the above-described examples is shown in FIG. 27.

In this drawing, while a variation in engagements between through hole portions of a belt and projections of a pulley could be reduced up to $\Delta V0-p < 0.3\%$ which is a target level, a fluctuation in image concentration could be reduced lower than, or equal to the recognizable limit value.

Also, in accordance with this example, an adverse influence caused by belt meanders which were produced by increasing belt initial tension could be reduced.

Figure 28:
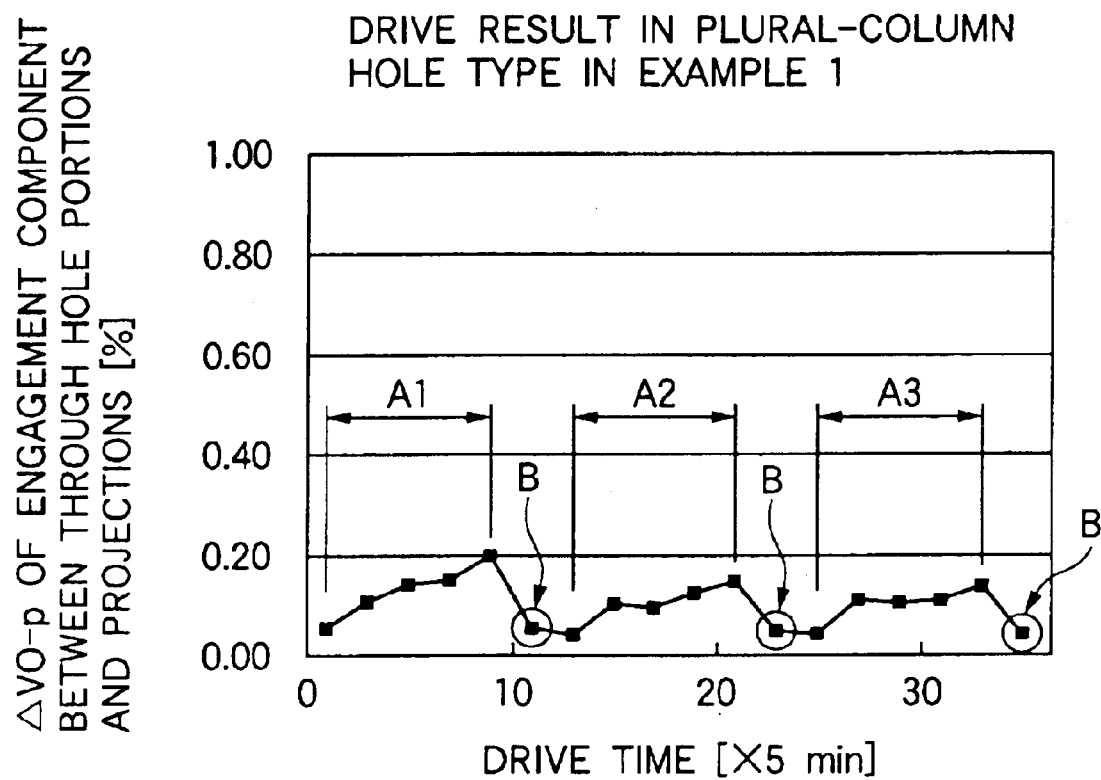
FIG. 28 is an explanatory diagram for showing a drive result of the driving force transmission apparatus according to the example 1.

One example is shown in FIG. 28. Incidentally, a result of comparative examples (belt though hole is one-column hole) is shown in FIG. 29.

Figure 29:
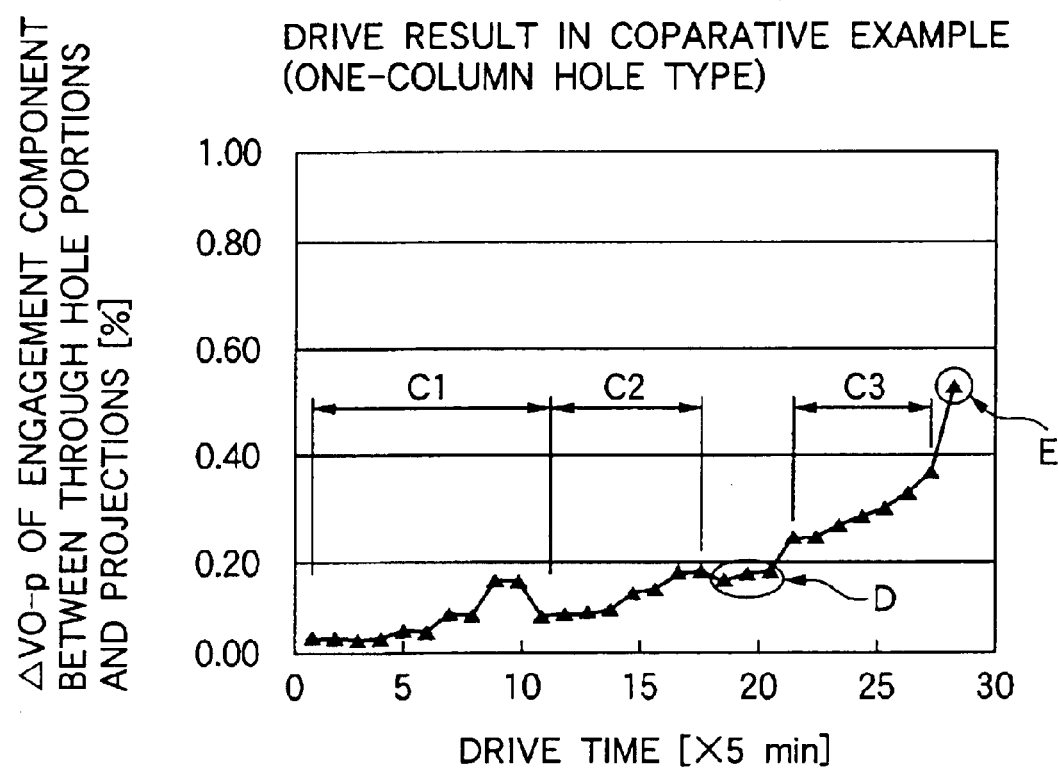
FIG. 29 is an explanatory diagram for showing a drive result of a driving force transmission apparatus according to a comparative example.

First, considering the comparative example, FIG. 29 shows progress in rotation fluctuation levels when a belt is continuously driven as follows: That is, 1) belt tension is increased from "$T_0$" to "$T_1$" without applying a load to a driven pulley (see region "C1"). 2) Next, the belt tension is returned to "$T_0$", only a load equal to a half of a target value is applied to the driven pulley, and the belt tension is increased from "$T^0$" to "$T_1$" in a similar manner to the previous case (see region "C2"). 3) Furthermore, the belt tension is returned to "$T_0$", a load equal to the target value is applied to the driven pulley, and the belt tension is increased from "$T_0$" to "$T_1$" (see region "C3").

As apparent from this drawing, when the belt tension is changed from the item 1) to the item 2), it can be seen that although the belt tension is returned to the initial condition, the level of the rotation fluctuation is not returned to the initial condition. This reason is given as follows. This is not an adverse influence due to the load because the item 1) is no load drive, but an adverse influence cased by that the belt meandering operation occurs, which gives the damage to the hole portions of the through holes when the belt tension is increased up to "$T_1$".

Also, in the items 2) and 3) where the load is given to the driven pulley, it can be seen that the rotation fluctuation level is gradually deteriorated, and therefore, the adverse influence caused by the load is mixed with the adverse influence caused by the belt meandering operation.

After the experiment has been accomplished, when the hole portions of the belt through holes are observed, the damage produced by engaging the hole portions of the belt through-holes cause the hole portions to be plastic-deformed, and cracks are produced in a certain hole portion. If such a phenomenon occurs, then it is practically difficult to play a role as apparently an image forming apparatus, and further, a driving force transmission apparatus.

To the contrary, FIG. 28 shows progress in rotation fluctuation levels when the belt is continuously driven as follows, into which this example has been conducted: That is, 1) while belt tension is set to "$T_0$", a load given to a driven pulley is gradually increased from 0 to the target value (see region "A1"). 2) Next, the belt tension is returned to "$T_0$", the belt tension is set to $T_1$ ($T_0 \times 1.4$), and a load given to the driven pulley is gradually increased from 0 to the target value (see region "A2"). 3) Furthermore, after the belt tension is returned to "$T_0$", the belt tension is set to $T_2$ ($T_0 \times 1.7$), and the load given to the driven pulley is gradually increased from 0 to the target value (see region A3).

As apparent from this drawing, when the load given to the driven pulley is increased, there is such a trend that the rotation fluctuation is slightly deteriorated. However, the level of this deteriorated rotation fluctuation is small. Also, there is substantially no adverse influence caused by the belt meandering operation which is produced by increasing the belt tension. In other words, while the experiment is carried out, in a case that the belt tension is returned to the initial condition so as to set no load condition, the level of the rotation fluctuations is also returned to the initial condition, resulting in reproducibility.

Conversely, since the belt tension is increased, the gripping force exerted between the pulley and the flat belt is increased, and the rotation fluctuation caused by the engagement between the pulley and the flat belt may be reduced.

As a consequence, since this example 1 is conducted, "$\Delta V0-p$" corresponding to the concentration fluctuation recognizable limit value of the output image could be reduced smaller than, or equal to 0.3% and a driving force transmission system having higher reliability with respect to the load and the belt meandering operation could be provided.

EXAMPLE 2

The image forming apparatus according to the embodiment 7 is employed as an experiment mode and the Inventors of the present invention actually investigated concentration fluctuations in output images and positional shifts in images. In accordance with the experiment performed by the Inventors, even when a mode uses a flat belt having no hole, since a winding angle of the flat belt with respect to a pulley can be sufficiently increased, a slip occurred between the flat belt and the pulley can be effectively avoided.

Even under such a condition that driven pulley shaft torque was given by which a flat belt having no hole was slipped and could not be driven, this image forming apparatus could succeed to reduce the concentration fluctuations in the output images and the positional shifts of the images lower than, or equal to recognizable limit values.

Figure 30:
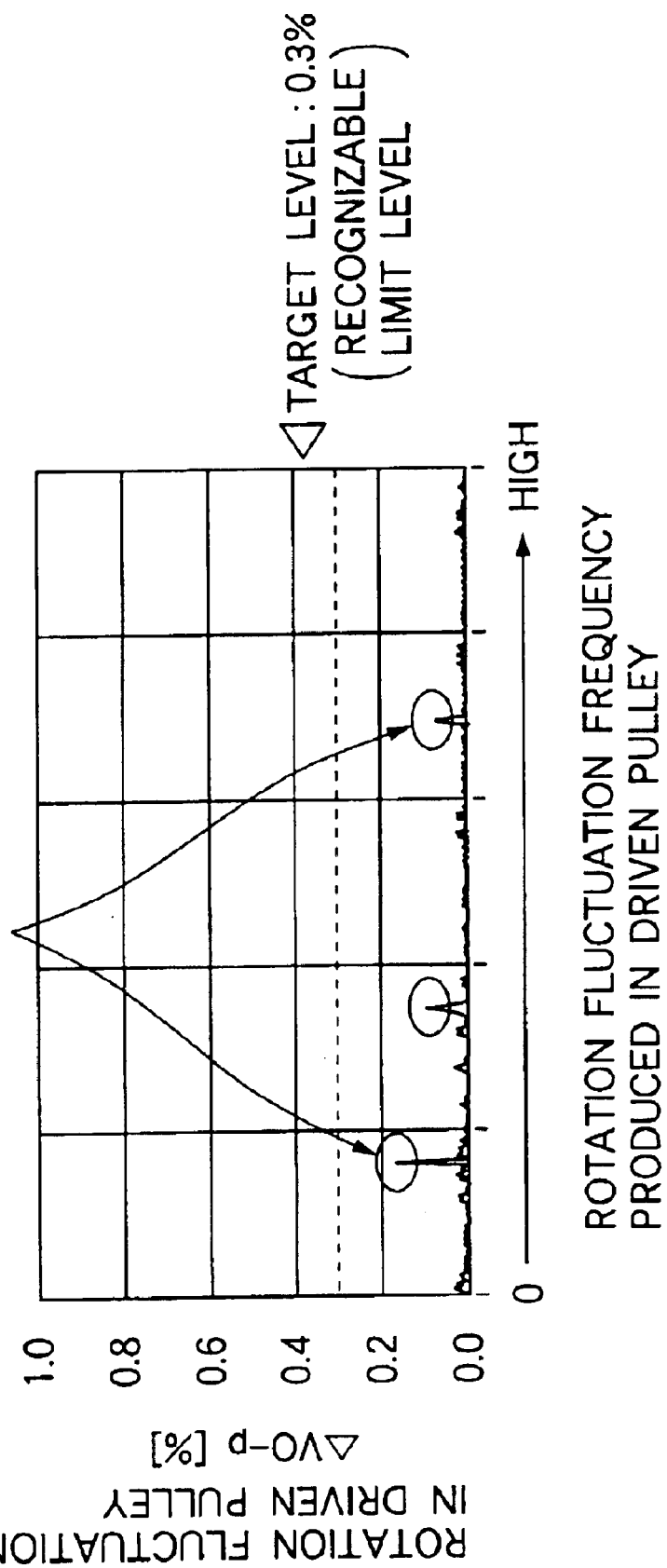
FIG. 30 is an explanatory diagram for showing a rotation fluctuation in a driven pulley employed in a driving force transmission apparatus according to an example 2.
Figure 31:
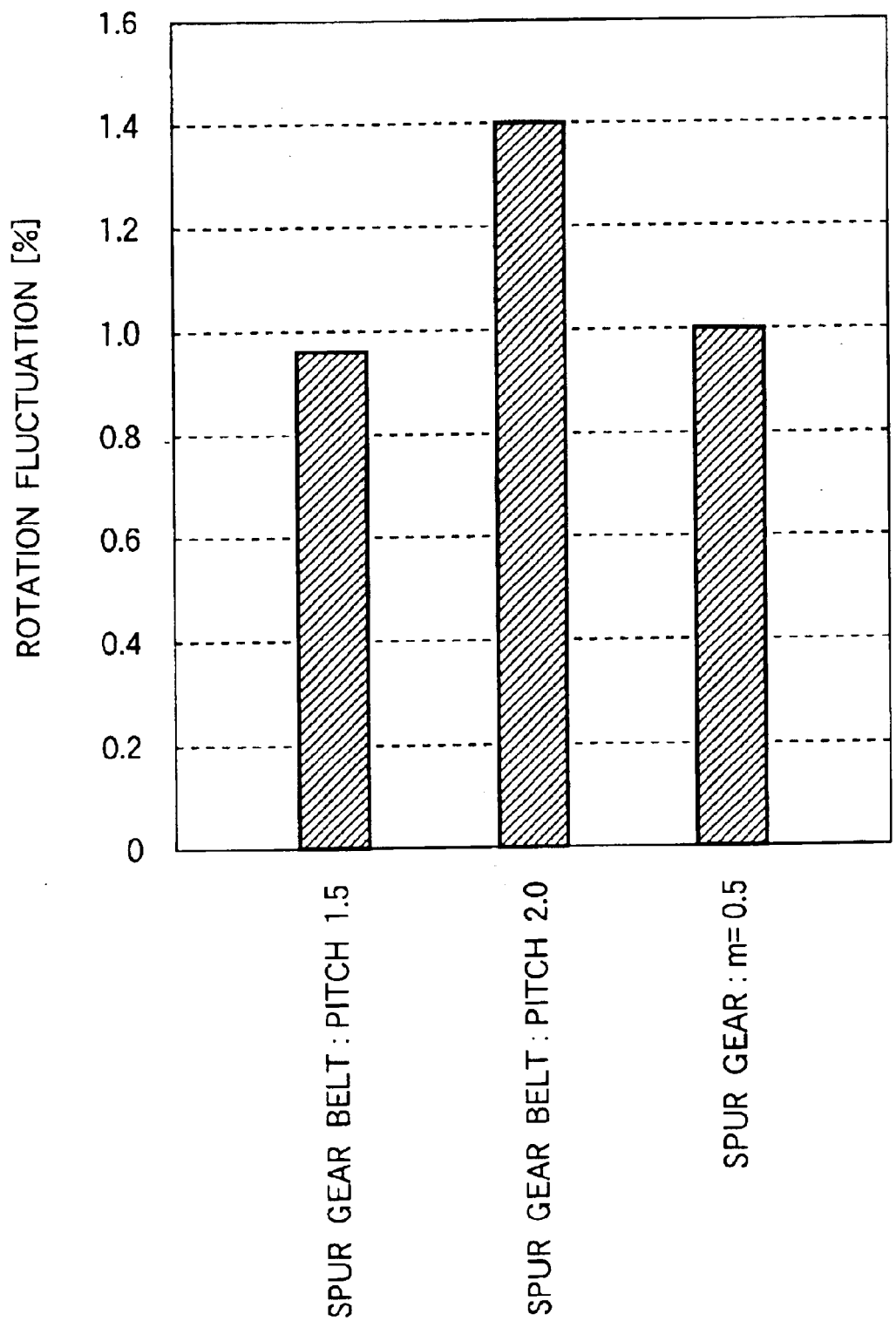
FIG. 31 is an explanatory diagram for showing problems of a driving force transmission apparatus according to a related art.
Figure 32:
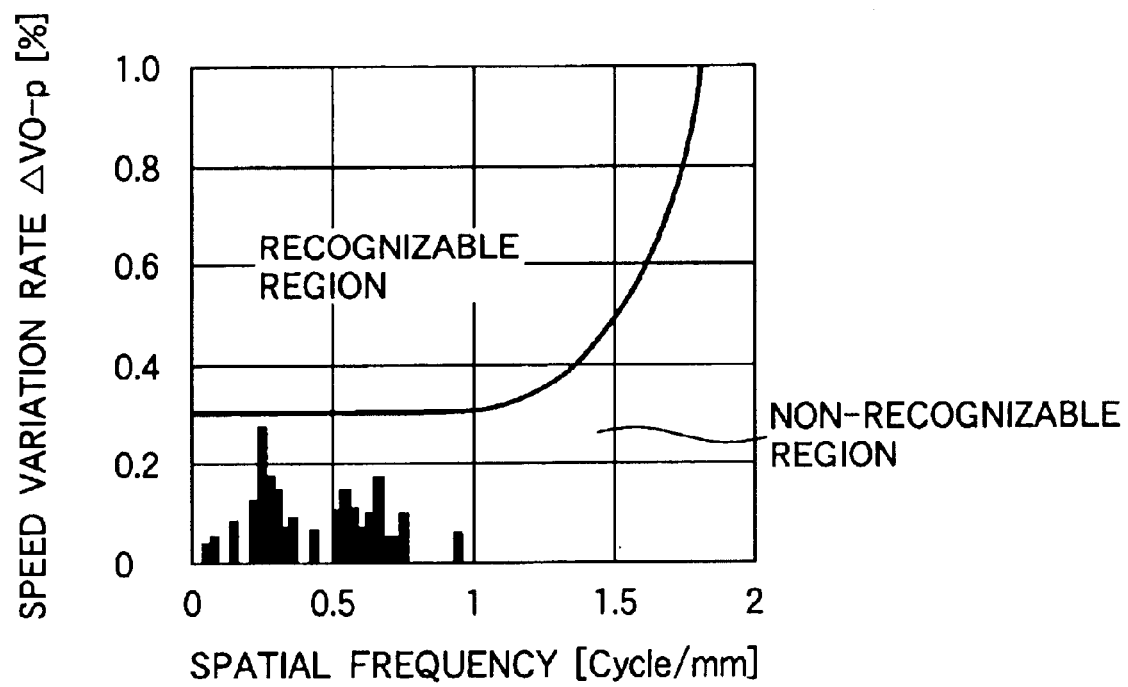
FIG. 32 is an explanatory diagram for showing a relationship between the concentration fluctuation allowable value and the rotation fluctuation of an image carrier member in the image forming apparatus using the driving force transmission apparatus according to the related art.
Figure 33:
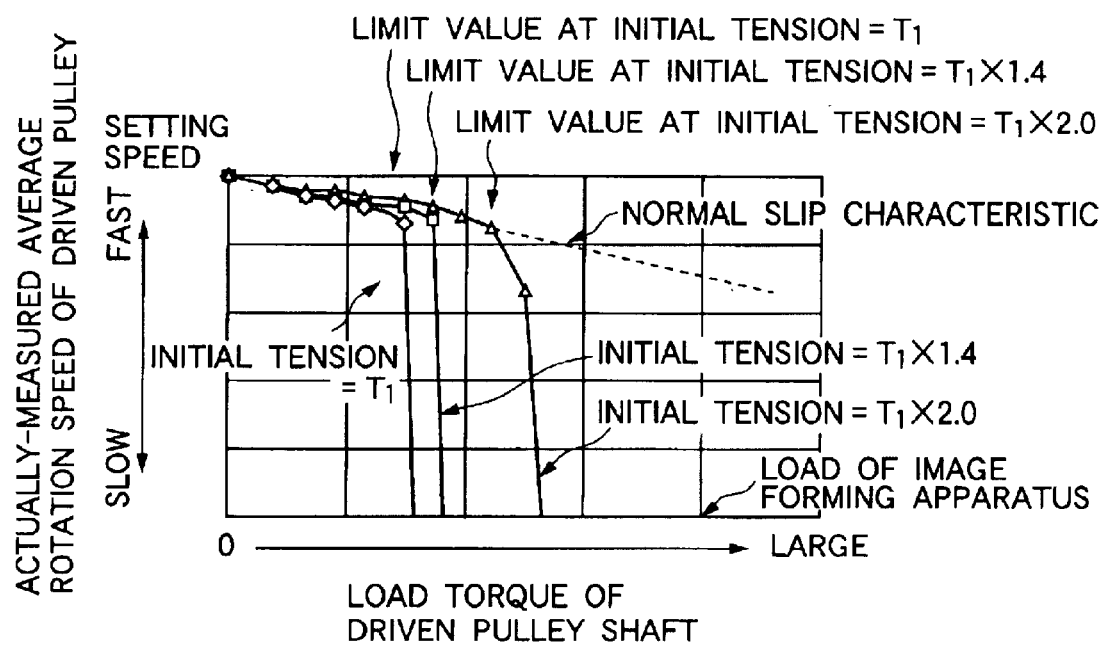
FIG. 33 is an explanatory diagram for showing a relationship between the average rotation speed of the driven pulley and the load torque in the driving force transmission apparatus according to the related art, using the flat belt.

One example is shown in FIG. 30.

In this drawing, while a variation in engagements between through hole portions of a belt and projections of a pulley could be reduced up to $\Delta V0-p<0.3\%$ which is a target level, a fluctuation in image concentration could be reduced lower than, or equal to the recognizable limit value.

As previously described in detail, in accordance with the driving force transmission apparatus of the invention, the following effects can be achieved. That is, in the system for transferring the driving force by wearing an endless-shaped flat belt over a plurality of tension members, an improvement is made in the structures of the through holes which are arrayed in the flat belt along the travel direction thereof, and also in the structures of the projections formed on at least one of the plural tension members over which the flat belt is worn (namely, improvements in plural through holes, arrays of projections, and combinations between elongated-hole shaped through holes and pillar-shaped projections). While the engaging conditions between the through holes and the projections can be firmly maintained, the driving force transmission apparatus owns such a structure capable of avoiding concentration of the operation force onto the hole portions of the through holes. As a consequence, apparently, this driving force transmission apparatus can effectively prevent the slips occurred between the flat belt and the tension members, and also, can effectively distribute the force exerted to the hole portions of the through holes under such a condition that the heavy rotation load is applied to the driven member which is coupled to any one of the tension members. While the destruction of the hole portions of the through holes is effectively prevented, the driving force transmission apparatus can transfer the driving force to the driven member under stable condition.

As a consequence, in the image forming apparatus with employment of such a driving force transmission apparatus, since the destruction of the hole portions of the through holes formed in the flat belt having the through holes can be effectively suppressed, and also, the driving force can be stably transferred to the image carrier corresponding to the member to be driven, this image forming apparatus can produce the output image without any image defect, while the lifetime of this flat belt having the through holes can be extended.

Also, in accordance with the driving force transmission apparatus of the present invention, the following effects can be achieved. That is, in the system for transferring the driving force by wearing the endless-shaped flat belt over a plurality of tension members, while the free rotating member which can be freely rotated is provided in the coaxial manner with respect to the rotation shaft of at least one tension member among the plural tension members to which the driving force is transferred, the flat belt is worn via the free rotating member with respect to the adjoining tension members which are different from such a tension member where this free rotating member is provided. As a consequence, for example, the winding angle of the flat belt with respect to the adjoining tension members can be set to the large angle. Moreover, the specific space is no longer required to be formed as the setting space of this free rotating member.

As a result, in such an embodiment that, for instance, the member to be driven is coupled to at least one of these adjoining tension members, even under such a condition that the heavy rotation load is applied to the member to be driven, the setting space for the auxiliary tension member supporting member used to wear the flat belt is not specifically required, and the driving force can be stably transferred to the member to be driven without unnecessarily extending the layout space.

Moreover, in the image forming apparatus with employment of such a driving force transmission apparatus, the auxiliary tension member supporting member is not specifically required so as to wear the flat belt. In addition, since the driving force can be transferred under stable condition to the image carrier corresponding to the member to be driven, this image forming apparatus can produce such an output image having no image defect, while avoiding such a problem that this image forming apparatus is made bulky.

What is claimed is:

1. An image forming apparatus comprising:
   a drive source for producing driving force;
   an image carrier driven by said driving force; and
   a driving force transmission apparatus for transmitting the driving force produced by said drive source to said image carrier,
   wherein said driving force transmission apparatus includes:
      a first endless-shaped flat belt having a plurality of through holes along a travel direction thereof;
      a rotation member having a plurality of projections to which said plural through holes of the first flat belt are fitted; and said first flat belt has elongated-hole shaped through holes which are elongated along a belt width direction perpendicular to the belt travel direction.

2. The image forming apparatus according to claim 1, wherein said first flat belt has a plurality of columns of through holes along the belt travel direction.

3. The image forming apparatus according to claim 1, wherein said first endless-shaped flat belt is formed of a plurality of sheets of flat belts which are superimposed with each other.

4. The image forming apparatus according to claim 1, wherein the driving force transmission apparatus further comprises:
   a second endless-shaped flat belt having a plurality of through holes along a travel direction thereof; and
   a second rotation member over which said first endless-shaped flat belt and said second endless-shaped flat belt are worn, an axis of the second rotation member is the same as that of the first rotation member.

5. The image forming apparatus according to claim 4, wherein one of the rotation members having the same axis is a free rotating member which follows movement of a belt winded thereto.

6. The image forming apparatus according to claim 4, wherein the driving force transmission apparatus further comprises a position restricting member for restricting movement of said second rotation member along an axis direction.

7. The image forming apparatus according to claim 6, wherein said driving force transmission apparatus has an apparatus for transferring driving force from the drive source to a first image carrier and an apparatus for transferring driving force from said drive source to a second image carrier.

8. The image forming apparatus according to claim 1, wherein the driving force transmission apparatus further comprises:
   a second endless-shaped flat belt having a plurality of through holes along a travel direction thereof; and
   a plurality of second rotation members over which said first endless-shaped flat belt and said second endless-shaped flat belt are worn,
   the first rotation member is a plurality of first rotation members;
   an axis of at least one of the second rotation members is the same axis as that of the arbitrary first rotation members.

9. The image forming apparatus according to claim 1, wherein the image carrier is a plurality of image carriers.

10. A driving force transmission apparatus comprising:
    a plurality of endless-shaped flat belts having a plurality of through holes along a travel direction thereof, the plurality of endless-shaped flat belts superimposed with each other under a state that said through holes coincide with each other; and
    a rotation member having a plurality of projections to which said through holes of said plural flat belts are fitted.

11. The driving force transmission apparatus according to claim 10, wherein portions of said plurality of flat belts are coupled to each other.

12. The driving force transmission apparatus according to claim 10, wherein, said flat belts have a plurality of columns of through holes along the belt travel direction.

13. The driving force transmission apparatus according to claim 10, wherein said flat belts own elongated-hole shaped through holes which are elongated along a width direction perpendicular to the belt travel direction.

14. A flat belt, comprising:
    a plurality of belt members;
    wherein at least one portion of each of the plurality of belt members are fixed to each other; and
    the plurality of belt members are arranged to be independently deformed.

15. An image forming apparatus comprising:
    a drive source for producing driving force;
    an image carrier driven by said driving force; and
    a driving force transmission apparatus for transmitting the driving force produced by said drive source to said image carrier,
    wherein said driving force transmission apparatus includes:
       a first endless-shaped flat belt having a plurality of through holes along a travel direction thereof; and
       a rotation member having a plurality of projections to which said plural through holes of the first flat belt are fitted;
       a second endless-shaped flat belt having a plurality of through holes along a travel direction thereof; and
       a second rotation member over which said first endless-shaped flat belt and said second endless-shaped flat belt are worn, an axis of the second rotation member is the same as that of the first rotation member.

16. The image forming apparatus according to claim 15, wherein said first flat belt has a plurality of columns of through holes along the belt travel direction.

17. The image forming apparatus according to claim 15, wherein said first endless-shaped flat belt is formed of a plurality of sheets of flat belts which are superimposed with each other.

18. The image forming apparatus according to claim 15, wherein one of the rotation members having the same axis is a free rotating member which follows movement of a belt winded thereto.

19. The image forming apparatus according to claim 15, wherein the driving force transmission apparatus further comprises a position restricting member for restricting movement of said second rotation member along an axis direction.

20. The image forming apparatus according to claim 19, wherein said driving force transmission apparatus has an apparatus for transferring driving force from the drive source to a first image carrier and an apparatus for transferring driving force from said drive source to a second image carrier.

21. The image forming apparatus according to claim 15, wherein the image carrier is a plurality of image carriers.

* * * * *